United States Patent [19]
Takahara et al.

[11] Patent Number: 6,049,364
[45] Date of Patent: *Apr. 11, 2000

[54] DISPLAY PANEL AND DISPLAY DEVICE USING THE SAME

[75] Inventors: Hiroshi Takahara; Shinya Sannohe, both of Neyagawa, Japan

[73] Assignee: Matsushita Electric Industrial Co., Ltd., Osaka-fu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/788,833

[22] Filed: Jan. 27, 1997

Related U.S. Application Data

[62] Division of application No. 08/350,033, Nov. 29, 1994, Pat. No. 5,673,127.

[30] Foreign Application Priority Data

| Dec. 1, 1993 | [JP] | Japan | 5-301590 |
| Dec. 27, 1993 | [JP] | Japan | 5-333852 |
| Dec. 27, 1993 | [JP] | Japan | 5-333862 |
| Aug. 26, 1994 | [JP] | Japan | 6-202215 |

[51] Int. Cl.[7] .............................. G02F 1/1333
[52] U.S. Cl. .................. 349/10; 257/59; 257/72; 257/67; 257/104; 257/105; 257/106; 349/95; 349/110; 349/111; 349/183; 349/186
[58] Field of Search ............... 257/59, 72, 104–106, 257/57, 67; 349/95, 10, 110, 111, 183, 186

[56] References Cited

U.S. PATENT DOCUMENTS

| 4,688,900 | 8/1987 | Doane et al. |
| 4,790,632 | 12/1988 | Miyakawa et al. |
| 5,042,921 | 8/1991 | Sato et al. |
| 5,073,772 | 12/1991 | Takafuji et al. ............ 349/110 |

(List continued on next page.)

FOREIGN PATENT DOCUMENTS

| 29 49 837 | 6/1981 | Germany. |
| 37 03 087 | 8/1988 | Germany. |
| 59-116718 | 7/1984 | Japan. |
| 60-6982 | 1/1985 | Japan. |
| 6-34931 | 2/1994 | Japan. |

OTHER PUBLICATIONS

Patent Abstracts of Japan, P–1629, Oct. 14, 1993, vol. 17/No. 566.

*Primary Examiner*—Fetsum Abraham
*Attorney, Agent, or Firm*—Wenderoth, Lind & Ponack, L.L.P.

[57] ABSTRACT

A liquid crystal display panel includes a counter substrate having a counter electrode and a multi-layered dielectric film both formed thereon, and an array substrate formed with pixel electrodes and thin-film transistors serving as switching elements. A layer of polymer dispersed liquid crystal material containing a UV-curable resin component and a liquid crystal component is sandwiched and sealed between the counter and array substrates. A light shielding film is formed over each thin-film transistor. The multi-layered dielectric film is a laminated structure of alternating thin-films of $SiO_2$ and $HfO_2$. Since the multi-layered dielectric film is of a nature capable of transmitting UV-rays of light therethrough, the UV-curable resin component positioned underneath the multi-layered dielectric film can be cured during the manufacture. Also, since the multi-layered dielectric film is of a nature capable of reflecting light of a visible region, it serves as a black matrix, reflecting the visible light modulated by the display panel. Black beads are used to keep the film thickness of the liquid crystal layer at a predetermined value. Preferably, a dielectric thin-film having a relative dielectric constant smaller than that of the liquid crystal material is formed on signal lines for transmitting signals to the thin-film transistors, to thereby accomplish an electromagnetic shield. Where color filters are to be formed on the pixel electrodes, those color filters may be formed on the signal lines to accomplish the electromagnetic shield.

6 Claims, 33 Drawing Sheets

U.S. PATENT DOCUMENTS

| | | | |
|---|---|---|---|
| 5,083,854 | 1/1992 | Zampolin et al. | 349/110 |
| 5,130,831 | 7/1992 | Kohara et al. | |
| 5,161,042 | 11/1992 | Hamada. | |
| 5,196,954 | 3/1993 | Yamazaki et al. | 349/128 |
| 5,368,991 | 11/1994 | Uchikawa et al. | |
| 5,381,256 | 1/1995 | Hanyu et al. | |
| 5,420,708 | 5/1995 | Yokoyama et al. | 349/106 |
| 5,436,635 | 7/1995 | Takahara et al. | 345/92 |
| 5,526,149 | 6/1996 | Kanbe et al. | 349/113 |
| 5,620,630 | 4/1997 | Onishi et al. | 349/110 |
| 5,673,127 | 9/1997 | Takahara et al. | 349/42 |
| 5,693,958 | 12/1997 | Torihara et al. | 257/59 |
| 5,786,876 | 7/1998 | Ota et al. | 349/42 |

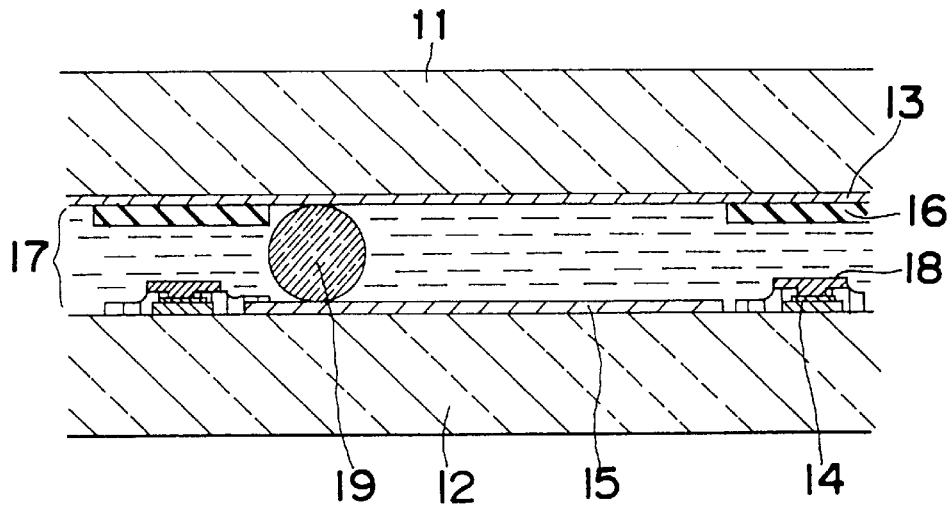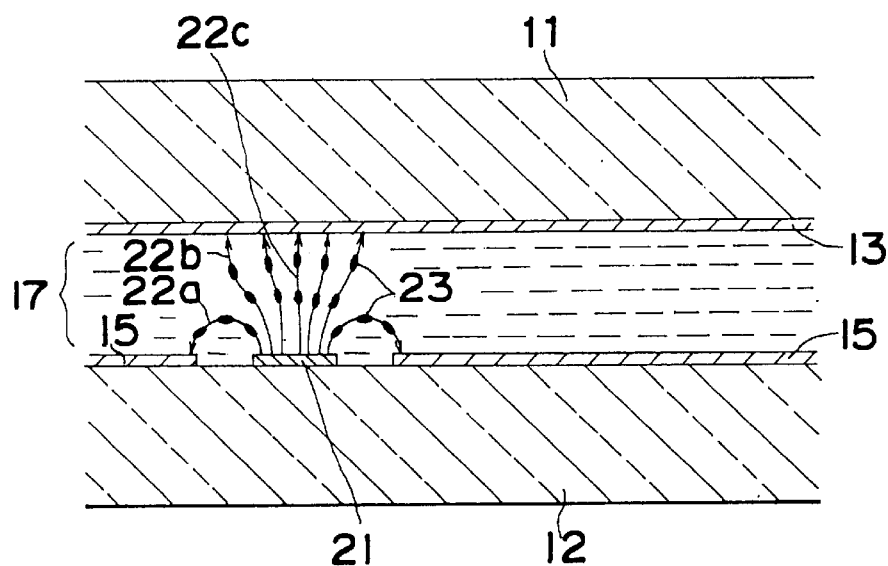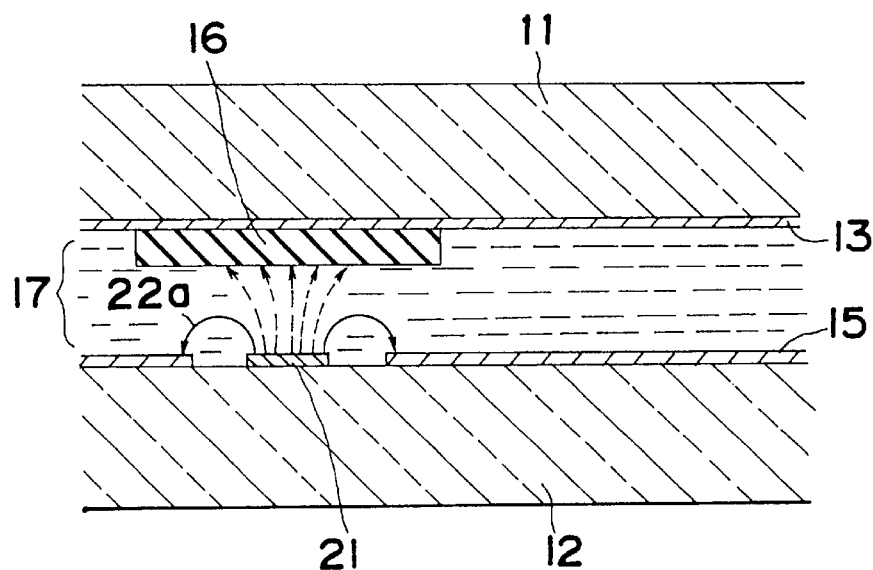

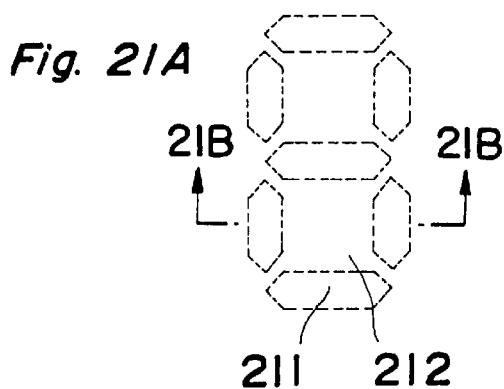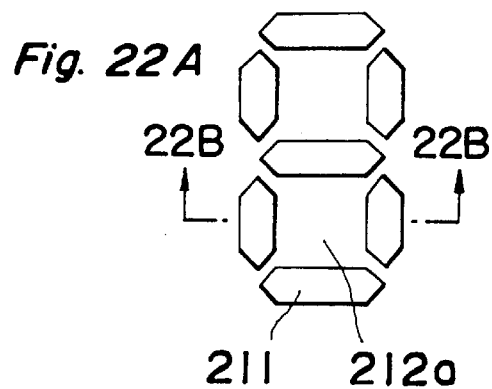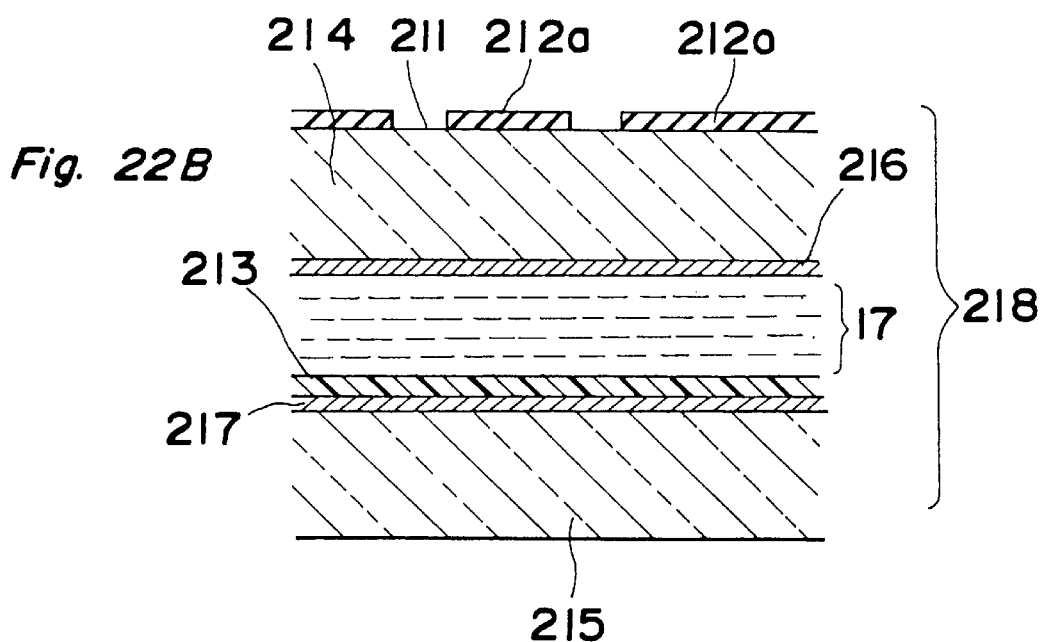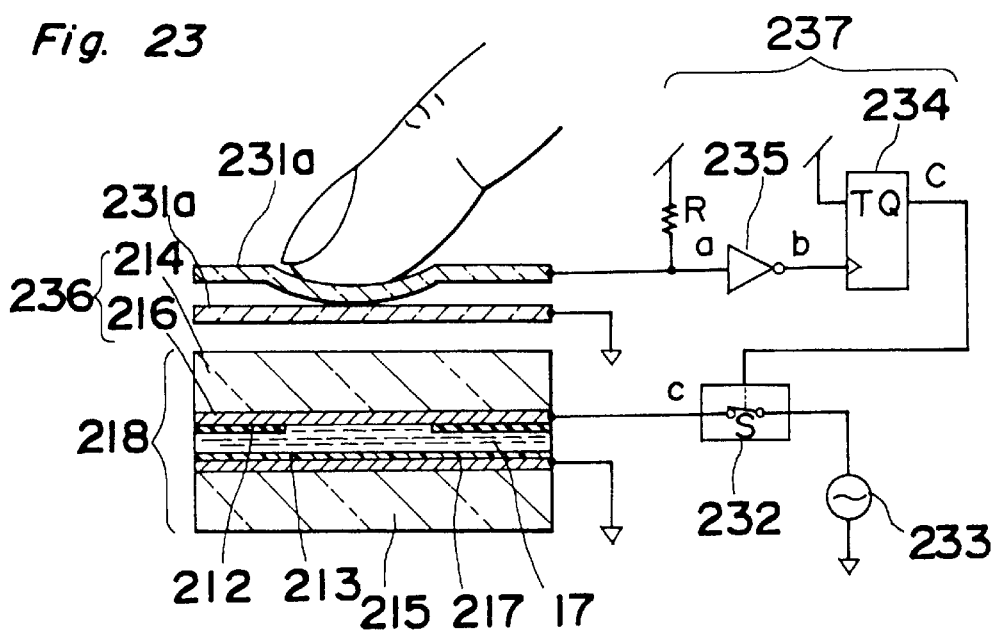

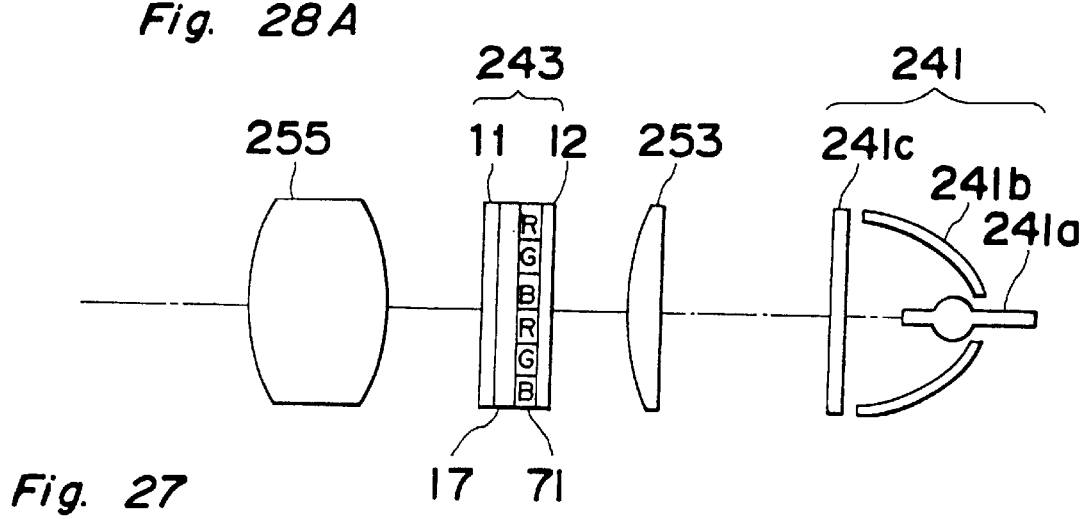
Fig. 28A
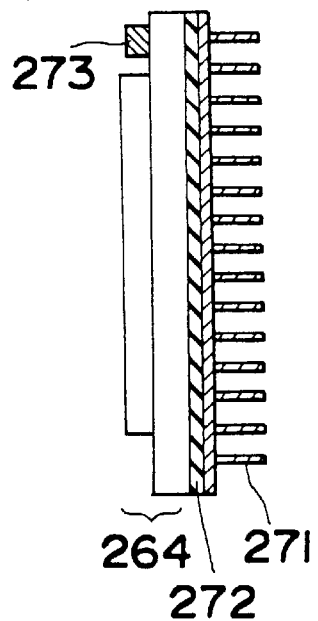
Fig. 27
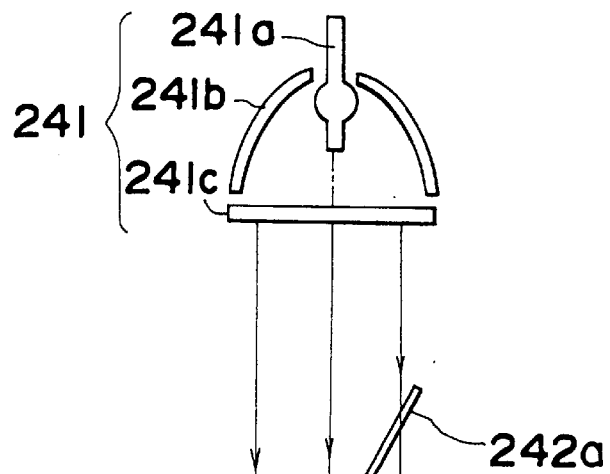
Fig. 28B
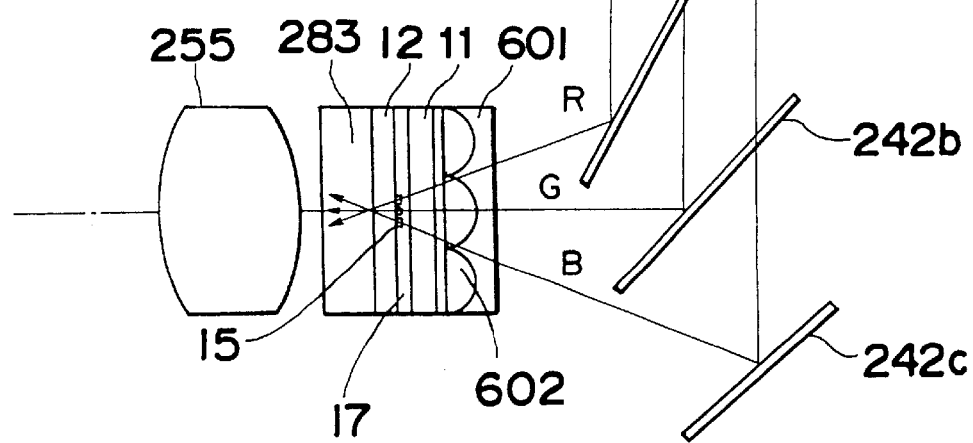

285 282 286 283

285  282 286  284

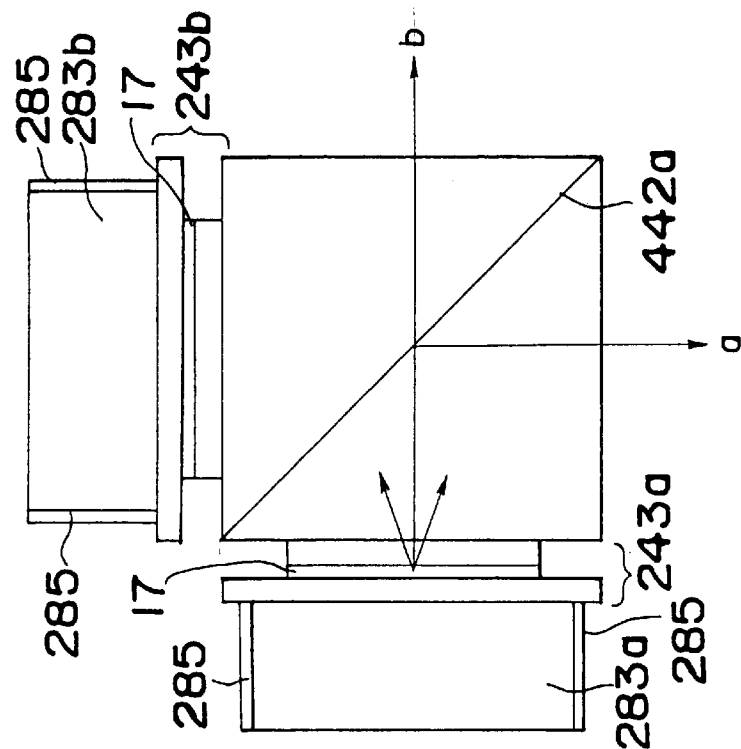
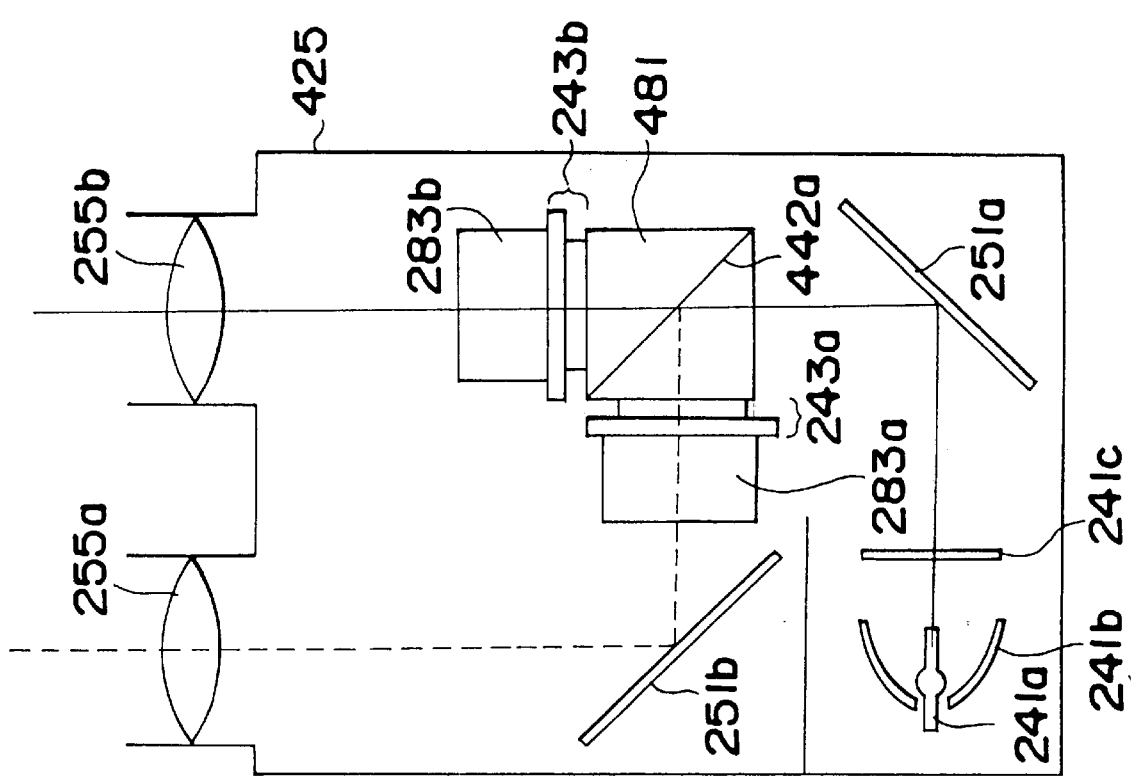

DISPLAY PANEL AND DISPLAY DEVICE USING THE SAME

This is a divisional application of Ser. No. 08/350,033, filed September Nov. 29, 1994 now U.S. Pat. No. 5,673,127.

BACKGROUND OF THE INVENTION

1. Field of the Invention

The present invention relates to a liquid crystal display panel utilizable as a touch panel or for the display of televised images, a projection type display device utilizing the liquid crystal display panel as a light valve for the display of images in the form as projected onto a screen, and a viewfinder utilizing the liquid crystal display panel as a display monitor for monitoring images being videoed.

2. Description of the Prior Art

The liquid crystal display panel is known to be lightweight and thin in thickness as compared with a cathode ray tube and a variety of liquid crystal display panels have been developed. Recent application of the liquid crystal panel is a display unit in pocketable television receiver sets and a display unit in viewfinders of video cameras. However, the liquid crystal display panel has difficulty in securing a relatively large display format and, therefore, a compromise has been made to incorporate the liquid crystal panel in a projection type display device of a type employing an optical system for projecting images generated by the liquid crystal panel onto a screen. The projection type display device and the viewfinder both currently placed in the market make use of a twisted nematic (TN) liquid crystal display panel which utilizes a rotatory polarization of the liquid crystal.

The prior art liquid crystal display panel will be discussed in detail with reference to the accompanying drawings which illustrate it only for illustration purpose.

FIG. 60 illustrates a fragmentary sectional view of the prior art liquid crystal display panel. The prior art liquid crystal display panel makes use of a layer of TN liquid crystal 383 filled and sealed between an array substrate 12, formed with thin-film transistors 14 and others, and a counter substrate 11 spaced a distance of 4 to 6 μm from the array substrate 12. A peripheral region of the TN liquid crystal display panel outside a display region is sealed by the use of sealing resin (not shown). Reference numeral 381 represents a black matrix formed of metallic material such as chromium; reference numeral 13 represents a counter electrode made of transparent material such as ITO; reference numeral 15 represents pixel electrodes; and reference numerals 882a and 382b represent orientation films.

The orientation films 382a and 382b are formed so as to overlay the pixel electrodes 15 and the counter electrode 13 and are subjected to a rubbing treatment to orient liquid crystal molecules of the liquid crystal layer 383. A polarizing plates 384a and 384b are lined to each of the counter substrate 11 and the array substrate 12 respectively.

The prior art TN liquid crystal display panel discussed above is manufactured in the following manner. Each of the array substrate 12 and the counter substrate 11 is lined with an orientation film 382a and 382b which is subsequently rubbed for alignment treatment. Then, a peripheral region of the array substrate 12 is deposited with a sealing resin (not shown) leaving an injection port for subsequent injection of a quantity of TN liquid crystal material 383. On the other hand, beads of transparent glass or synthetic resin are distributed over the counter substrate 11 so that a uniform thickness of the TN liquid crystal layer can be formed. Thereafter, the counter substrate 11 and the array substrate 12 are joined together, followed by heating of the sealing resin to cure the latter to thereby firmly bond the substrates 11 and 12 together. The assembly of the substrates 11 and 12 bonded together is placed in a vacuum chamber to evacuate the space between the array substrate 12 and the counter substrate 11, followed by immersion of the assembly into a bath of TN liquid crystal material. When the vacuum in the chamber is released, the TN liquid crystal material is sucked into the space between the substrates 11 and 12 through the injection port, followed by sealing of the injection port to thereby complete the liquid crystal display panel.

FIG. 15A illustrates a plan view of a display panel module in which the liquid crystal display panel is fixedly mounted on a chassis and FIG. 15B illustrates a cross-sectional view taken along the line 15B—15B in FIG. 15A. A chassis 161 in the form of a stainless metallic plate has a printed circuit board 162 mounted thereon. The printed circuit board 162 has a connector 163, electrolytic capacitors and others mounted thereon and also has a number of copper conductors (not shown) formed thereon by the use of a circuit printing technique for transmission of electric signals from the connector 163. The printed circuit board 162 has a central region perforated, and the TN liquid crystal display panel is mounted on the printed circuit board 162 with the display region thereof aligned with the central perforation defined in the printed circuit board 162. The TN liquid crystal display panel has thin-film conductors formed therein for transmission of the electric signals. The copper conductors are connected at one end with the associated thin-film conductors by means of fine wires (bonding wires) made of aluminum.

The peripheral region of the TN liquid crystal display panel outside the display region thereof is formed with a generally square ring-shaped light shielding pattern 164 which is indicated by dotted lines in FIG. 15A. Cross-sectional representations of the light shielding pattern 164 taken along the lines corresponding to lines 16A—16A and 16B—16B in FIG. 15A are shown in FIGS. 61A and 61B, respectively. The light shielding pattern 164 made of chromium and having a film thickness of about 1,000 angstrom is formed over the counter electrode 13 on the counter substrate 11. Reference numeral 21 represents source signal lines.

The reason for formation of the light shielding pattern 164 and the black matrix with the use of chromium is because a relatively small film thickness can be obtained with an increased light shielding effect. The TN liquid crystal display panel requires an orientation treatment to be effected to the orientation films 382 to align the liquid crystal molecules. The orientation treatment is carried out by rubbing the pixel electrodes 15. If the black matrix 381 has a relatively great film thickness, it gives rise to considerable surface irregularities on each of the substrates 11 and 12 and a favorable orientation treatment can no longer be effected.

The reason for the formation of the light shielding pattern 164 in the peripheral region of the TN liquid crystal display panel outside the display region will now be described briefly. The peripheral region of the TN liquid crystal display panel outside the display region has no pixel, but is formed with the source signal lines 21 for transmission of electric signals to the display region. Since the source signal lines 21 are in the form of a metallic thin film, they shield light off. However, light incident upon a gap between one source signal line and the neighboring source signal line is allowed to pass therethrough since no light shielding element exist in that gap. Passage of light through the display region of the TN liquid crystal display panel suffices, and light transmitted from somewhere other than the display region of the TN liquid crystal display panel is of no use and may constitute a cause of darkening of images being displayed. The light transmitted from somewhere other than the display region of the TN liquid crystal display panel is shielded by the chassis 161. Since the chassis 161 is in the form of a stainless metallic plate, no light passes therethrough. The chassis 161 is perforated at a central area thereof which is positioned so as to align with the perforation in the printed circuit board and the display region of the TN liquid crystal display panel.

Although the TN liquid crystal display panel has dimensions highly precisely tailored since it is manufactured by the use of a semiconductor process, the accuracy to which the chassis 161 is formed is low since the chassis 161 is manufactured by the use of a mechanical process. Also, the accuracy to which the TN liquid crystal display panel is fitted to the chassis 161 is low. Accordingly, if the perforation in the chassis 161 is great in size, the light leaks from the peripheral region of the display panel outside the display region, that is, gaps between the neighboring source signal lines. On the other hand, if the perforation in the chassis 161 is small in size, the chassis 161 will shield a portion of the display region of the TN liquid crystal display panel. Also, any error in fitting the TN liquid crystal display panel to the chassis through the printed circuit board may result in leakage of light from one end while the opposite end will shield a portion of the display region of the display panel. Therefore, while the light shielding pattern 164 is formed to have a width of about 2 mm, the perforation in the chassis 161 is so chosen to have a size greater than the display region of the display panel. This practice makes it possible to allow the light shielding pattern 164 to occupy a position between the perimeter of the perforation in the chassis 161 and that of the display region of the display panel and neither leakage of light from the outside of the display region nor shielding of that portion of the display region of the display panel will likely occur even though the display panel is fitted displaced 2 mm at most from the design position.

The display panel utilizing the TN liquid crystal material requires the use of a polarizing plate 384a to convert the incident light into a linearly polarized light. Also, another polarizing plate 384b is also required on an exit side of the liquid crystal display panel to detect light modulated by the liquid crystal display panel. In other words, the TN liquid crystal display panel requires the use of the polarizing plate 384a (hereinafter referred to as an polarizer) for linearly polarizing the incident light and the polarizing plate 384b (hereinafter referred to as an analyzer) for detecting the modulated light to be disposed on incident and exit sides of the TN liquid crystal display panel. Assuming that the pixel opening of the liquid crystal display panel is 100% and the amount of light incident upon the polarizer 384a is given 100, the amount of light emerging from the polarizer 384a is 40%, the transmittance of the display panel is 80% and the transmittance of the analyzer 384b is 80%, the transmittance as a whole is about 25%, that is, (0.4×0.8× 0.8≈0.25). This means that only about 25% of the total light incident upon the TN liquid crystal display panel is utilized effectively and, accordingly, the TN liquid crystal display panel has a problem in that images are apt to be displayed at a low luminance.

Light lost as it passes through the polarizing plate 384 is substantially absorbed by the polarizing plate 384 and converted into heat which in turn heats the polarizing plate 384 and the display panel itself by radiation. In the case of the projection type display device, the amount of light incident upon the polarizing plate 384 amounts to some ten thousand luxes. Accordingly, where the TN liquid crystal display panel is used as a light valve in the projection type display device, the polarizing plate 384, the panel and others are heated to a temperature sufficient to cause them to deteriorate in a relatively short period of time.

Also, the TN liquid crystal display panel requires lining of the orientation film 382 which must be rubbed subsequently. The use of the rubbing process results in increase of the number of manufacturing steps which in turn brings about increase in manufacturing cost. On the other hand, it is a recent trend that the number of the pixels in the display panel used in the projection type display device amounts to 300,000 or more and the size of each pixel is correspondingly reduced. Reduction in pixel size in turn brings about an increased number of surface irregularities per unit area resulting from signal lines, thin-film transistors and other elements. The presence of the increased surface irregularities obviously hampers a satisfactory rubbing. Also, reduction in pixel size brings about reduction in pixel opening since the area of formation of the thin-film transistor 14 and the signal lines for each pixel increases. By way of example, in the case where the display panel of 3 inches in diagonal size is formed with 350,000 pixels, the pixel opening is about 30%, and where the same display panel is formed with 1,500,000 pixels, it is indicated that the pixel opening will be about 10%. Reduction in pixel opening brings about not only reduction in luminance of the images being displayed, but also accelerated reduction in performance of the TN liquid crystal display panel as a result of heating of the display panel under the influence of light impinging upon areas other than the area of incidence of light.

The TN liquid crystal material modulates light with change in orientation of liquid crystal molecules that takes place when a voltage is applied to the pixel electrodes 15. As indicated previously, the TN liquid crystal display panel makes use of the polarizing plates disposed on the incident and exit sides thereof, the axis of polarization of the polarizer 384a lying perpendicular to that of the analyzer 384b. In general, the TN liquid crystal display panel is used in a mode (NW mode) in which a black display can be effected upon application of a voltage. While the display panel useable in the NW mode is considered excellent in respect of color reproducibility of images being displayed, it has a problem in that light tends to leak from around each pixel. This is because the liquid crystal molecules do not align in a normal direction, but in a reverse direction. This alignment is referred to as a reverse tilted domain which occurs when the direction of set up of the liquid crystal molecules is partially reversed under the influence of an electric field developed between the pixel electrodes 15 and the signal lines 21. Portions of the liquid crystal molecules which set up in the reverse direction allow the light to pass through the analyzer 384b on the exit side of the display panel even though an electrical voltage is applied thereto. In other words, light leakage occurs, which does not occur if the liquid molecules are set up in the normal direction.

One method of avoiding the light leakage is to increase the width of the black matrix 381 that is formed over the counter electrode. However, this is not an effective method since the increased width of the black matrix 381 results in reduction in the area of closure of the pixels which in turn brings about reduction in luminance of the images being displayed.

The display panel utilizing the TN liquid crystal material as hereinafter described requires the use of the polarizing plate 384. Also, since the light leakage tends to occur around the pixels, the black matrix must have an increased width. Accordingly, the efficiency of utilization of light is low and the display luminance is low. Moreover, light impinging upon the black matrix does in turn heat the display panel to an elevated temperature which subsequently brings about reduction in lifetime of the display panel as a whole.

Similarly, the projection type display device in which the TN liquid crystal display panel is used as a light valve has a low efficiency of utilization of light, accompanied by reduction in luminance of the images being projected onto the screen. In view of this, the projection type display device utilizing a polymer dispersed (PD) liquid crystal panel that requires no polarizing plate 384 has been suggested and disclosed in, for example, the Japanese Laid-open Patent Publication No. 3-94225. The PD liquid crystal display panel used as a light valve in the projection type display device modulates the incoming light by scattering or transmitting the incident light.

The PD liquid crystal display panel is of a structure which is similar to the TN liquid crystal display panel shown in FIG. 60, but differs therefrom in that the polarizing plate 384 and the orientation film 382, both shown in FIG. 60, are dispensed with. As a matter of course, the PD liquid crystal display panel makes use of polymer dispersed liquid crystal material.

Operation of the PD liquid crystal display panel will be described briefly with reference to FIGS. 34A and 34B which illustrate explanatory diagrams. As shown therein, a quantity of polymer 332 has liquid crystal droplets 331 dispersed therein. Pixel electrodes 15 are connected with thin-film transistors (not shown) which, when they are switched on and off, apply a voltage to the associated pixel electrodes 15 to vary the direction of orientation of the liquid crystal aligned with the pixel electrodes 15 to thereby modulate the incoming light. So long as no voltage is applied as shown in FIG. 34A, the liquid crystal droplets 331 are randomly oriented in varying directions. In this condition, a difference is created between the index of refraction of the polymer 332 and that of the liquid crystal droplets 331 with the incident light consequently scattered.

On the other hand, when the voltage is applied to each pixel electrode 15 as shown in FIG. 34B, the liquid crystal molecules are aligned in one direction. If the index of refraction of the liquid droplets exhibited when the liquid crystal molecules are aligned in one direction is matched with that of the polymer 332, the incoming light passes through the array substrate 12 without being scattered.

The PD liquid crystal display panel of the type discussed above is manufactured in the following manner. As the polymer 332, light curable resin, particularly UV-curable resin, is generally employed. The array substrate 12 and the counter substrate 11 are retained in position spaced a predetermined distance from each other by a retaining means which is often employed in the form of fine beads. No orientation film 382 is basically needed in the PD liquid crystal display panel. A solution containing a mixture of UV-curable resin and liquid crystal material (hereinafter referred to as a LC mix) is injected into a space between the array substrate 12 and the counter substrate 11, followed by radiation of ultraviolet (UV) rays to cure the UV-curable resin. Upon curing of the UV-curable resin, the resin component and the liquid crystal component are phase separated. Where the quantity of the liquid crystal material is relatively small, it forms the liquid crystal droplets 331 as shown in FIGS. 34A and 34B, but where it is relatively great, the liquid crystal droplets 331 are continuously connected.

Portion of the UV-curable resin which has been radiated by ultraviolet rays of light is cured to result in phase separation between the resin component and the liquid crystal component, but the remaining portion of the UV-curable resin which has not been radiated remains uncured. An example in which, in the structure of the liquid crystal display panel shown in FIG. 60, the LC mix referred to above is injected in place of the TN liquid crystal material 383 will be discussed. Since the black matrix 381 is in the form of the metallic thin-film, it serves to shield the ultraviolet rays of light off. Since the thin-film transistor 14 and other components are also in the form of metallic thin-films, they also serve to shield the ultraviolet rays of light off. Accordingly, that portion of the UV-curable resin within an area underneath the black matrix 381 does not cure even though radiated by the ultraviolet rays of light from the side of the counter substrate 11. This is partly because, when the ultraviolet rays of light are radiated in a direction indicated by the arrow A, the black matrix 381 shields the incoming UV rays of light and partly because, when the ultraviolet rays of light are radiated in the opposite direction indicated by the arrow B, the thin-film transistors 14 shields the incoming UV rays of light.

The presence of that portion of the UV-curable resin which has been left uncured adversely affects the reliability and the lifetime of the PD liquid crystal display panel. Specifically, not only does the composition of liquid crystal material tend to vary while the liquid crystal display panel is operated, but also the liquid crystal layer and the counter substrate 11 are apt to be separated.

The presence of the black matrix 381 makes it difficult to fix UV radiating conditions during the manufacture of the display panel. At the time of manufacture, the LC mix in which the liquid crystal material and the UV-curable resin are mixed in a predetermined mixing ratio is injected into the space between the array substrate 12 and the counter substrate 11 and is subsequently radiated by the ultraviolet rays of light, the average particle size of the liquid crystal material around each pixel electrode 15 (adjacent to the black matrix) or the average pore size of a polymer network tends to increase. This is supposed to be because the black matrix 381 absorbs and is therefore heated by the ultraviolet rays of light, resulting in a localized increase in temperature of the resin around the black matrix and a localized change in condition by which the liquid crystal component and the resin component are phase separated. The scattering characteristic is also reduced. As hereinabove discussed, if the black matrix 381 is formed, even the slightest change in temperature during the manufacture and the intensity of UV radiation bring about a considerable change in average particle size of the liquid crystal material overlaying the pixel electrodes or in average pore size of the polymer network overlaying the pixel electrodes, thereby imposing limitations on the manufacturing condition. Accordingly, it is difficult to manufacture constantly the polymer dispersed liquid crystal display panels having an equal operating characteristic.

Where the polymer dispersed liquid crystal display panel is used as a light valve in the projection type display device, the presence of that portion of the UV-curable resin which has been left uncured in the display panel tends to constitute a cause of considerable deterioration in performance of the polymer dispersed liquid crystal display panel. This appears to result from the fact that, in the projection type display device, light of an intensity of about some ten thousand luxes or higher falls on the display panel, subjecting the latter to light-induced and heat-induced stresses.

As hereinbefore discussed, in the prior art TN liquid crystal display panel, the efficiency of utilization of light is relatively low because of the use of the polarizing plate, making it impossible to accomplish a high luminance display. Also, though the high luminance display can be attained with the polymer dispersed liquid crystal display panel, the prior art structure is instable because of that portion of the UV-curable resin remaining uncured and cannot be employed in practice. Also, the manufacturing tolerance thereof is extremely limited, making it difficult to obtain constantly the polymer dispersed liquid crystal display panel having a high light scattering characteristic.

SUMMARY OF THE INVENTION

Accordingly, the present invention is intended to provide an improved liquid crystal display panel having an improved stability, effective to provide a high luminance display of images and being substantially free from change with time. The present invention is also intended to provide an improved projection type display device utilizing the improved liquid crystal display panel as a light valve.

As hereinbefore discussed, the TN liquid crystal display panel requires the use of the polarizing plate to accomplish light modulation and is ineffective to accomplish a high luminance display because of a relatively low efficiency of unitization of light. According to the present invention, however, the high luminance display is accomplished by employing mainly a polymer dispersed liquid crystal material for a light modulating layer. However, the display panel in which the polymer dispersed liquid crystal material is employed as a light modulating layer has some problems in that the retentivity is low, light leakage is apt to occur from around the pixel electrodes and secondary light scattering tends to result from scattering of light in the liquid crystal layer. The display panel of the present invention is intended to provide technical ideas effective to solve the foregoing problems and to accomplish both a high luminance display and a high contrast display.

The display device of the present invention is also intended to provide technical ideas effective to solve such problems as a blurring of the contour of each pixel, reduction in display contrast resulting from the secondary scattering and reduction in window contrast resulting from scattering of light in the liquid crystal layer. All of these problems are peculiar to a display device which utilizes as a light valve a display panel which is effective to modulate light as a function of change in light scattering. The present invention is also intended to accomplish both a high luminance display and a high contrast display. In particular, these technical ideas bring about considerable effects where the display device of the present invention is used as a light valve.

BRIEF DESCRIPTION OF THE DRAWINGS

These and other objects and features of the present invention will become clear from the following description taken in conjunction with preferred embodiments thereof with reference to the accompanying drawings, in which like parts are designated by like reference numerals and in which:

FIG. 1 is a schematic sectional view of a display panel according to a preferred embodiment of the present invention;

FIGS. 2A and 2B are views similar to FIG. 1 showing how the presence and absence of a certain element affect electric lines of force in the display panel of the present invention, respectively;

FIG. 21A is a schematic diagram showing one alphanumeric character that is to be displayed in the display panel of the present invention;

FIG. 22A is a schematic diagram showing one alphanumeric character that is to be displayed in the display panel of the present invention;

FIG. 22B is a cross-sectional view taken along the line 22B—22B in FIG. 22A, showing a modification in which the multi-layered dielectric film is formed on one surface of the substrate remote from a liquid crystal layer;

FIG. 23 is a schematic side sectional view of a touch panel according to the present invention;

FIG. 27 is a side view, on an enlarged scale, of the display panel used in the system of FIG. 26, showing the use of a heat radiating plate fitted to the display panel;

FIG. 28A is a diagram showing an embodiment of the projection type display device in which only one display panel is employed to effect a color display;

FIG. 28B is a diagram showing the projection type display device similar to FIG. 28A, but in which no color filter is employed;

FIG. 50 is a view similar to FIG. 48, showing an example in which no polarizing plate is employed;

FIG. 51 is a side view, on an enlarged scale, showing the dichroic prism fitted with display panels;

DETAILED DESCRIPTION OF THE EMBODIMENTS

Figure 3:
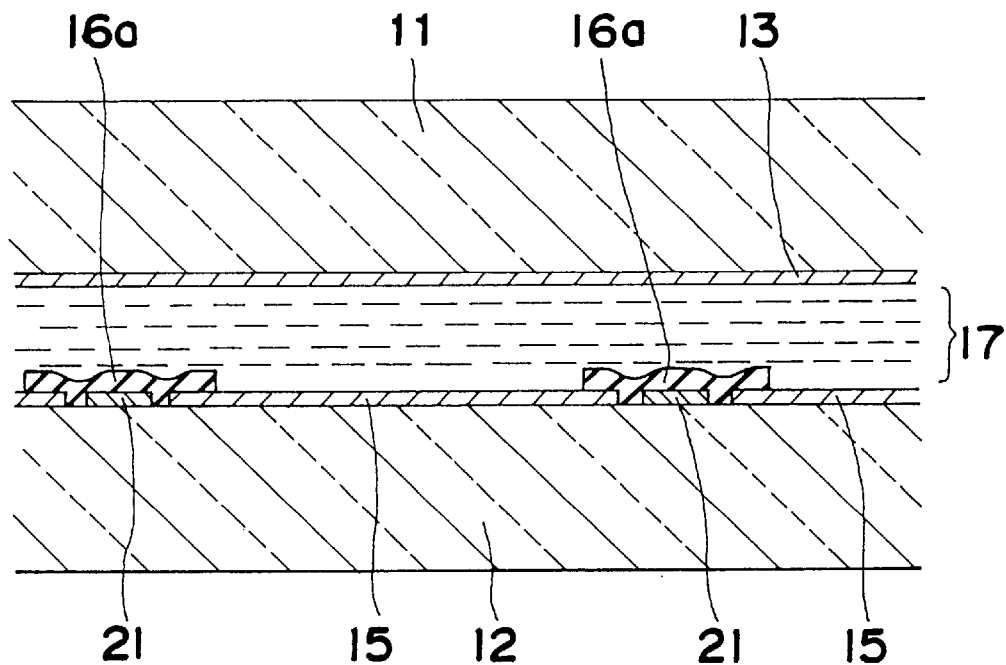
FIG. 3 is a view similar to FIG. 1, showing the display panel employing a multi-layered dielectric film formed on an array substrate.

The display panel according to a first aspect of the present invention is utilized as incorporated in a touch panel as shown in FIG. 23. The display device can be applied in a system in which, when a sensor 236 is depressed with the aid of a pen or a key, a voltage is applied to a light modulating layer 17 of the display panel so that alphanumeric characters can be displayed through the display panel or the like.

The display panel includes a first electrode substrate 214 formed with first electrodes 216, a second electrode substrate 215 formed with second electrodes 217, and a light modulating layer 17 sandwiched between the first and second electrode substrates 214 and 215 for modulating light as a function of change in light scattering. At least one of the first and second electrode substrates 214 and 215 has a multi-layered dielectric film 212 formed thereon in a predetermined pattern.

Preferably, the second electrodes 217 may be reflective electrodes formed with light reflecting films effective to reflect light of a particular wavelength, and the wavelength of light reflected by the light reflecting films 213 is so chosen as to match generally with the wavelength of light reflected by the multi-layered dielectric film 212.

The light modulating layer 17 is in the form of a layer of polymer dispersed liquid crystal material including a light-curable resin component and a nematic liquid crystal component, droplets of the polymer dispersed liquid crystal material having an average particle size thereof, or an average pore size of a polymer network thereof, within the range of 0.5 to 3 µm.

The multi-layered dielectric film 212 is effective to reflect visible light, but to pass UV rays of light therethrough. For this reason, during the manufacture of the display panel, radiation of the UV rays of light from above the multi-layered dielectric film 212 results in curing of the resin component beneath the multi-layered dielectric film 212. Because of this, no uncured resin component is formed and the display panel is therefore substantially free from any change with time.

Also, since the multi-layered dielectric film 212 is visible as colored because it reflects the visible light and the light modulating layer 17 is visible because it scatters light, alphanumeric characters can be displayed if a white area is used to represent the alphanumeric characters or graphic representations. If a light reflecting film 213 capable of reflecting the same light as the particular light reflected by the multi-layered dielectric film 212 is formed on the second electrode substrate 215, the light reflected by the light reflecting film 213 when the light modulating layer 17 becomes white as a result of application of the electric voltage thereto emerges outwardly from the first electrode substrate 214. Since the color of light reflected by the light reflecting film 213 and that by the multi-layered dielectric film 212 match with each other, no alphanumeric character is visible. For these displays, no polarizing plate such as required in the TN liquid crystal display panel is required, making it possible to accomplish a high luminance display.

The display panel according to a second aspect of the present invention is for use in displaying televised images. The display panel for this purpose includes pixel electrodes 15 arranged in a matrix pattern, switching elements 14 such as thin-film transistors or the like connected with the pixel electrodes 15, an array substrate 12 formed with signal lines for transmission of electric signals to the switching elements 14, a counter substrate 11 formed with a counter electrode 13, a polymer dispersed liquid crystal layer 17 sandwiched between the array and counter substrates 12 and 11, and a multi-layered dielectric film 16 formed on at least one of the array and counter substrates 11 and 12 at respective locations aligned with the pixel electrodes 15. The multi-layered is dielectric film 16 is a laminated structure including at least one low refractive dielectric film having an index of refraction not higher than 1.7 and at least one high refractive dielectric film having an index of refraction not lower than 1.8.

Preferably, the low refractive dielectric film is made of $SiO_2$ or $MgF_2$ while the high refractive dielectric film is made of $HfO_2$ or $ZrO_2$. A light shielding film 18 made of synthetic resin may be formed over each switching element 14.

The multi-layered dielectric film 16 reflects specific visible rays of light, but allows passage of ultraviolet rays of light therethrough. During the manufacture of the display panel, it is possible to cure the light curable resin component positioned underneath the multi-layered dielectric film 16 by radiating the UV rays of light from the side of the counter substrate 11 on which the multi-layered dielectric film 16 is formed. Therefore, there is no possibility that some of the light curable resin component left uncured within the liquid crystal layer 17, and the resultant display panel is substantially free from any change with passage of time. The multi-layered dielectric film 16 does not absorb, but reflects the visible light.

For this reason, there is no problem that the visible light is absorbed such as observed with the conventional black matrix which is eventually heated. Since the multi-layered dielectric film 16 reflects the visible light it therefore has a light shielding function as a black matrix. Accordingly, no light leakage from around each pixel electrode 15 occurs, allowing the display panel to accomplish a high quality image display.

This means that, when the display panel of the present invention is used in the projection type display device as a light valve, more effects can be appreciated. 1,000,000 luxes of light is incident upon the light valve. The projection type display device makes use of three light valves for modulating red, blue and green light, respectively. The multi-layered dielectric film 16 employed in each of those light valves satisfactorily reflects the red, blue or green light and does not substantially absorb light. Because of this, neither is the light valve for each color light heated, not does light leakage from around each pixel electrode 15 take place.

The light shielding film made of resin and formed over each thin-film transistor 14 serves to avoid an occurrence of a photo-conduction phenomenon which would occur in each thin-film transistor when light scattered from the light modulating layer 17 impinges upon a semiconductor layer of the respective thin-film transistor 14. Since the light shielding film 18 is made of resin, it exhibits a favorable bondability with the resin component of the light modulating layer 17, thereby avoiding any possibility of undesirable separation between the light modulating layer 17 and the array substrate 12.

Figure 18A:
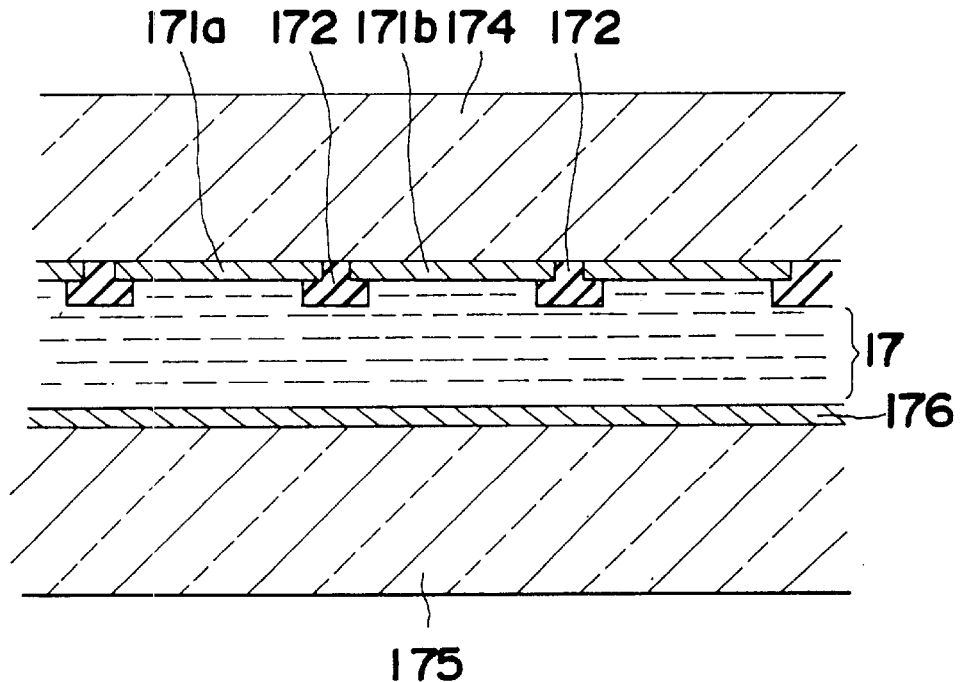
FIG. 18A is a cross-sectional view, showing an application of the present invention to a simple matrix type liquid crystal display panel.
Figure 18B:
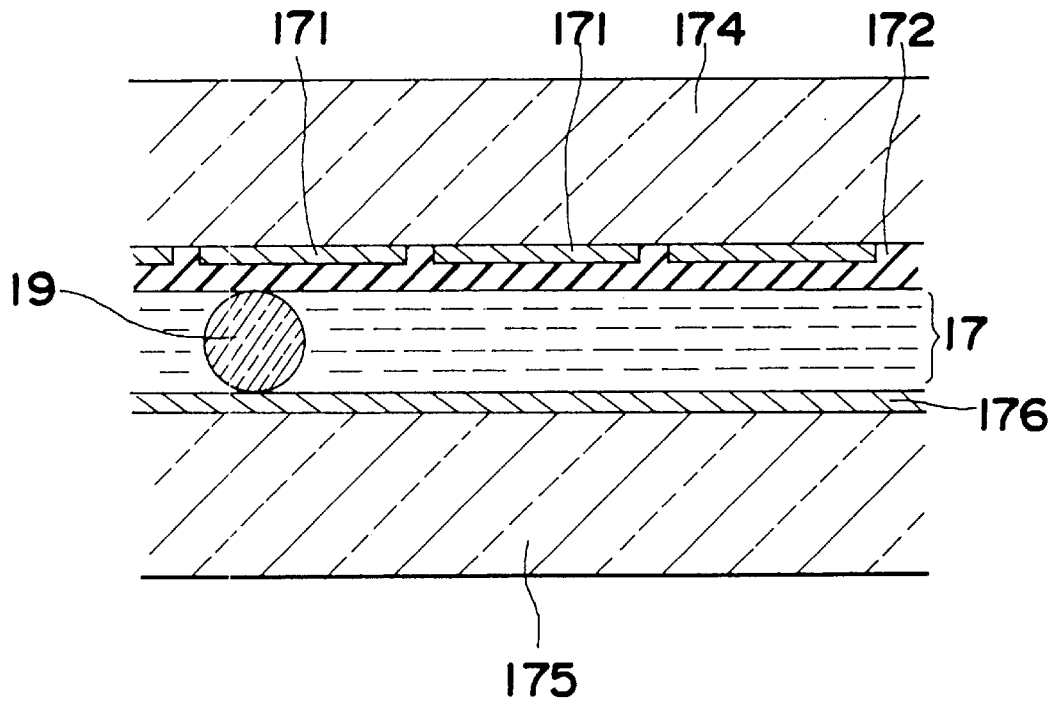
FIG. 18B is a view similar to FIG. 18A, showing an another application.

The display panel according to a third aspect of the present invention is of a construction which comprises, as shown in FIGS. 18A and 18B and other figures, a first substrate 174 formed with a plurality of generally stripe-shaped first electrodes 171, a second substrate 175 formed with a plurality of generally stripe-shaped second electrodes 176, a layer of polymer dispersed liquid crystal material 17 sandwiched between the first and second substrates 174 and 175, and a multi-layered dielectric film 172 formed on at least one of the first and second substrates 174 and 175. The multi-layered dielectric film 172 is in the form of a laminated structure including at least one low refractive dielectric film having an index of refraction not higher than 1.7 and at least one high refractive dielectric film having an index of refraction not lower than 1.8.

Preferably, the low refractive dielectric film is made of $SiO_2$ or $MgF_2$ while the high refractive dielectric film is made of $HfO_2$ or $ZrO_2$.

The display panel according to the third aspect of the present invention pertains to a simple matrix type display panel. The multi-layered dielectric film 172 allows passage of UV rays of light therethrough and, accordingly, during the manufacture thereof, it is possible to cure the light curable resin component positioned underneath the multi-layered dielectric film 172 by radiating the UV rays of light through the multi-layered dielectric film 172. Therefore, there is no possibility that some of the light curable resin component left uncured within the liquid crystal layer, and the resultant display panel does not deteriorate.

The display panel according to a fourth aspect of the present invention is of a structure which comprises, as shown in FIG. 11 and other figures, an array substrate 12 formed with pixel electrodes 15 arranged in a matrix pattern, switching elements 14 connected with the respective pixel electrodes 15 and signal lines 21 for transmission of electric signals to the switching elements 14, a counter substrate 11 formed with a counter electrode 13, a layer of polymer dispersed liquid crystal material 17 sandwiched between the array substrate 12 and the counter substrate 11, and an insulating film 111a and 111b formed over the counter electrode 13 and the pixel electrodes 15 and made of material having a specific resistance higher than that of the polymer dispersed liquid crystal layer 17.

The polymer dispersed liquid crystal layer 17 includes a light curable resin component and a nematic liquid crystal component and is characterized in that the average particle size of droplets of, or the average pore size of the polymer network of, the polymer dispersed liquid crystal material is within the range of 0.5 to 3 $\mu$m.

As compared with the TN liquid crystal material, the polymer dispersed liquid crystal material has a relatively low specific resistance. For this reason, there is a problem in that the voltage retentivity is not satisfactory. The insufficient voltage retentivity poses a problem in that the liquid crystal layer 17 does not transform sufficiently to a light transmissive state and, therefore, the merit of use of the polymer dispersed liquid crystal material effective to modulate light with no polarizing plate used is negated, making it impossible to accomplish a high luminance, high contrast display.

In other words, if the voltage retentivity is not sufficient, charge applied to the pixel electrodes 15 cannot be retained for a length of time corresponding to one field period (1/30 or 1/60 second) and the liquid crystal layer will not transform sufficiently to the light transmissive state.

In the practice of the present invention, the insulating film 111a and 111b is formed over the counter substrate 11 and the array substrate 12 to allow the voltage to be retained by the insulating film 111a and 111b. Because of this, even though the liquid crystal layer 17 has a relatively low specific resistance, the charge can be sufficiently retained for the length of time corresponding to one field period provided that the specific resistance of the insulating film 111a and 111b is sufficiently high.

Also, adhesion between the polymer dispersed liquid crystal layer 17 and the counter electrode 13 is not satisfactory and separation between the polymer dispersed liquid crystal layer and the electrode 13 tends to occur as a result of heat shocks. The display panel of the present invention makes use of the insulating film 111b which serves as a buffer film between the polymer dispersed liquid crystal layer 17 and the electrode 13 and, therefore, no separation therebetween occurs.

Figure 8:
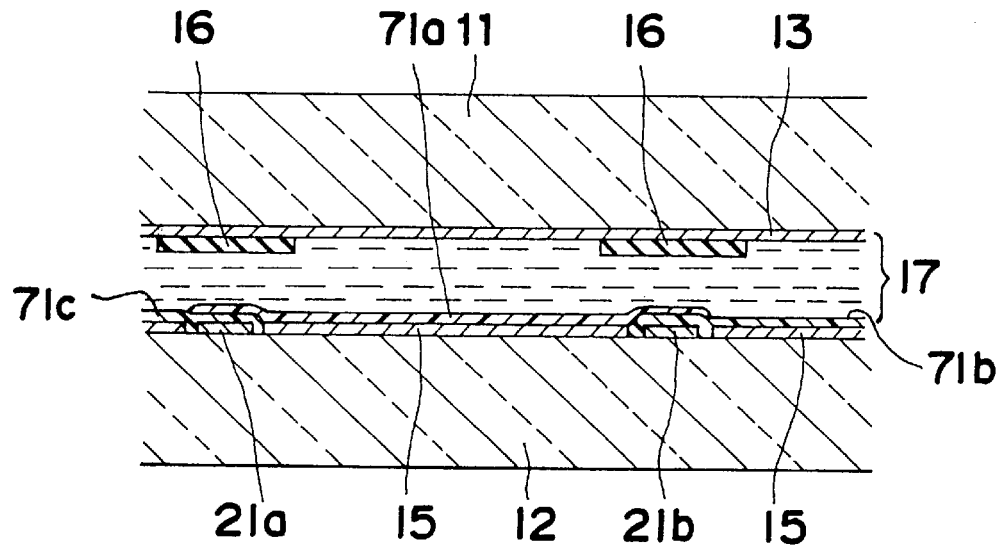
FIG. 8 is a view similar to FIG. 5B, showing the color filters formed over signal lines.
Figure 14:
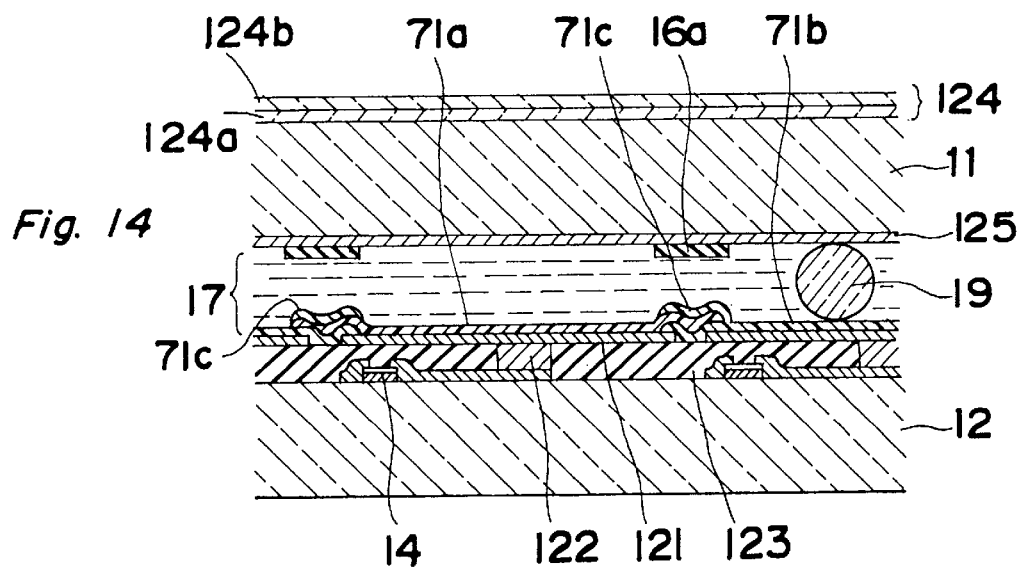
FIG. 14 is a view similar to FIG. 12, showing formation of color filters over the anti-reflection film to enable a single display panel to accomplish a color display.

The display panel according to a fifth aspect of the present invention is of structure which, as shown in FIGS. 8 and 14 and other figures, includes an array substrate 12 formed with pixel electrodes 15 arranged in a matrix pattern, switching elements 14 connected with the respective pixel electrodes 15 and signal lines 21 for transmission of electric signals to the switching elements 14, a counter substrate 11 formed with a counter electrode 13, a liquid crystal layer 17 sandwiched between the counter and array substrates 11 and 12, and a color filter 71 formed over each pixel electrode and signal line 21.

Preferably, the liquid crystal layer 17 is employed in the form of a layer of polymer dispersed liquid crystal material. This polymer dispersed liquid crystal material includes a light curable resin component and a nematic liquid crystal component, wherein the average particle size of droplets of, or the average pore size of the polymer network of, the polymer dispersed liquid crystal material is within the range of 0.5 to 3 $\mu$m.

The color filter 71 is made of resinous material. The relative dielectric constant of the resinous material is lower than that of the liquid crystal material used in the layer 17. On the other hand, since a video signal is applied to the signal lines 21 at all times, lines of electric force which tend to disturb the direction of orientation of the liquid crystal layer 17 are developed by the video signal between the signal lines 21 and the counter electrode 13. Material having a relatively low relative dielectric constant has such a property that the lines of electric force hardly pass therethrough. In the display panel of the present invention, the color filter 71 is used to cover the signal lines to shield the lines of electric force and, accordingly, it is possible to avoid passage of the lines of electric force through the liquid crystal layer 17.

If color filters of different color are laminated among the pixel electrodes, they serves as a light shielding film. Accordingly, if the structure shown in FIG. 14 is employed, no light enters from the reflecting electrodes 121 into the insulating layer 123 thereby avoiding the occurrence of the photo-conduction phenomenon of the thin-film transistors 14.

The display panel according to a sixth aspect of the present invention is of a structure which comprises, as shown in FIGS. 4, 38, 39A and 39B and other figures, an array substrate 12 formed with pixel electrodes 15 arranged in a matrix pattern, a counter substrate 11 formed with a counter electrode 13, a polymer dispersed liquid crystal layer 17 sandwiched between the array substrate 12 and the counter substrate 11, and a low dielectric film 16a or a low dielectric column made of material having a relative dielectric constant lower than that of the polymer dispersed liquid crystal material forming the polymer dispersed liquid crystal layer 17.

The polymer dispersed liquid crystal material includes a light curable resin component and a nematic liquid crystal component, and is characterized in that the average particle size of droplets of, or the average pore size of the polymer network of, the polymer dispersed liquid crystal material is within the range of 0.5 to 3 $\mu$m. Preferably, the low dielectric film or column may contain dyes capable of absorbing light modulated by the liquid crystal layer.

Material forming the low dielectric film 16a or column has a relative dielectric constant lower than that of the liquid crystal material forming the liquid crystal layer 17. On the other hand, since a video signal is applied to the signal lines 21 at all times, lines of electric force, which tend to disturb the direction of orientation of the liquid crystal layer 17, are developed by the video signal between the signal lines 21 and the counter electrode 13. Material having a relatively low relative dielectric constant has such a property that the lines of electric force hardly pass therethrough. In the display panel of the present invention, the signal lines 21 or portions between each neighboring reflecting electrodes are covered by the low dielectric material. The low dielectric material is effective to shield the lines of electric force and, accordingly, it is possible to avoid passage of the lines of electric force through the liquid crystal layer 17 and also to avoid a transverse electric field among the reflecting electrodes.

Figure 12:
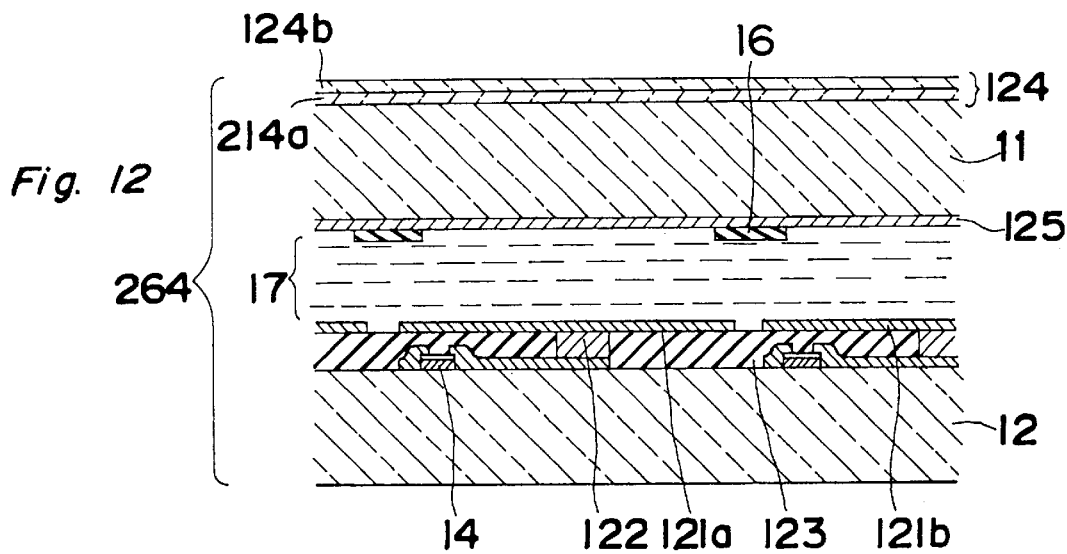
FIG. 12 is a view similar to FIG. 5B, showing an embodiment of the display panel of a reflective type in which color filters are employed and also a double layered structure of anti-reflection films is employed.

The display panel according to a seventh aspect of the present invention is of a construction which comprises, as shown in FIG. 12 and other figures, an array substrate 12 formed with reflecting electrodes 121 arranged in a matrix pattern, switching elements 14 connected with the reflecting electrodes 121 and signal lines 21 for transmission of signals to the switching elements 14, a counter substrate 11 formed with a counter electrode 13, a polymer dispersed liquid crystal layer 17 sandwiched between the array substrate 12 and the counter substrate 11, and a multi-layered dielectric film 16 formed on at least one of portions among the reflecting electrodes and portions of the counter electrode 13 facing those portions among the reflecting electrodes. The multi-layered dielectric film 16 is of a laminated structure including a low refractive dielectric film having an index of refraction not higher than 1.7 and a high refractive dielectric film having an index of refraction not lower than 1.8.

Preferably the low refractive dielectric film is made of $SiO_2$ or $MgF_2$ while the high refractive dielectric film is made of $HfO_2$ or $ZrO_2$. Each switching element 14 is disposed between the array substrate 12 and the reflecting electrode 121 (a layer beneath the reflecting electrode 121).

In a reflection type, an electromagnetic coupling takes place between each neighboring reflecting electrodes to develop lines of electric force therebetween. Due to the generation of the lines of electric force, a portion of the liquid crystal layer 17 aligned with a portion between each neighboring reflecting electrode 11 is transformed into a transparent state. Since the transparent condition is visible, it often constitutes a noise to the image being displayed. However, since the present invention makes use of the multi-layered dielectric film 16 which functions as a black matrix, no noise to the image is visible even though the noise to the image is generated. Also, since the multi-layered dielectric film 16 passes UV rays of light therethrough, the resin component of the liquid crystal layer can be completely cured during the manufacture of the display panel.

The display panels of the present invention can be incorporated into various display devices. One such display device according to the present invention is of a structure which comprises, as shown in FIG. 23, a display panel 218 including a first electrode substrate 214 formed with a first electrode 216, a second electrode substrate 215 formed with a second electrode 217, a light modulating layer 17 sandwiched between the first electrode substrate 214 and the second electrode substrate 215 and operable to modulate light as a function of change in scattering of light, and a multi-layered dielectric film 212 patterned in a predetermined shape on at least one of the first and second electrode substrates 214 and 215, a signal generating means 233, a switching means 232 and a detecting means 236.

The signal generating means 233 is electrically connected through the switching means 232 with at least one of the first and second electrodes 216 and 217 of the display panel 218, and the switching means 232 is operable in response to a signal from the detecting means 237 to switch over between a first state, in which the signal from the signal generating means 233 is applied to said electrode, and a second state in which no signal from the signal generating means 233 is applied.

Preferably, the switching means 232 is so structured that, in response to the signal from the detecting means 237, the first and second states are selectively switched.

The display device according to the first aspect of the present invention referred to above is of a structure including the display panel according to the first aspect of the present invention, the detecting means 237 and others. Display on the display panel 218 varies depending on whether the switch 236 is switched on or off.

Figure 32:
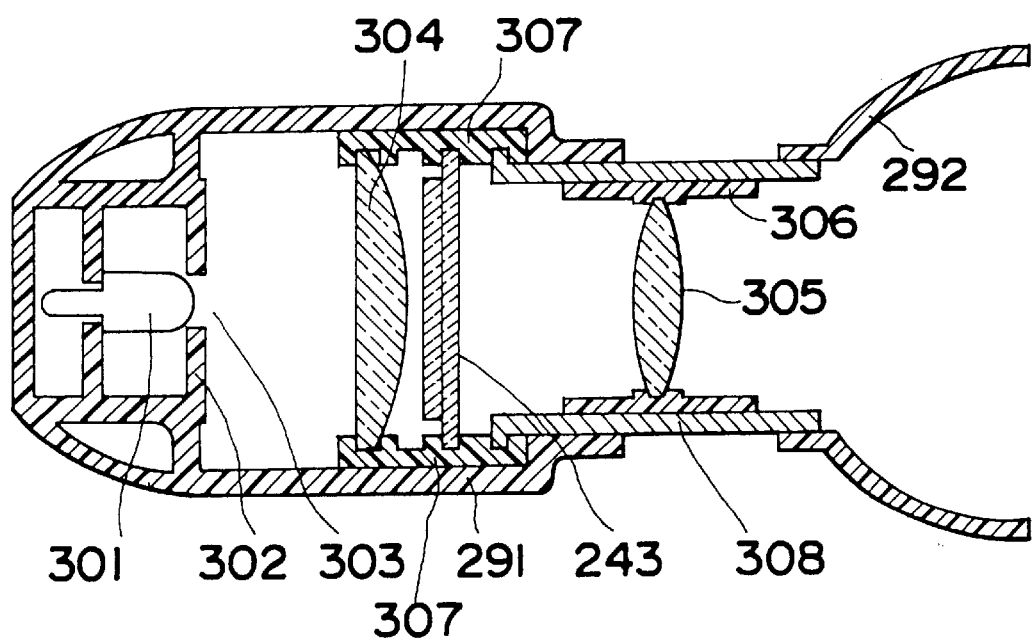

A second display device according to the present invention is of a construction in which, as shown in FIG. 32 and other figures, the display panel and the other components of the present invention can be used as a light modulating means 243. The display device of FIG. 32 includes a light generating means 301 and a light collecting means 304 for converting the rays of light from the light generating means 301 into substantially parallel rays of light. The display panel 243 is operable to modulate the light emerging from the light collecting means 304 to form an optical image. The light collecting means 304 is so disposed that the light from the light generating means 301 enters an effective area of the light collecting means 304 and light travelling straight through the light modulating means 243 reaches the pupils of the eyes of a viewer.

A light emitting area of the light generating means 301 suffices to be extremely small in size and, therefore, the amount of electric power consumed by the light generating means 301 is extremely small. Also, since the light modulating means 243 is illuminated by the light from the light generating means 301, which has been converted into the parallel light by the light collecting means 304, the pattern of distribution of light on the display panel 243 exhibits a maximum intensity at a center portion. The intensity progressively decreases as the distance from the center portion of the display panel 243 increases in a radially outward direction, with no image of the light source displayed, thereby accomplishing a favorable display.

Figure 24:
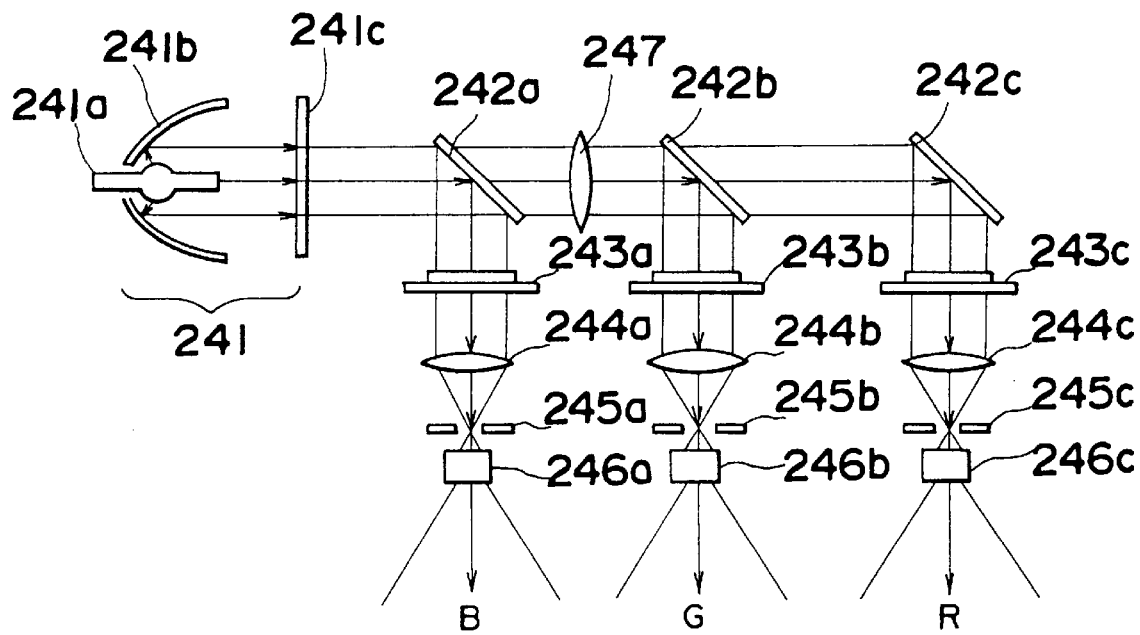
FIG. 24 is a diagram showing a first embodiment of a projection type display device according to the present invention.

A third display device according to the present invention, as shown in FIG. 24 and other figures, makes use of the display panel according to the third aspect of the present invention as a light valve. The third display device includes a light generating means 241, a color separating optical system 242a–242c for separating rays of light emitted from the light generating means 241 into blue, green and red optical paths, and a projecting means for projecting the rays of light modulated by display panels 243a–243c.

The display panel 243a is for modulating the blue light, the display panel 243b is for modulating the green light and the display panel 243c is for modulating the red light. Optical images formed on the display panels 243a–243c are superimposed with each other and are then projected by the projecting means.

To accomplish light modulation, the display panel of the present invention does not require the use of any polarizing plate. Accordingly, the display device of the present invention, which uses such a display panel, is effective to accomplish a high luminance display. Also, since the multi-layered dielectric film 16 employed in each of the display panels 243 is effective to reflect light incident upon the respective display panel 243, functioning as a black matrix, no light leakage from around each pixel electrode 15 takes place. For this reason, a high quality image display can be accomplished.

Figure 26:
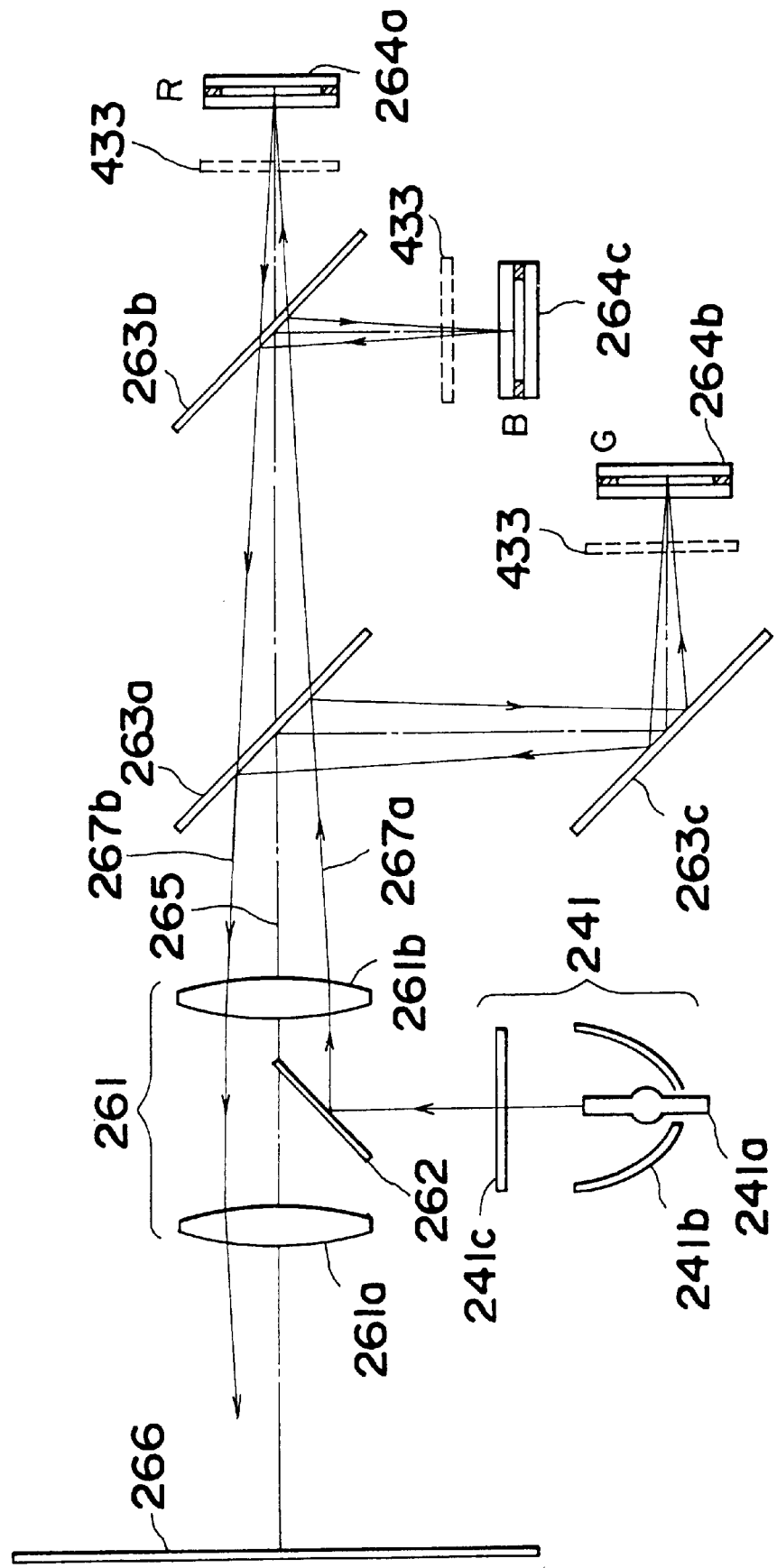
FIG. 26 is a diagram showing an embodiment of the projection type display device in which the display panel of a reflective type is used as a light valve.

A fourth display device according to the present invention, as shown in FIG. 26 and other figures, makes use of the reflective type display panel of the present invention as a light valve. The fourth display device includes a single light generating means 241, and a color separating optical system 263a–263c, for separating the rays of light emitted from the light generating means 241 into blue, green and red optical paths. The color separating optical system 263a–263c has a dual function of separating the colors and of combining these colors modulated by the display panels 243.

The display panel of the present invention does not require the use of any polarizing plate. Accordingly, the display device of the present invention is effective to accomplish a high luminance display. Also, since the multi-layered dielectric film 16 employed in each of the display panels 243 is effective to reflect light incident upon the respective display panel 243, functioning as a black matrix, no light leakage from around each pixel electrode 121 takes place. For this reason, a high quality image display can be accomplished.

Figure 44:
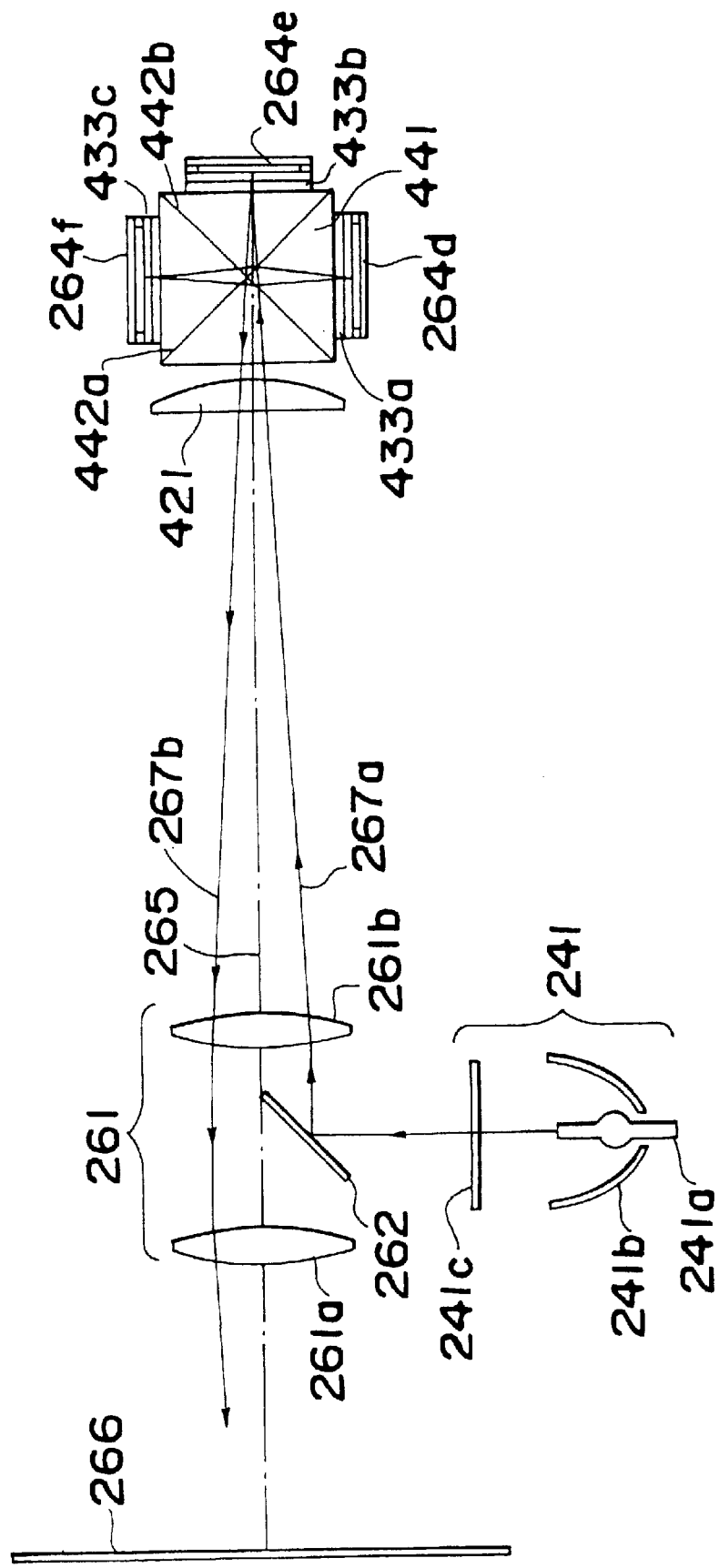
FIG. 44 is a diagram showing a modification of the system shown in FIG. 42, in which a dichroic prism is employed in place of dichroic mirrors.

A fifth display device according to the present invention is of a construction which comprises, as shown in FIG. 44 and other figures, a reflective light modulating means 264d–264f for modulating light as a function of change in light scattering, a light generating means 241, a light separating means 441 for separating rays of light emitted from the light generating means 241 into a plurality of optical paths corresponding to different wavelength regions of light, a wavelength limiting filter 433 disposed on an optical path between the light modulating means 264 and the light separating means 441, and a projecting means 261 for projecting the light which has been modulated by the light modulating means 264d–264f. An ineffective region of the light separating means 441 is formed with a light absorbing film 432.

Rays of light reflected from a light separating plane 442 of, for example, the light separating means 441 are known to be such that S-polarized light exhibits a band rather than P-polarized light. In the display device of the present invention, the wavelength limiting filter 433 limits the transmitted light to a band of one of the P-polarized light and the S-polarized light which has a narrow band. Accordingly, the purity of color of the displayed image, that is, the color reproducibility, can be increased.

Figure 29A:
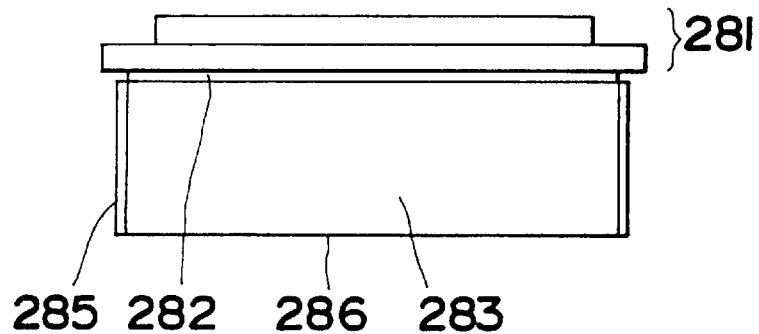
FIG. 29A is a side view of the display panel to which a transparent substrate is fitted.

Also, the light modulating means 264d–264f is pasted to the light separating means 441, and the ineffective region of the light separating means 441 has the light absorbing film 432 deposited thereon. This structure is functionally analogous to the structure wherein, as shown in FIGS. 29A and other figures, the display panel 243 is optically coupled with the transparent substrate 283 with the light absorbing film 285 painted on an ineffective region of the transparent substrate 283. Accordingly, rays of light scattered by the light modulating means 264 are incident on and almost absorbed by the light absorbing film 432 and, therefore, there is no possibility that the scattered light may return to the light modulating layer 17 to induce a secondary scattering. For this reason, a display contrast can be increased.

Figure 43:
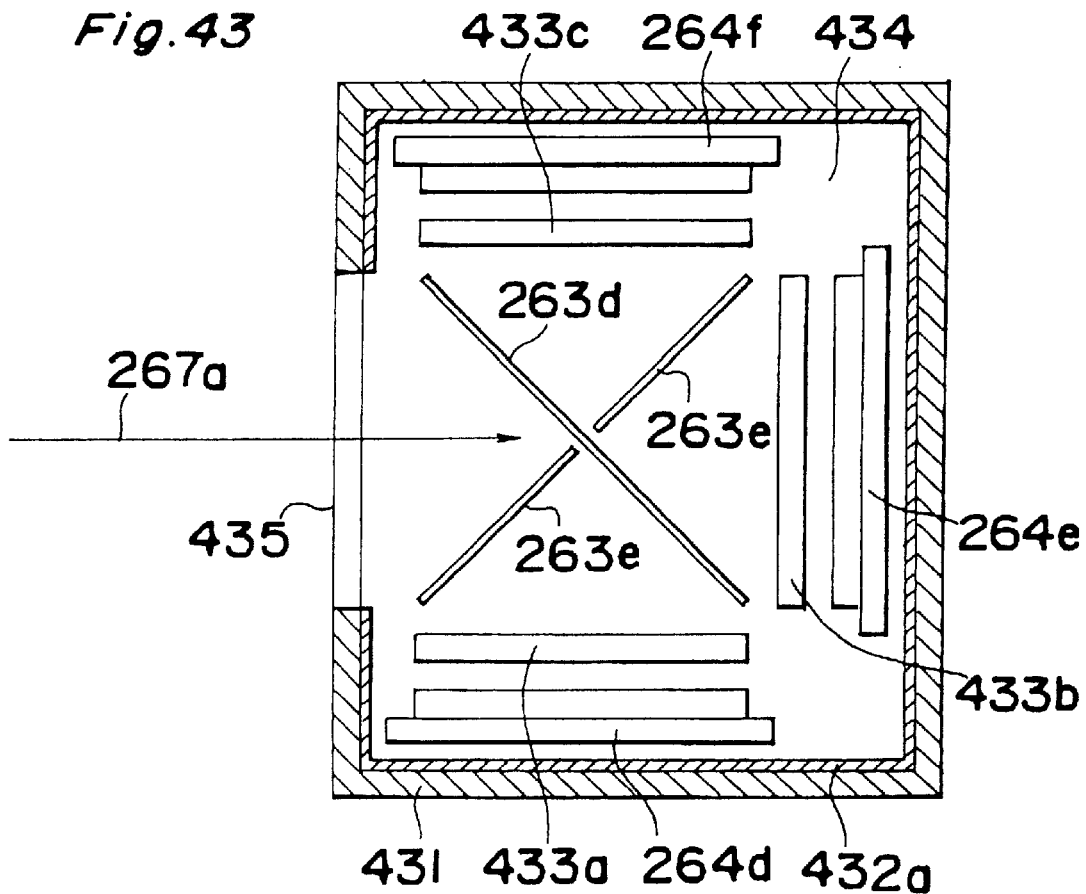
FIG. 43 is a side sectional view, on an enlarged scale, showing a different assembly of display panels.

A sixth display device according to the present invention is of a structure which comprises, as shown in FIG. 43 and other figures, a reflective light modulating means 264d–264f for modulating light as a function of change in light scattering, a light generating means 241, a light separating means 263d–263e having a light separating plane formed therein and operable to separate rays of light emitted from the light generating means 241 into a plurality of optical paths of different wavelength regions, a housing means 431 for housing both the light modulating means 264d–264f and the light separating means 263d–263e, a quantity of liquid or gel 434 filled in a space inside the housing means 431, a projecting means 261 for projecting the light which has been modulated by the light modulating means, and a light absorbing means 432a formed or arranged on an inner or outer surface of the housing means 431.

If the foregoing structure is employed, no optical coupling is needed between the wavelength limiting filter 433a–433c and the light modulating means 264d–264f. The light absorbing film 432a functions as a light absorbing film 432 shown in FIG. 45. Also, since the quantity of the liquid or gel 432 has a function of cooling the light modulating mean@ 264, cooling of the light modulating means 264 is easily accomplished.

Figure 49:
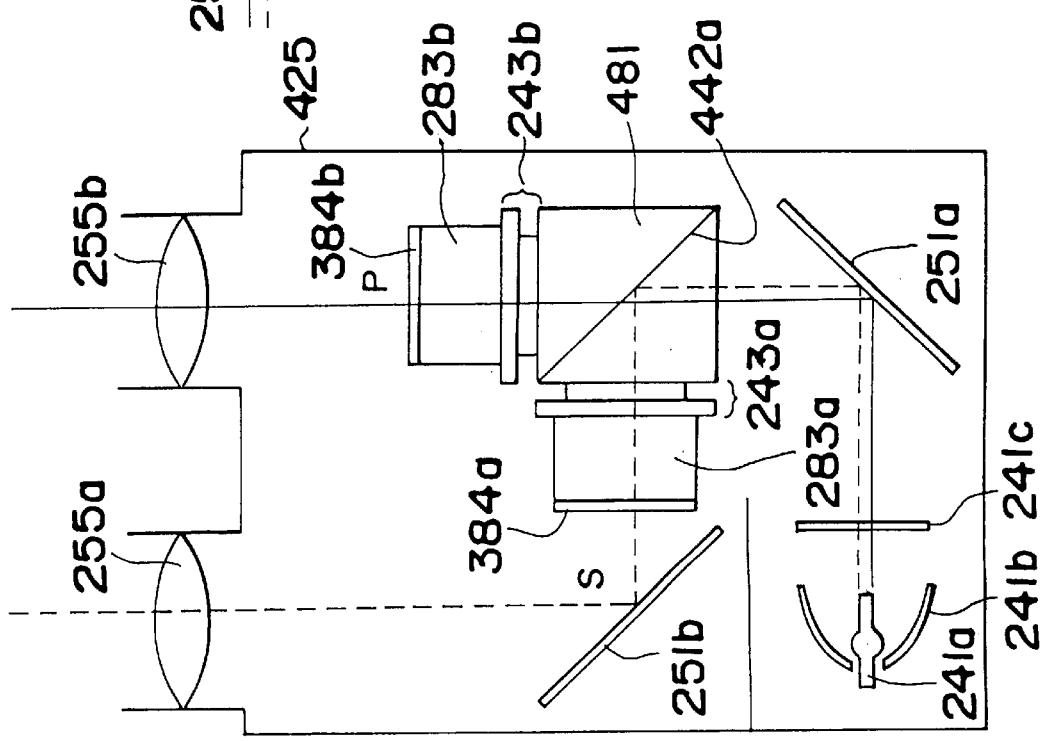
FIG. 49 is a view similar to FIG. 48, showing an example in which two PBS prisms are employed.

A seventh display device according to the present invention comprises, as shown in FIG. 49 and other figures, a discharge lamp 241a such as, for example, a metal halide lamp, PBS 481a for separating white rays of light emitted from the discharge lamp 241a into two optical paths, first and second display panels 243a–243b coupled with the PBS 481b through a light coupling layer 282a, a transparent substrate 283a–283b connected with a light exit plane of the display panel 243 through the light coupling layer 282b and others, and a projecting means 255 for superimposing and projecting a first optical image on the first display panel and a second optical image on the second display panel at the substantially same location.

The display panels have three color filters corresponding to the three primary colors of red, green and blue, and the first and second optical images on the respective first and second display panels 243a–243b are projected on the screen displaced a distance corresponding to the size of one pixel with the two colors mixed on the screen according to the-additive technique. Preferably, video signals applied to two pixels at which the additive color mixing takes place have their polarities opposite to each other.

Thus, when the first and second optical images are projected displaced a distance of one pixel from each other, the additive color mixing can be achieved, and if sampling of the video signals in the two display panels is properly carried out to suit to the additive color mixing, the resolution can be increased. Also, if the respective polarities of the two pixels at which the first and second optical images are superimposed with each other are chosen to be opposite to each other, any possible occurrence of flickering can be avoided. Yet, the use of the transparent substrate 283 and the PBS 481 is effective to avoid return of the light, once scattered by the liquid crystal layer 17, back to the liquid crystal layer 17, thereby increasing the display contrast.

An eighth display device according to the present invention comprises, as shown in FIG. 28B, a light generating means 241a, an optical path separating means 242a–242c for separating the rays of light emitted from the light generating means into red, green and blue color optical paths, a light modulating means 243 for modulating light travelling through each of the optical paths as a function of change in light scattering, a micro-lens array 601 disposed on an incident side of the light modulating means 243, and a projecting means 255 for projecting the light modulated by the light modulating means 243, the red, green and blue color light being incident on the light modulating means 243 in correspondence with the pixels 15.

With the foregoing structure, the efficiency of utilization of light increases and a high luminance display is advantageously accomplished. Also, the polymer dispersed liquid crystal display panel 243 requires radiation of the UV rays of light to the liquid crystal layer 17 to phase separate the liquid crystal component and the resin component from each other during the manufacture. if the color filters 71 are formed in the liquid crystal display panel 243, the color filters 71 will not pass the UV rays of light therethrough and, therefore, the intended phase separation of the liquid crystal layer is difficult to achieve. However, with the structure shown in FIG. 2813, the liquid crystal display panel 243 can easily be manufactured since no color filter 71 is employed. Also, since no color filter 71 is needed, the manufacturing cost of the display panel 243 can be reduced.

Hereinafter, specific examples of the liquid crystal display panel and the liquid crystal display device will be described with reference to the specific drawings.

Referring now to FIG. 1, there is schematically shown a cross-sectional representation of a display panel according to a first embodiment of the present invention. The display panel shown therein comprises counter and array substrates 11 and 12 each made of glass and having a thickness of 1.1 mm and an index of refraction n of 1.52. Pixel electrodes 15 made of ITO, thin-film transistors 14 as switching elements for applying signals to the pixel electrodes 15, and various signal lines (not shown) are formed on the array substrate 12. Although the thin-film transistors 14 have been shown as employed for the switching elements, ring diodes, two-terminal elements such as, for example, MIM, thyristors or varicaps may be employed in place of the thin-film transistors.

Also, throughout the specification and the claims, the term "substrate" (such as the one referenced by 11, 12, 214 and 215) should not be construed as limiting to the substrate made of glass, and a substrate made of synthetic resin such as, for example, acrylic resin or polycarbonate resin, may be equally employed in the practice of the present invention. Moreover, the term in question should be understood as including not only a plate, but also a film or sheet.

Each of the thin-film transistors 14 is formed with a light shielding film 18. This light shielding film 18 mainly serves to avoid entry of light, scattered by a liquid crystal layer 17, into a semiconductor layer of the respective thin-film transistor 14. The thin-film transistor will not assume an OFF state, or a photo-conduction phenomenon in which the OFF resistance of the thin-film transistor is lowered will occur, if light enters the semiconductor layer. The light shielding film may be made of acrylic resin dispersed with carbon. Material for the light shielding film may contain various dyes (red, green, blue, cyan, magenta and yellow pigments) properly mixed therein. Alternatively, it may be formed by forming an insulating thin-film of $SiO_2$ or the like over the thin-film transistor and then patterning a metallic thin-film over the insulating thin-film to thereby form the light shielding film. Each of the thin-film transistors 14 is preferably of a stagger structure in which the semiconductor layer is formed underneath the gate.

It is to be noted that, in the polymer dispersed liquid crystal display panel, the use is preferred of a polysilicon technique to minimize occurrence of the photo-conduction phenomenon. The polysilicon technique includes a high-temperature polysilicon technique which is a semiconductor technology used in making standard integrated circuits, and a low-temperature polysilicon technique in which an amorphous silicon film is formed followed by crystallization of such film. In particular, the use of the low-temperature polysilicon technique is desirable since a drive circuit can be built in and the display panel can be made at a low price. The thin-film transistor so formed by the use of the above discussed technique is advantageous in that the photo-conduction phenomenon does not occur so often as in the thin-film transistor formed by the use of an amorphous silicon technique. For this reason, it is suited for a polymer dispersed liquid crystal display panel which modulates light by scattering and transmitting light.

Where the light shielding film 18 is formed of resin, the resin may contain any material which has a high electric insulation for a light absorbing material and which does not adversely affect the liquid crystal layer 17. By way of example, the resin may contain black dyes or pigments dispersed therein. As is the case with a color filter, gelatine or casein may be dyed with acidic dyestuff. Examples of the black dyes may include fluoran or colored black prepared by mixing green and red dyes.

While the above discussed material is for black color, it may not be always limited thereto so long as the display panel of the present invention is used as a light valve in a projection type display device. The projection type display device requires the use of three display panels for modulating red, green and blue light, respectively. However, the light shielding film 18 used in the red-light modulating display panel must be of a nature capable of absorbing the red light. In other words, light absorbing material for use in preparing a color filter may be employed if it is modified so as to provide a characteristic effective to absorb light of a particular wavelength. As is the case with the black light absorbing material, material prepared by dying natural resin with dyes or dispersing dyes into synthetic resin may be employed. Dyes may be selected one or a mixture from a relatively wide range, as compared with that of the black dyes, including azo dyes, anthraquinone dyes, phthalocyanine pigments and triphenylmethane pigments. Removal of alkaline metal from the pigments or dyes is effective to remove inclusion of impurities in the light absorbing film.

Black dies often contain some materials which adversely affect the liquid crystal layer 17. For this reason, the use of black dyes is not recommended and, instead thereof, the use of the dye capable of absorbing the particular wavelength as hereinabove discussed is preferred in the composition of the eight absorbing thin-film.

It can be easily employed in the projection type display device in which the three display panels associated with the red, blue and green light are employed as respective light valves. In other words, it is recommended that the light absorbing thin-film 18 employed in each of those liquid crystal display panels contains a particular dye complemental in color to the color of light to be modulated. The complemental color is that, if the light is blue, the yellow dye is employed. The light absorbing thin-film colored in yellow can absorb the blue light. Accordingly, so far as the display panel used to modulate the blue light is concerned, a yellow light shielding film 18 is formed in the associated display panel.

If the light shielding film 18 is made of resin, adhesion between the liquid crystal layer 17 and the array substrate 12 can be improved because the polymer dispersed liquid crystal layer 17 contains the resin component. Separation is apt to occur from the liquid crystal layer 17, in particular from an ITO film which forms the pixel electrode 15. If the light shielding film 18 made of the resin is formed over each thin-film transistor 14 or the like, the light shielding film 18 serves as a buffer layer to minimize the separation. In view of this, the use of the light shielding film made of the resin is preferred.

The polymer dispersed liquid crystal layer 17 is sandwiched between the counter electrode 13 and the pixel electrodes 15. The liquid crystal material which may be employed in the present invention includes nematic liquid crystal, smectic liquid crystal or cholesteric liquid crystal, which may or may not contain one or more of liquid crystalline compounds and/or material other than the liquid crystalline compounds.

Of the various liquid crystal materials referred to above, cyanobiphenyl nematic liquid crystal having a relatively large difference between the extraordinary refractive index $n_e$ and the ordinary refractive index $n_o$, or fluorine or chlorine nematic liquid crystal that is relatively stable relative to aging is preferred. The use of the chloric nematic liquid crystal is more preferred because of a favorable light scattering characteristic and a high stability in aging.

The polymer matrix material may be a transparent polymer such as, for example, a light curable resin because it can be easily manufactured and has an excellent property in phase separation with the liquid crystal material used. Examples of the light curable resin include UV-curable acrylic resin and the use of the acrylic resin containing acrylic monomer or acrylic oligorner capable of undergoing polymerization when radiated by UV rays of light is preferred. Of them, the use of the light curable acrylic resin having a fluorine group is more preferred because with it the light modulating layer 17 having an excellent light scattering property can be manufactured and because it hardly changes with time.

The liquid crystal material is preferably of a kind having an ordinary refractive index $n_o$ within the range of 1.49 to 1.54 and, more preferably, within the range of 1.50 to 1.53. Also, the use of the liquid crystal material having a difference $\Delta n$ in refractive index within the range of 0.15 to 0.30 is recommended. If the refractive index $n_o$ and the index difference $\Delta n$ are greater than the upper limit, the resistance to heat and also to light will be reduced, whereas if the refractive index $n_o$ and the index difference $\Delta n$ are greater than the lower limit, the light scattering property will be lowered and the display contrast will become insufficient though the resistance to heat and also to light may be improved.

In view of the foregoing, the light modulating layer 17 is preferably made of the chloric nematic liquid crystal having an ordinary refractive index $n_o$ within the range of 1.50 to 1.53 and an index difference $\Delta n$ within the range of 0.15 to 0.30 and the light curable acrylic resin having a fluorine group.

Examples of the polymer forming monomer include 2-ethylhexyl acrylate, 2-hydroxyethyl acrylate, neopentyl glycol doacrylate, hexanediol diacrylate, diethylene glycol diacrylate, tripropylene glycol diacrylate, polyethylene glycol diacrylate, trimethylolpropane triacrylate, pentaerythritol acrylate, and others.

Examples of the oligomer or prepolymer include polyester acrylate, epoxy acrylate, polyurethane acrylate and others.

Also, to facilitate polymerization, a polymerization initiator may be added, examples of which include 2-hydroxy-2-methyl-1-phenylpropane-1-Å ("DAROCURE 1173" available from Merc), 1-(4-isopropylphenyl)-2-hydroxy-2-methylpropane-1-Å ("DAROCURE 1116" available from Merc, 1-hydroxy clohexyl phenylketone ("ILGACURE 184" available from Ciba-Geigy, Ltd.), benzil methylketal ("ILGACURE 651" available from Ciba-Geigy, Ltd.) and others. If desired, one or more of a chain transfer agent, a sensitizer, dyes, cross-linking agent may be employed.

It is to be noted that the refractive index $n_p$ of the resin component when the latter is cured and the ordinary refractive index $n_o$ of the liquid crystal material must be matched with each other. When an electric field is applied to the liquid crystal layer, liquid crystal molecules are oriented in one direction with the refractive index of the liquid crystal layer attaining a value $n_o$. Accordingly, it matches with the refractive index $n_p$ of the resin and the liquid crystal layer is brought in a light transmitting state. if the difference between the refractive indexes $n_p$ and $n_o$ is large, application of a voltage to the liquid crystal layer will not result in the liquid crystal layer assuming the light transmissive state, accompanied by reduction in display luminance. Therefore, the difference between the refractive indexes $n_p$ and $n_o$ is preferably not greater than 0.1 and, more preferably, not greater than 0.05.

Although the proportion of the liquid crystal material in the polymer dispersed liquid crystal layer is not specified herein, 20 to 90 wt % is generally preferred, and 50 to 85 wt % is more preferred. If the proportion is not greater than 20 wt %, the amount of the liquid crystal droplets is small, resulting in a poor scattering effect. On the other hand, if the proportion is not smaller than 90 wt %, the polymer and the liquid crystal material tend to separate from each other with the interface reduced accompanied by reduction in scattering property. The structure of the polymer dispersed liquid crystal layer varies with the percentage of the liquid crystal material, and if the proportion is not greater than about 50 wt %, the liquid crystal droplets exist independent from each other, but if it is not smaller than 50 wt %, a continuous layer will be formed in which the polymer and the liquid crystal material are well mixed together.

The average particle size of the liquid crystal droplets, or the average pore size of the polymer network, is preferably within the range of 0.5 to 3.0 $\mu$m and, more preferably, within the range of 0.8 to 2 $\mu$m. Where the light to be modulated by the polymer dispersed liquid crystal display panel is of a short wavelength (for example, blue light), the average particle or pore size referred to above is chosen to be small, but where the light to be modulated by the polymer dispersed liquid crystal display panel is of a long wavelength (for example, red light), it is chosen to be great. If the average particle size of the liquid crystal droplets or the average pore size of the polymer network is great, the scattering characteristic will be lowered though the voltage required to bring the display panel in the light transmissive state may be low. On the other hand, if the average particle or pore size is small, a higher voltage will be required to bring the display panel in the eight transmissive state though the scattering characteristic may be improved.

Where the polymer dispersed liquid crystal material is employed in the display panel of the present invention, the average particle size of the liquid crystal droplets or the average pore size of the polymer network in the liquid crystal display panel used to modulate the blue light is smaller than that in the liquid crystal display panel used to modulate the red light.

Figure 34A:
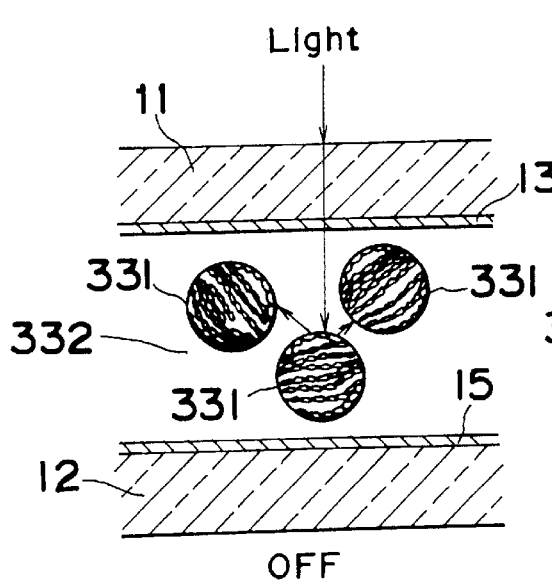
FIGS. 34A and 34B are schematic sectional representations of the display panel in OFF and ON states, respectively, showing different behaviors of a polymer dispersed liquid crystal material employed therein.
Figure 34B:
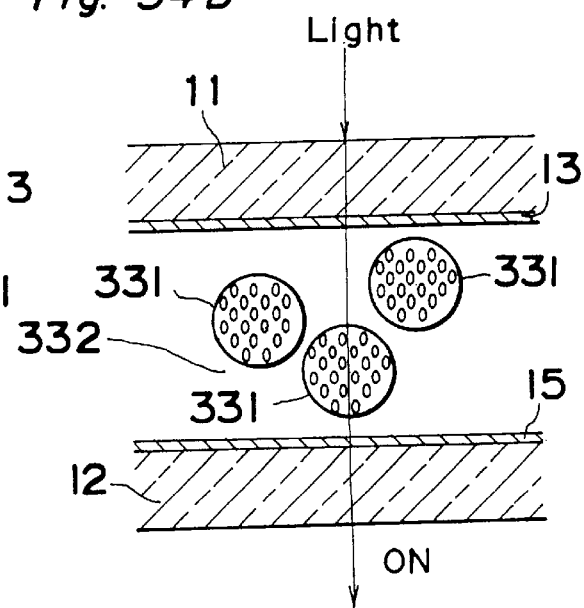

The polymer dispersed liquid crystal material herein referred to should be understood as including a resin in which liquid crystal droplets are dispersed as shown in FIGS. 34A and 34B, a spongy resin (polymer network) having a multiplicity of interstices filled up by liquid crystal material, such a laminar resin as disclosed in the Japanese Laid-open Patent Publications No. 6-208126 and No. 6-202085, liquid crystal material encapsulated in casing media such as disclosed in the Japanese Patent Publication No. 3-52843, and liquid crystal material or resin 332 containing dichroic or pleochroic dyes.

The liquid crystal layer 17 preferably has a film thickness within the range of 5 to 20 $\mu$m and, more preferably, within the range of 8 to 15 μm. If the film thickness is small, the scattering characteristic will not be satisfactory to such an extent that no satisfactory contrast can be obtained, but if the film thickness is great, a high voltage drive will be required, resulting in difficulty in designing gate drive circuits for generation, on gate signal lines, of signals necessary to switch the thin-film transistors 14 on and off and source drive circuit for applying video signals to source signal lines.

Control of the film thickness of the liquid crystal layer 17 can be accomplished by employing black glass beads, black glass fibers, black resin beads or black resin fibers. In particular, the use of the black glass beads or black glass fibers is preferred because the number thereof to be distributed in the liquid crystal layer may be small due to their excellent light absorbing property and hardness.

Although in the foregoing description, the beads or fibers have been described black, they may not be limited thereto if the display panel of the present invention is used as a light valve in the projection type display device. The projection type display device makes use of the three display panels associated with the red, green and blue light for modulating these light, respectively. The beads 19 used in the display panel for modulating the red light may be of a color effective to absorb the red light. In other words, the beads 19 employed in each of the display panels may be of a color complementary to the color of light to be modulated thereby.

The liquid crystal layer 17, when no voltage is applied thereto, scatters the incoming light (in a black display). If transparent beads are employed, light may leak from the beads even though the display panel is in a black display, reducing the display contrast. Therefore, if the black glass beads or glass fibers are employed such as in the display panel of the present invention, no light leakage occur, thereby securing a favorable display contrast.

On the other hand, the counter electrode 13 made of ]TO is formed on the counter substrate 11 and is covered by the multi-layered dielectric film 16. The multi-layered dielectric film 16 has a film thickness exceeding 1.5 μm and, therefore, formation of the counter electrode 13 over the multi-layered dielectric film 16 is undesirable because the counter electrode 13 will be electrically cut by edges of the multi-layered dielectric film 16. The multi-layered dielectric film 16 is of a laminated structure including at least one low refractive dielectric thin-film having a refractive index of not greater than 1.7 and at least one high refractive dielectric thin-film having a refractive index of not smaller than 1.8. The low refractive dielectric thin-film is made of $SiO_2$ (Refractive index n=1.46) or $MgF_2$ (Refractive index n 1.39) while the high refractive dielectric thin-film is made of $HfO_2$ (Refractive index n 2.0), $ZrO_2$ (Refractive index n=2.05), or $Ta_2O_5$ (Refractive index n=1.95). The use of $HfO_2$ and $SiO_2$ is preferred for the high and low refractive dielectric thin-films, respectively, because the light absorption capacity thereof is low at a region of UV rays of light. $ZrO_2$ may exhibit a UV transmittance lower than that of $HfO_2$ and $MgO_2$ may be susceptible to cracking. The laminated structure of $SiO_2$ and $HfO_2$ is resistant to cracking and exhibits a satisfactory UV transmissivity.

Each of the low and high refractive dielectric thin films has a physical film thickness d equal to $\lambda/(4 \cdot n)$, wherein λ(nm) represents a design main wavelength. The design main wavelength is chosen to be 620 nm where the multi-layered dielectric thin-film is designed to reflect the red light, 540 nm where the multi-layered dielectric thin-film is designed to reflect the blue light, and 460 nm where the multi-layered dielectric thin-film is designed to reflect the blue light. As a matter of design, the design main wavelength A is chosen in consideration of the wavelength of light to be modulated by the display panel and the pattern of distribution of intensities relative to the wavelength of light.

Figure 35:
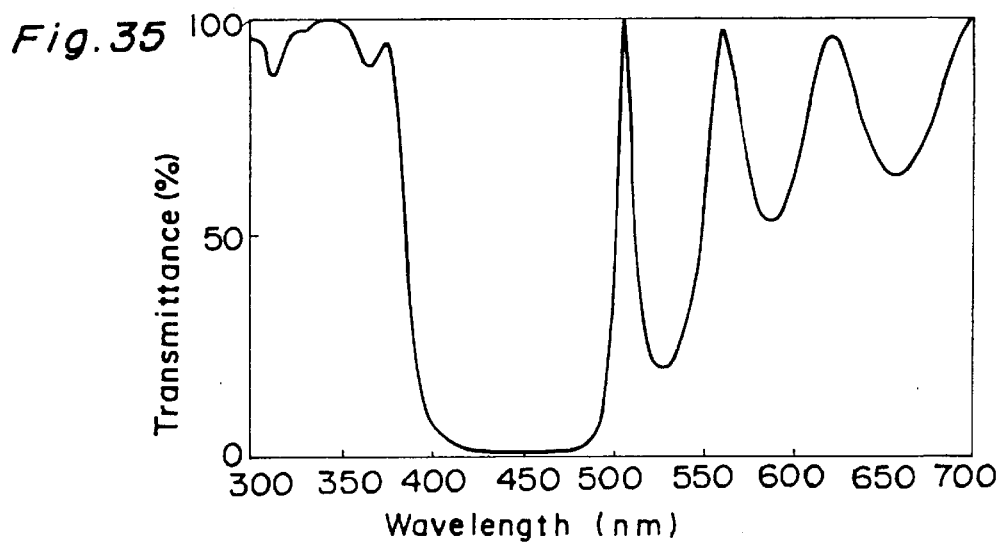
FIGS. 35, 36, and 37 are graphs showing change in transmittance relative to wavelength exhibited by different multi-layered dielectric films in the display panel of the present invention, respectively.
Figure 36:
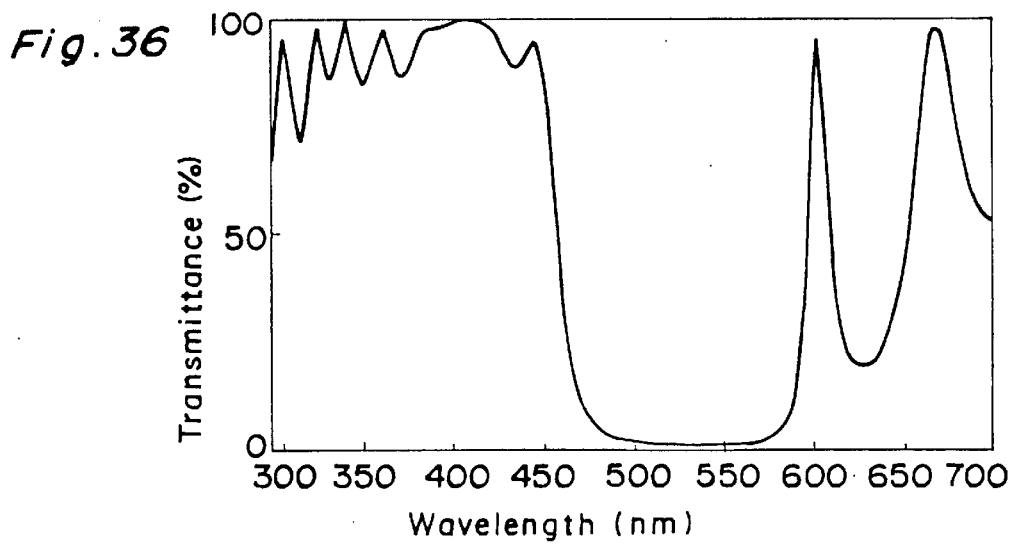
Figure 37:
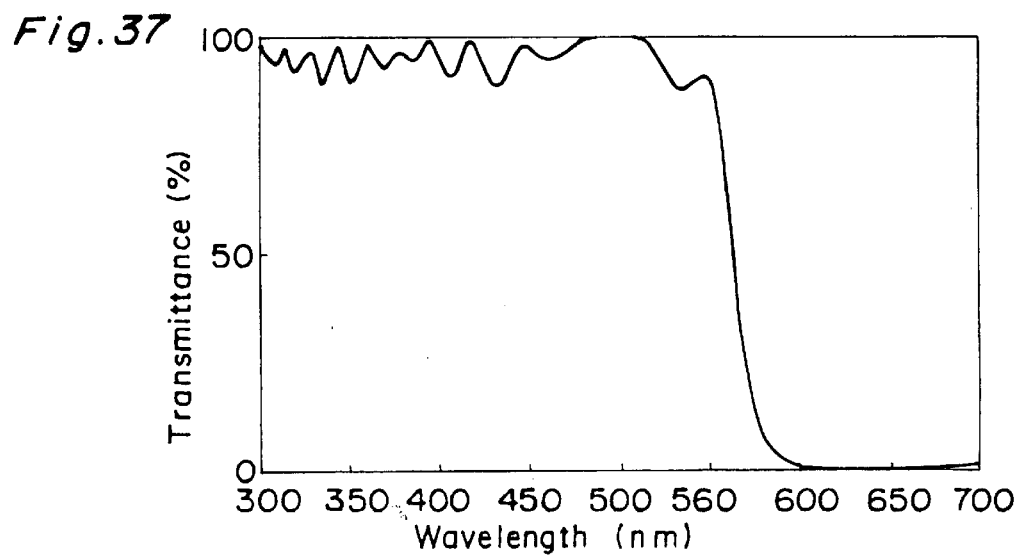

In practice, the optical film thickness of each layer or film must be adjusted in view of the fact that a steep transmission band may occur to a particular wavelength and/or a reflection band occurs. Examples of design of the multi-layered dielectric film 16 are shown in the following Tables 1 to 3 and characteristics thereof are shown in FIGS. 35 to 37. It is to be noted that, in each of Tables 1 to 3, ITO represents the counter electrode 13. ITO has an index of refraction n of 2.0. The ITO thin-film 13 has its film thickness properly chosen in consideration of the wavelength of the light incident upon the display panel. By way of example, the optical film thickness (d·n) of the ITO thin-film 13 is chosen to be λ/2. If it be a multiple of about λ/2, the reflectivity of light relative to a particular wavelength will be lowered. The refractive index of the liquid crystal layer 17 is chosen to be 1.5. Although it may vary depending on the type of material, in most cases it is within the range of 1.5 to 1.6 and no change in refractive index will substantially bring about influence on the design of the multi-layered dielectric film.

TABLE 1

Reflection of Blue Light

| Film No. | Material | Reflective Index | Optical Film Thickness (nm) | Physical Film Thickness (nm) |
|---|---|---|---|---|
| — | Glass Substrate | 1.52 | — | — |
| 1 | ITO | 2.00 | 168.00 | 84.00 |
| 2 | $SiO_2$ | 1.46 | 128.10 | 87.74 |
| 3 | $HFO_2$ | 2.00 | 138.91 | 69.46 |
| 4 | $SiO_2$ | 1.46 | 107.10 | 73.36 |
| 5 | $HfO_2$ | 2.00 | 119.59 | 59.80 |
| 6 | $SiO_{d2}$ | 1.46 | 103.95 | 71.20 |
| 7 | $HfO_2$ | 2.00 | 114.76 | 57.38 |
| 8 | $SiO_2$ | 1.46 | 103.95 | 71.20 |
| 9 | $HfO_2$ | 2.00 | 112.35 | 56.18 |
| 10 | $SiO_2$ | 1.46 | 102.90 | 70.48 |
| 11 | $HfO_2$ | 2.00 | 112.35 | 56.18 |
| 12 | $SiO_2$ | 1.46 | 102.90 | 70.48 |
| 13 | $HfO_2$ | 2.00 | 112.35 | 56.18 |
| 14 | $SiO_2$ | 1.46 | 102.90 | 70.48 |
| 15 | $HfO_2$ | 2.00 | 112.35 | 56.18 |
| 16 | $SiO_2$ | 1.46 | 102.90 | 70.48 |
| 17 | $HfO_2$ | 2.00 | 112.35 | 48.85 |
| 18 | $SiO_2$ | 1.46 | 103.95 | 71.20 |
| 19 | $HfO_2$ | 2.00 | 115.92 | 57.96 |
| 20 | $SiO_2$ | 1.46 | 103.95 | 71.20 |
| 21 | $HfO_2$ | 2.00 | 127.99 | 64.00 |
| 22 | $SiO_2$ | 1.46 | 107.10 | 73.36 |
| 23 | $HfO_2$ | 2.00 | 181.12 | 90.56 |
| 24 | $SiO_2$ | 1.46 | 52.50 | 35.96 |
| — | Liquid Crystal | 1.50 | — | — |

TABLE 2

Reflection of Green Light

| Film No. | Material | Reflective Index | Optical Film Thickness (nm) | Physical Film Thickness (nm) |
|---|---|---|---|---|
| — | Glass Substrate | 1.52 | — | — |
| 1 | ITO | 2.00 | 200.00 | 100.00 |
| 2 | $SiO_2$ | 1.46 | 152.50 | 104.45 |
| 3 | $HFO_2$ | 2.00 | 165.37 | 82.69 |
| 4 | $SiO_2$ | 1.46 | 127.50 | 87.33 |
| 5 | $HfO_2$ | 2.00 | 142.37 | 71.19 |
| 6 | $SiO_2$ | 1.46 | 123.75 | 84.76 |
| 7 | $HfO_2$ | 2.00 | 136.62 | 66.88 |

TABLE 2-continued

Reflection of Green Light

| Film No. | Material | Reflective Index | Optical Film Thickness (nm) | Physical Film Thickness (nm) |
|---|---|---|---|---|
| 8 | SiO$_2$ | 1.46 | 123.75 | 83.90 |
| 9 | HfO$_2$ | 2.00 | 133.75 | 66.88 |
| 10 | SiO$_2$ | 1.46 | 122.50 | 83.90 |
| 11 | HfO$_2$ | 2.00 | 133.75 | 66.88 |
| 12 | SiO$_2$ | 1.46 | 122.50 | 83.90 |
| 13 | HfO$_2$ | 2.00 | 133.75 | 66.88 |
| 14 | SiO$_2$ | 1.46 | 122.50 | 83.90 |
| 15 | HfO$_2$ | 2.00 | 133.75 | 66.88 |
| 16 | SiO$_2$ | 1.46 | 122.50 | 83.90 |
| 17 | HfO$_2$ | 2.00 | 133.75 | 58.15 |
| 18 | SiO$_2$ | 1.46 | 123.75 | 84.76 |
| 19 | HfO$_2$ | 2.00 | 138.00 | 69.00 |
| 20 | SiO$_2$ | 1.46 | 123.75 | 84.76 |
| 21 | HfO$_2$ | 2.00 | 152.37 | 76.19 |
| 22 | SiO$_2$ | 1.46 | 127.50 | 87.33 |
| 23 | HfO$_2$ | 2.00 | 215.62 | 107.81 |
| 24 | SiO$_2$ | 1.46 | 62.50 | 42.81 |
| — | Liquid Crystal | 1.50 | — | — |

TABLE 3

Reflection of Red Light

| Film No. | Material | Reflective Index | Optical Film Thickness (nm) | Physical Film Thickness (nm) |
|---|---|---|---|---|
| — | Glass Substrate | 1.52 | — | — |
| 1 | ITO | 2.00 | 224.00 | 112.00 |
| 2 | SiO$_2$ | 1.46 | 161.60 | 110.69 |
| 3 | HFO$_2$ | 2.00 | 188.16 | 94.08 |
| 4 | SiO$_2$ | 1.46 | 172.16 | 117.92 |
| 5 | HfO$_2$ | 2.00 | 161.92 | 80.96 |
| 6 | SiO$_2$ | 1.46 | 160.80 | 79.28 |
| 7 | HfO$_2$ | 2.00 | 158.56 | 79.28 |
| 8 | SiO$_2$ | 1.46 | 159.84 | 109.48 |
| 9 | HfO$_2$ | 2.00 | 159.36 | 79.68 |
| 10 | SiO$_2$ | 1.46 | 157.60 | 107.95 |
| 11 | HfO$_2$ | 2.00 | 157.60 | 78.80 |
| 12 | SiO$_2$ | 1.46 | 157.60 | 107.95 |
| 13 | HfO$_2$ | 2.00 | 157.60 | 78.80 |
| 14 | SiO$_2$ | 1.46 | 157.60 | 107.95 |
| 15 | HfO$_2$ | 2.00 | 157.60 | 78.80 |
| 16 | SiO$_2$ | 1.46 | 157.60 | 107.95 |
| 17 | HfO$_2$ | 2.00 | 157.60 | 78.80 |
| 18 | SiO$_2$ | 1.46 | 158.72 | 108.71 |
| 19 | HfO$_2$ | 2.00 | 156.96 | 68.24 |
| 20 | SiO$_2$ | 1.46 | 158.88 | 108.82 |
| 21 | HfO$_2$ | 2.00 | 163.20 | 81.60 |
| 22 | SiO$_2$ | 1.46 | 166.56 | 114.08 |
| 23 | HfO$_2$ | 2.00 | 163.20 | 81.60 |
| 24 | SiO$_2$ | 1.46 | 76.48 | 52.38 |
| — | Liquid Crystal | 1.50 | — | — |

It is to be noted that the dielectric thin-film referred to in the present invention means a thin-film made of inorganic dielectric material within a limited sense, but may not be always limited thereto. It may be made of organic material such as, for example, polyimide, within a broad sense. Also, even where the organic material is employed, materials having two different indexes of refraction may be laminated one above the other to provide the multi-layered dielectric film capable of reflecting a particular range of wavelength.

While in each of the foregoing Tables 1 to 3, 24-layered film (or 23-layered film excluding ITO 13) has been employed, the number of the layers forming the multi-layered dielectric film may not be always limited thereto and it may be smaller than the illustrated number. Where the number is smaller than the illustrated number, the reflectivity with respect to the particular visible region of light will be lowered, but if it be increased, 100% reflection of the particular visible range of light can be achieved substantially. The particular number of the layers forming the multi-layered dielectric film should be chosen in consideration of the manufacturing cost and the characteristic thereof.

If arbitrarily chosen two out from Tables 1 to 3 are combined (laminated), light of two different wavelengths can be reflected. By way of example, if the two out from Tables 1 and 2 are laminated, the multi-layered dielectric film 16 capable of reflecting blue and green light can be formed. Also, if all out from the Tables 1 to 3 are laminated, the multi-layered dielectric film 16 capable of reflecting red, green and blue light can be obtained.

It is also to be noted that attention is called that the film thickness of ITO 13 is varied according to the wavelength of light to be modulated by the display panel. However, the present invention is not always limited thereto and a different film thickness may be employed depending on a particular optical design. Since both of ITO thin-film and HfO$_2$ thin-film have a refractive index of 2.0, the physical film thickness of the ITO thin-films in each of Tables 1 to 3 may be reduced and the quantity so reduced may be set to be the physical film thickness of the ITO thin-film of a defined film thickness.

An example of design where the multi-layered dielectric film 16 employed in the display panel reflects the blue light is shown in Table 1, the characteristic thereof being shown in FIG. 35. The multi-layered dielectric film 16 transmits the UV region of light therethrough and reflects the blue light. Similarly, an example of design where the green light is reflected and its characteristic are shown in Table 2 and FIG. 36. Further, an example of design where the red light is reflected and its characteristic are shown in Table 3 and FIG. 37.

The multi-layered dielectric film 16 transmits the UV region of light therethrough when the UV resin contained in the LC mix (Solution containing a mixture of UV-curable resin and liquid crystal material) is being cured. When the display panel is used as a light valve, it reflects the particular visible region of light and, therefore, it functions as a black matrix 381.

Although the multi-layered dielectric film 16 has been described as transmitting the UV region of light therethrough and reflects the visible region of light, it may not be always limited thereto. Where the polymer 332 is of a kind curable upon exposure to the visible region of light, arrangement may be made that the visible region of light is transmitted, but light of a wavelength which the display panel modulates can be reflected. By way of example, where the display panel reflects the red light, the multi-layered dielectric film 16 transmits the blue light to cure the polymer 332, but reflects the red light, thus functioning as a black matrix. By way of example, it suffices to employ the dielectric film 16 of such a characteristic as shown in FIG. 37. The foregoing description equally applies to any one of the embodiments of the present invention which follows.

The film thickness of the multi-layered dielectric film 16 having 23 laminated layers will be about 1.5 μm when reflecting the blue light, and about 2.9 μm when reflecting the red light. Since the polymer dispersed liquid crystal material does not require any rubbing treatment, formation of surface irregularities resulting from formation of the multi-layered dielectric film 16 bring about no problem. Thus, because of the polymer dispersed liquid crystal display panel, the multi-layered dielectric film having such film thickness can be formed.

When the entire visible region of light (white light) is desired to be reflected by the multi-layered dielectric film 16, two design main wavelengths λ must be employed. By way of example, the first wavelength $\lambda_1$ may be 500 nm and the second wavelength $\lambda_2$ may be 600 nm. In the first place, the physical film thickness is determined at the first wavelength $\lambda_1$, followed by formation of the first multi-layered dielectric film over the ITO thin-film 13. Thereafter, the physical film thickness is determined at the second wavelength $\lambda_2$, followed by lamination of the second multi-layered dielectric film. If it be formed in this manner, the multi-layered dielectric film 16 capable of reflecting the entire visible region of light and passing the UV region of light therethrough can be fabricated. The film thickness of this multi-layered dielectric film will be about 3 μm, that is, about twice that in the previously described embodiment.

The multi-layered dielectric film 16 is formed over each thin-film transistor 14, gate and source signal lines. it makes no difference even if the multi-layered dielectric films are disposed at the same position and of the same shape as the black matrix 381 employed in the conventional TN liquid crystal display panel. In other words, it is formed in correspondence with the pixel electrode and the shape of the pixel. Patterning of $SiO_2$ and $HfO_2$, of $ZrO_2$ and of $MgF_2$ can be accomplished by the use of an etching technique using hydrofluoric acid or the like, of sulfuric acid or the like and of nitric acid or the like, respectively. Since the etching condition considerably varies with a vapor depositing condition of the multi-layered dielectric film, tests must be carried out to determine the proper condition. It is to be noted that the patterning may be carried out by the use of a dry etching technique.

The multi-layered dielectric film 16 transmits the UV rays of light. Transmission of the UV rays of light does not mean that most of the light incident on the counter substrate 11 reaches the liquid crystal layer 17. The UV rays of light are absorbed by the glass substrate 11 and also by ITO of the counter electrode 13 as well. It means that only portion of the incident UV rays of light reaches the liquid crystal layer 17 in a quantity sufficient to initiate the curing of the UV resin.

A thin-film of, for example, Cr will transmit no light at all if it has a film thickness not smaller than 1,000 Å. In comparison, the multi-layered dielectric film 16 sufficiently transmits the UV rays of light therethrough. The amount of the UV rays of light reaching the liquid crystal layer 17 after having passed through the glass substrate 11 and the counter electrode 13 differs from the amount of the UV rays of light reaching the liquid crystal layer 17 after having passed through the glass substrate 11, the counter electrode 13 and the multi-layered dielectric film 16. However, in either case, the UV resin can be cured.

As hereinabove discussed, since the multi-layered dielectric film 16 passes the UV rays of light therethrough, all of the UV resin in the LC mix used to form the liquid crystal layer 17 can be cured. Accordingly, the display panel of the present invention is less susceptible to aging and has a stability. Also, since it reflects the visible region of light, it has a function of black matrix.

If the multi-layered dielectric film 16 has a film thickness not smaller than a predetermined value, a voltage drop can be induced and there is such an effect that any possible leakage of light from around the pixel electrodes 15 can be avoided by an unnecessary distribution of an electric field. This effect will now be described with particular reference to FIGS. 2A and 2B.

The relative dielectric constant ε of the liquid crystal material is within the range of 15 to 30. In comparison, the relative dielectric constant of the multi-layered dielectric film 16 is smaller than that. By way of example, the relative dielectric constant of $SiO_2$ is about 4.

As shown in FIG. 2, the electric lines of force 22 develop between portions to which a voltage is applied. By way of example, the electric lines of force 22 develop between the source signal lines 21 and the pixel electrodes 15 and between the source signal lines 21 and the counter electrode 13. If the liquid crystal molecules 23 are oriented in a direction perpendicular to the substrate 12, the refractive index of the liquid crystal molecules 23 and that of the polymer 332 match with each other as shown in FIG. 34B and a light transmissive state is established. If the liquid crystal molecules 26 are oriented in a direction along the electric lines of force 22b as shown in FIG. 2A, peripheral portions of the pixel electrodes 15 assume a light transmissive state and light leakage occurs from around the pixel electrodes 15. This in turn lowers the display contrast of the display panel.

On the other hand, if the multi-layered dielectric film 16 is formed as shown in FIG. 2B, the number of the electric lines of force between the source signal lines 21 and the counter electrode 13 in the liquid crystal layer 17 decreases (with the intensity of an electric field lowered). Since the liquid crystal molecules 23 do not orient at a voltage lower than that necessary to excite the liquid crystal material, the liquid crystal layer 17 over the source signal lines 21 assumes a normally scattering state. The reason that difficulty occurs in applying the voltage to the liquid crystal layer 17 over the source signal lines 21 is because of a considerable voltage drop occurring at the multi-layered dielectric film 16. The multi-layered dielectric film 16 has a film thickness not smaller than 1.5 μm whereas the liquid crystal layer 17 has a film thickness of about 10 μm. Since the relative dielectric constant of the multi-layered dielectric film 16 is smaller than that of the liquid crystal layer 17, the voltage applied to the liquid crystal layer 17 is lowered.

If the multi-layered dielectric film 16 is formed to have a sufficiently great film thickness and a sufficiently great width, the liquid crystal molecules 23 which orient in a direction perpendicular to the substrate 12 will be diminished or reduced, thereby reducing the light leakage from around the pixel electrodes 15. In terms of avoidance of the light leakage, the multi-layered dielectric film 16 should have a relatively great film thickness. If the film thickness increases, a favorable reflection of light in the particular visible region can be facilitated. In consideration of the avoidance of the light leakage, the position at which the multi-layered dielectric film 16 and the number of layers forming it should be determined.

Although in the embodiment shown in FIG. 1, the multi-layered dielectric film 16 has been formed over the counter electrode 13, it may be formed over the array substrate as shown in FIG. 3. As shown in FIG. 3, the multi-layered dielectric film 16a is formed so as to straddle each neighboring pixel electrodes 15. In such case, in order to avoid the light leakage from between the pixel electrodes 15 and the source signal lines 21, the multi-layered dielectric film 16a should be so designed as to reflect the incident light. By way of example, where the display panel modulates the red light, it should reflect the red light and does not emerge outwardly from the array substrate 12.

Figure 6:
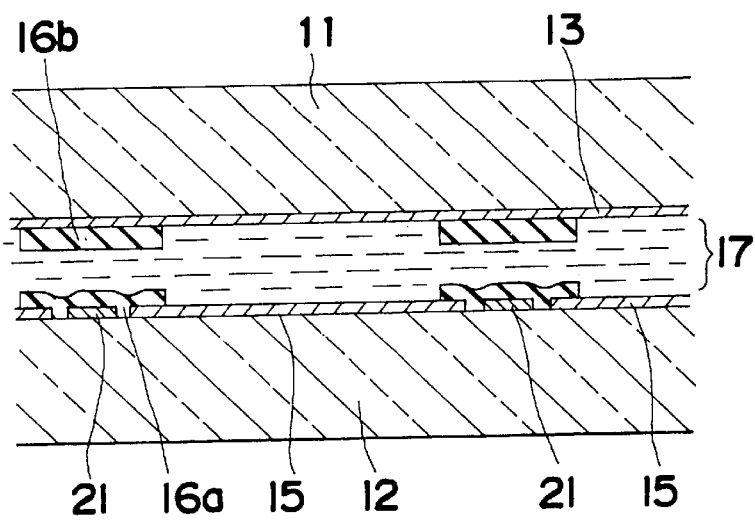
FIG. 6 is a view similar to FIG. 5B, showing the multi-layered dielectric film employed in the form of a laminated structure of low dielectric films.
Figure 13:
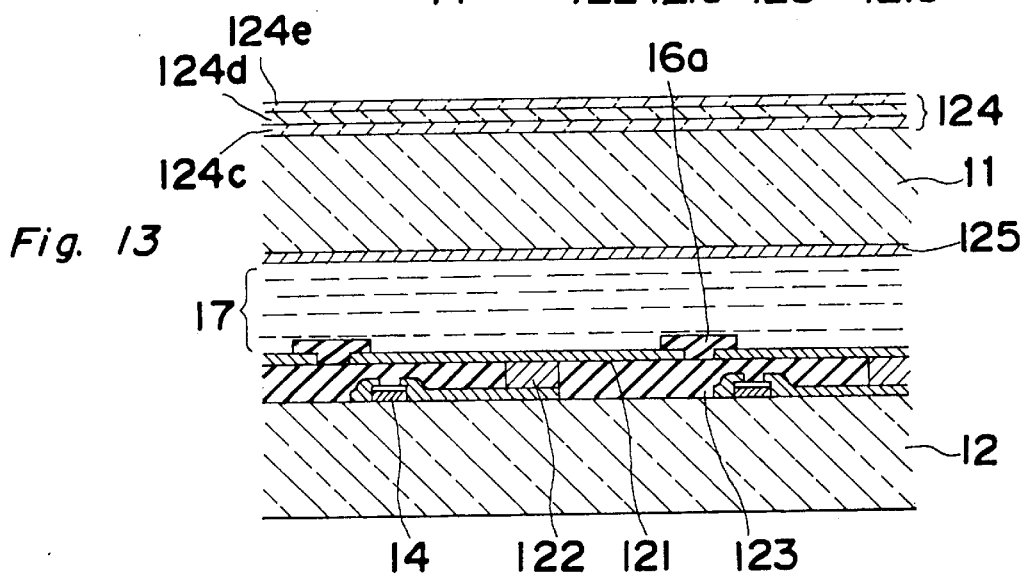
FIG. 13 is a view similar to FIG. 12, showing the display panel employing a triple layered structure of anti-reflection films.

The multi-layered dielectric film 16a need not have a property of transmitting the UV rays of light therethrough. It is because nothing which would shield the passage of UV rays of light is formed on the counter electrode 13. It is, however, to be noted that, as discussed with reference to FIG. 213, the multi-layered dielectric film 16 equally has a function of dropping the voltage such as shown in, for example, FIG. 4. An effect of reducing the electric lines of force 22 extending to the liquid crystal layer 17 is higher than that exhibited when it is formed on the counter electrode 13 as shown in FIG. 2. This is because the multi-layered dielectric film 16a is directly formed over the source signal lines 21 to shield the source signal lines 21 from the electric field. Although in the previously discussed embodiment the source signal lines and others are shielded from the electric field by the presence of the multi-layered dielectric film 16, a similar shield effect can be obtained even if the multi-layered dielectric film 16 is replaced with other material. The other material referred to above includes material (low dielectric material) having a relative dielectric constant smaller than that of the liquid crystal material forming the liquid crystal layer 17. By way of example, it includes inorganic material such as $SiO_2$ and SiNX and organic material such as, for example, polymer 332 used in the liquid crystal layer 17, resist, polyvinyl alcohol (PVA) and others. Embodiments in which the multi-layered dielectric film 16a is formed of the low dielectric material are shown in FIGS. 3, 6 and 13.

Figure 4:
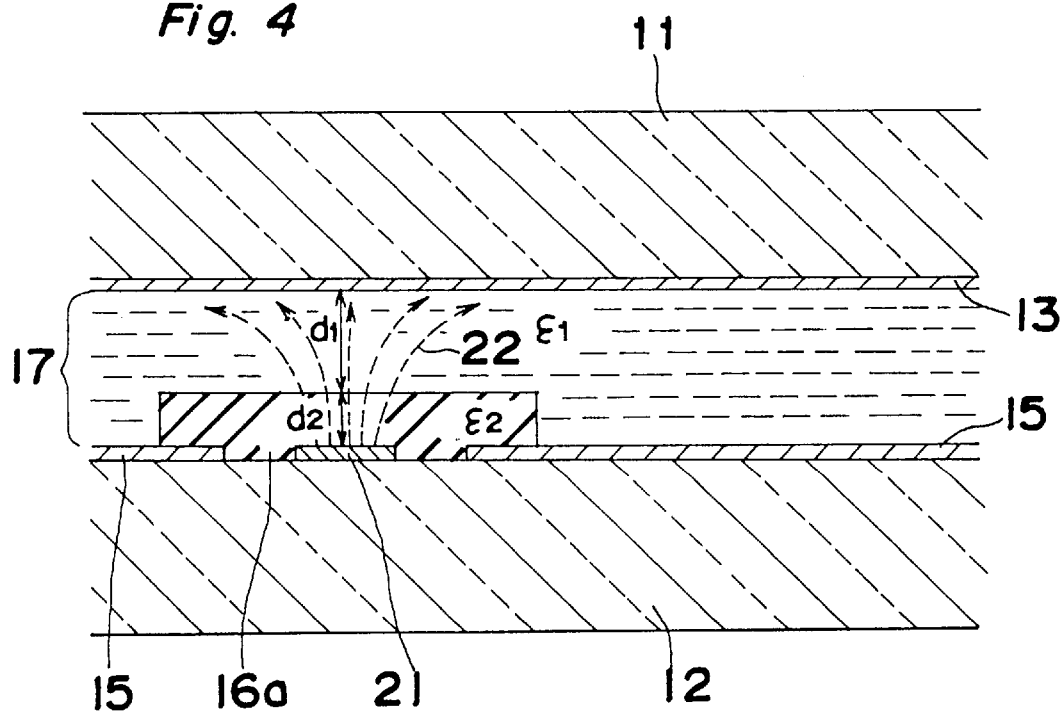
FIG. 4 is a view similar to FIG. 1, showing how the electric lines of force are controlled in the display panel of FIG. 3.

Referring to FIG. 4, assuming that the relative dielectric constant of the low dielectric material 16a having a film thickness d2 is $\epsilon 2$, the relative dielectric constant of the liquid crystal layer 17 having a film thickness d1 is $\epsilon 1$, and the voltage applied between the counter electrode 15 and the source signal lines 21 is V, the voltage E applied to d1 of the liquid crystal layer 17 is expressed by the following equation:

$$E=(\epsilon 2 \cdot d1 \cdot V)/(\epsilon 1 \cdot d2 + \epsilon 2 \cdot d1) \quad (1)$$

It is most preferred that if the film thickness of the low dielectric material 16a is so chosen that the voltage E is lower than the voltage at which the liquid crystal material is excited (i.e., the voltage at which the liquid crystal material is oriented and the transmittance of the liquid crystal layer starts varying), no light leakage occurs. However, in practice, no problem would occur often even if the liquid crystal material is somewhat oriented. In general, the amount of transmittance of 30% would be tolerated if 100% is attained when the liquid crystal layer 17 is brought in a complete transmissive state. In other words, the film thickness of the low dielectric material 16a is so chosen that the voltage E applied to the liquid crystal layer 17 is effective to attain a 30% or lower transmittance.

What has been discussed in connection with the equation (1) above equally applies to determination of the film thickness of a thin-film 16a shown in FIGS. 6 and 13, the film thickness of a color filter 71a–71c formed over signal lines as shown in FIGS. 8 and 14, and the height of low dielectric columns (391a+391b) shown in FIG. 39B.

By allowing the multi-layered dielectric film 16 to function as a black matrix, the multi-layered dielectric film 16 brings about such an effect as to prevent light leakage from around the pixel electrodes 15. This effect can also be achieved even if the source signal lines 21 and others are shielded by the low dielectric material. In other words, to allow the multi-layered dielectric film 16 to function as a black matrix and to shield the source signal lines 21 and others with the multi-layered dielectric film remain the same so far as they are directed to the same technical problems to be solved since the both belong to the same field of art of the liquid crystal display panel.

Of the low dielectric material, the use of an organic material, particularly a light-sensitive resin such as used in the polymer 332, is preferred. By way of example, it includes UV-curable acrylic resins. These resins exhibit a favorable adhesion to the liquid crystal layer 17 and, therefore, bring about such an effect as to minimize the occurrence of separation between the liquid crystal layer and the array substrate 12. Also, a relatively great thickness can be attained. This is because by exposure of the resin and a developing process, the low dielectric film can be easily formed quickly and at a reduced cost. As a matter of fact, the greater the film thickness of the low dielectric film 16a, the higher the shielding effect and the effect of avoiding the transverse electric field.

Figure 38:
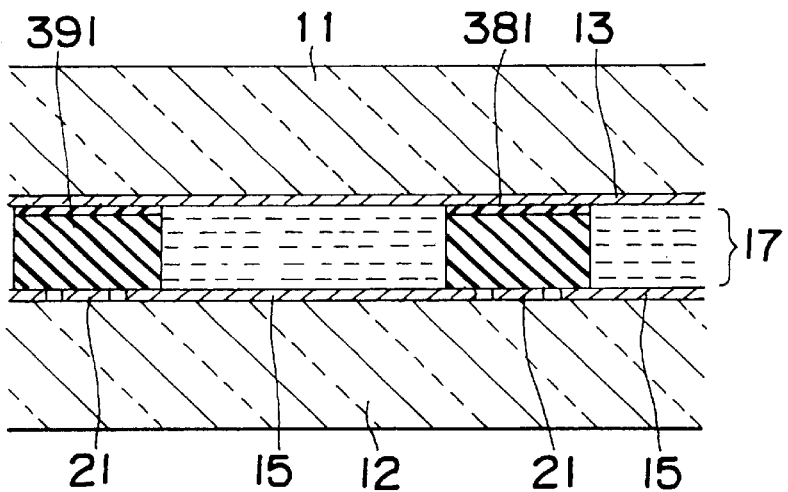
FIG. 38 is a cross-sectional representation of the display panel of a transmissive type, showing the use of low dielectric columns.
Figure 39A:
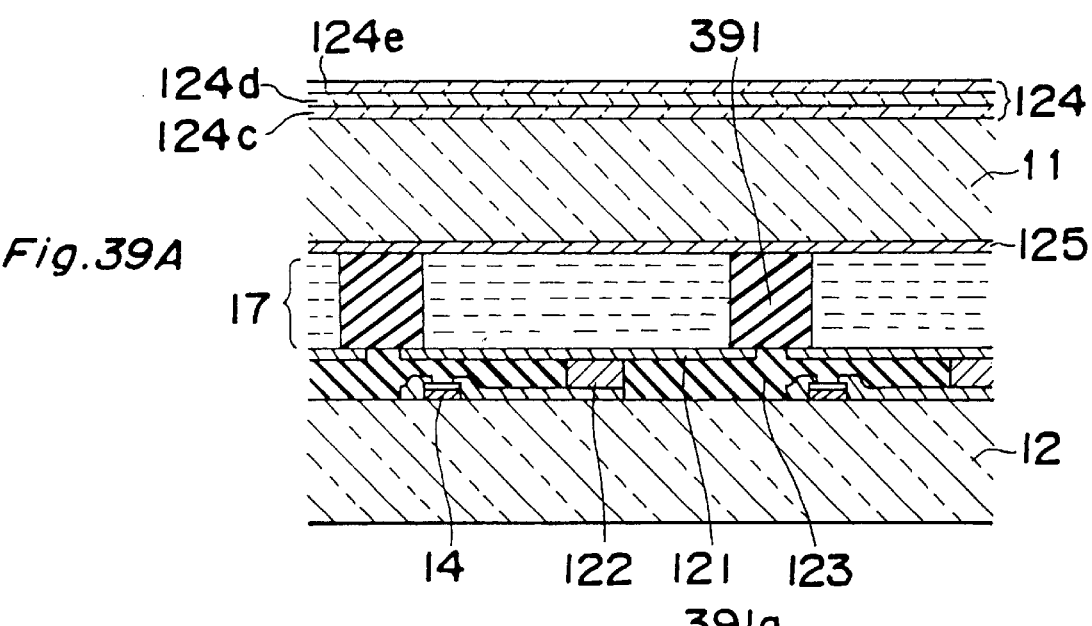
FIG. 39A is a view similar to FIG. 38, showing the display panel of a reflective type.

It is to be noted that it is not limited to the low dielectric film 16a. By way of example, as shown in FIGS. 38, 39A and 39B, it may be in the form of a low dielectric column 391. FIG. 38 illustrates application to the display panel of transmissive type and FIG. 39A illustrates application to the display of reflective type.

Preferably, the low dielectric columns 391 are formed on a side of the counter substrate 11. This is because nothing other than the counter electrode 13 is formed on the side of the counter substrate 11, there is a smoothness on a substrate surface, and no destruction of the thin-film transistors 14 under the influence of static electricity will occur.

It is to be noted that the low dielectric columns 391 do not need to be formed in a pillar-like shape. By way of example, as shown in FIG. 39B, the low dielectric columns 391b are formed on the array substrate 12 and the low dielectric columns 391a are formed on the counter substrate 11.

If each low dielectric column 391 is formed in a pillar-shape, the film thickness of the liquid crystal layer 17 can be kept constant by the pillars. Accordingly, no black bead 19 need be distributed. For this reason, the process of making the display panel can be simplified. Also, since such obstructions as black beads 19 no longer exist on the pixel electrodes 15, a favorable image display can be achieved.

Thus, the reason that the low dielectric columns 391 and the low dielectric film 16a are easily formed is because, in the polymer dispersed liquid crystal panel, no orientation treatment such as rubbing required in the TN liquid crystal display panel is needed.

If the low dielectric columns 391 and the low dielectric films 16a are formed, orientation treatment such as rubbing is impossible to perform because a rubbing cloth will be caught by the low dielectric columns 391 or the low dielectric films and the surfaces of the substrates 11 and 12 cannot be rubbed.

If as shown in FIG. 38 the electric lines of force developing from the source signal lines 21 are shielded, the light leakage from around the pixel electrodes 15 can be reduced. This is because an electromagnetic coupling between the source signal lines 21 and the pixel electrodes 15 is avoided.

The low dielectric films and the low dielectric columns 391 may be colored. If they are colored, the image quality can be increased since light scattering within the liquid crystal layer 17 is absorbed. As discussed in connection with the light shielding film 18, as is the case with the color filter, gelatine or casein may be colored with black acidic dyes. Examples of the black dyes may include fluoran which itself represents black or colored black prepared by mixing green and red dyes.

While the foregoing materials are black material, it may not be limited thereto if the display panel of the present invention is used as a light valve in the projection type display device. For the display panel for modulating the red light, the low dielectric columns 391 used therein suffice to absorb the red light. Accordingly, a natural resin may be colored by the use of dyes, or a synthetic resin in which dyes are dispersed may be employed. By way of example, one or a mixture of azo pigments, anthraquinone dyes, phthalocyanine dyes, triphenylmethane dyes and others may be employed.

It may be contemplated to form a black matrix over the low dielectric columns 391. In such case, as shown in FIG. 38, the black matrix 381 is formed between the low dielectric columns 391 and the counter electrode 13. By so doing, the light leakage from around the pixel electrodes 15 can be eliminated.

While the display panel shown in FIGS. 1 and 2 is directed to the transmissive type, the present invention is not limited thereto and may be equally applied to a reflective type display panel in which the pixel electrodes 15 are made of metal. Design of a multi-layered dielectric film 16 differs from Tables 1 to 3. This is because no ITO 13 is employed. However, a designing technique may be carried out in a manner similar to the multi-layered dielectric layer 16 and no difficulty will arise in accomplishing this.

Figure 5A:
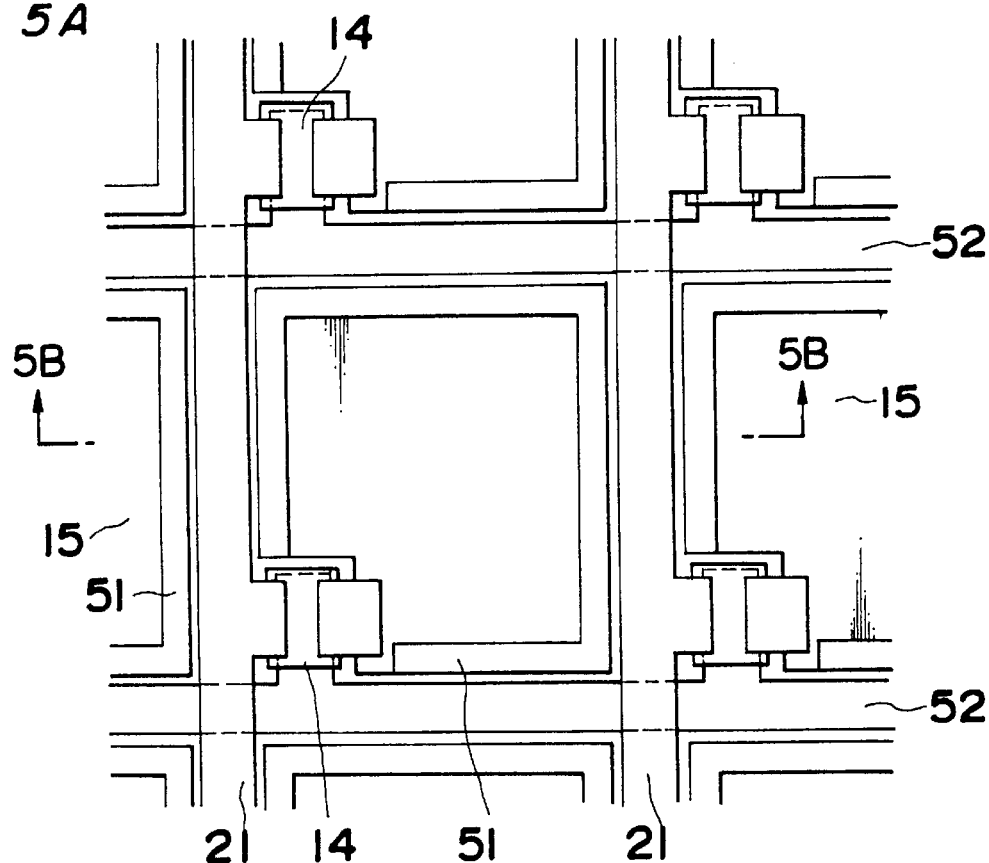
FIG. 5A is a fragmentary plan view of the display panel according to the embodiment of the present invention.
Figure 5B:
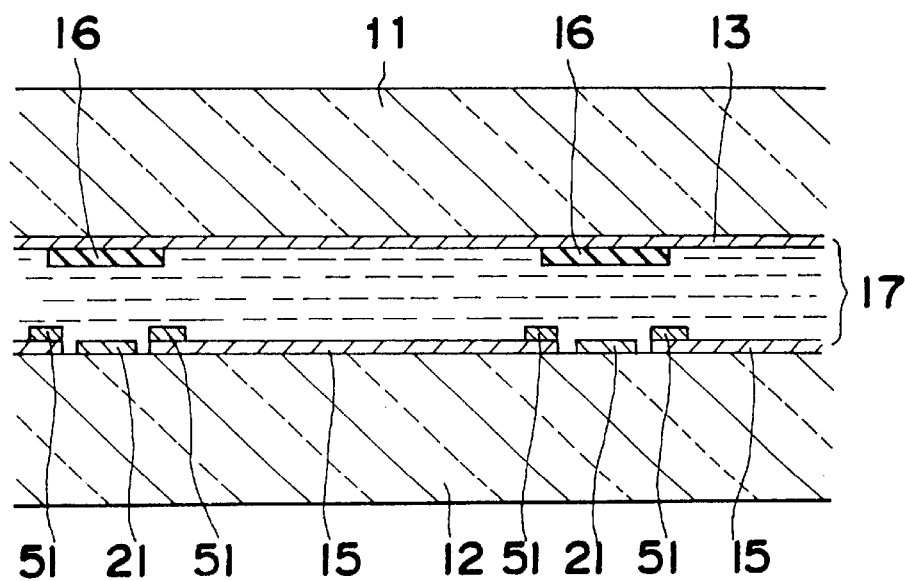
FIG. 5B is a cross-sectional view taken along the line 5B—5B in FIG. 5A.

In order to further prevent the light leakage from around the pixel electrodes, it is recommended to form a light shielding film 51 around each pixel electrode 15 as shown in FIG. 5B. FIG. 5A is an elevational view of the array substrate 12 with the counter substrate 11 removed, and FIG. 5B illustrates a cross-sectional view taken along the line 5B—5B in FIG. 5A. As an example of the light shielding film a metallic thin-film made of Cr may be employed and, alternatively, a thin-film made of acrylic resin with carbon or the like dispersed therein may be employed. Also, material similar to that for the light shielding film 18 may be employed. Even though the liquid crystal molecules 26 are oriented by the effect of the electric lines of force as shown in FIG. 2 and the liquid crystal layer 17 is brought into the light transmissive state, the light shielding film 51 shields light and therefore no light leakage from around each pixel will occur.

Preferably, the light shielding film 51 is formed at a position where the source signal line 21 and the pixel electrode 15 come near to each other and, more preferably, as shown in FIG. 5A, it is also formed at a position where the gate signal line 52 and the pixel electrode 15 come near to each other. This is because electric lines of force develop also between the gate signal line 52 and the pixel electrode 15. Other structural features. and effects are similar to those of FIG. 2 and, therefore, no description will be reiterated.

Again, the multi-layered dielectric films 16a and 16b may be formed on the array and counter substrates 11 and 12, respectively, as shown in FIG. 6. In such case, it may be that the multi-layered dielectric films 16a and 16b serve to reflect the red and green light, respectively. Formation of surface irregularities on the array and counter substrates 11 and 12 due to formation of the multi-layered dielectric films 16a and 16b facilitate adhesion between the substrates 11 and 12 and the liquid crystal layer 17, minimizing the possibility of separation therebetween. Also, the region of light reflected by the multi-layered dielectric film 16 is widened to enhance the function as a black matrix. Also, in FIG. 6, reference numeral 16a may be replaced with a low dielectric film formed of, for example, resin.

Figure 7A:
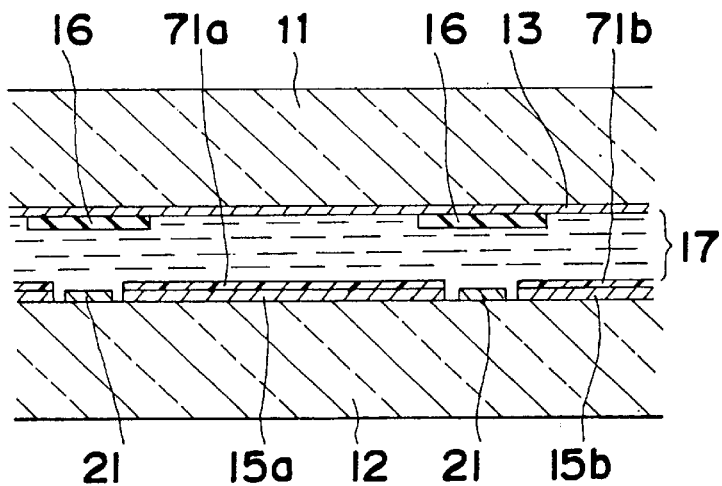
FIG. 7A is a view similar to FIG. 5B, showing color filters formed on pixel electrodes in the display panel.
Figure 7B:
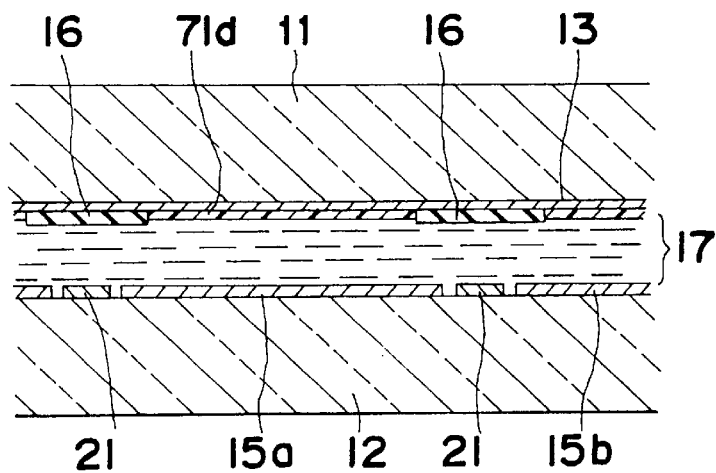
FIG. 7B is a view similar to FIG. 5B, showing the color filters formed on the counter electrode.

In order to accomplish a color display with a single display panel, color filters 71 should be formed over each pixel electrode 15a or the counter electrode 13 as shown in FIGS. 7A and 7B. Color layout of the color filters may be either a delta layout or a square layout.

Figure 9:
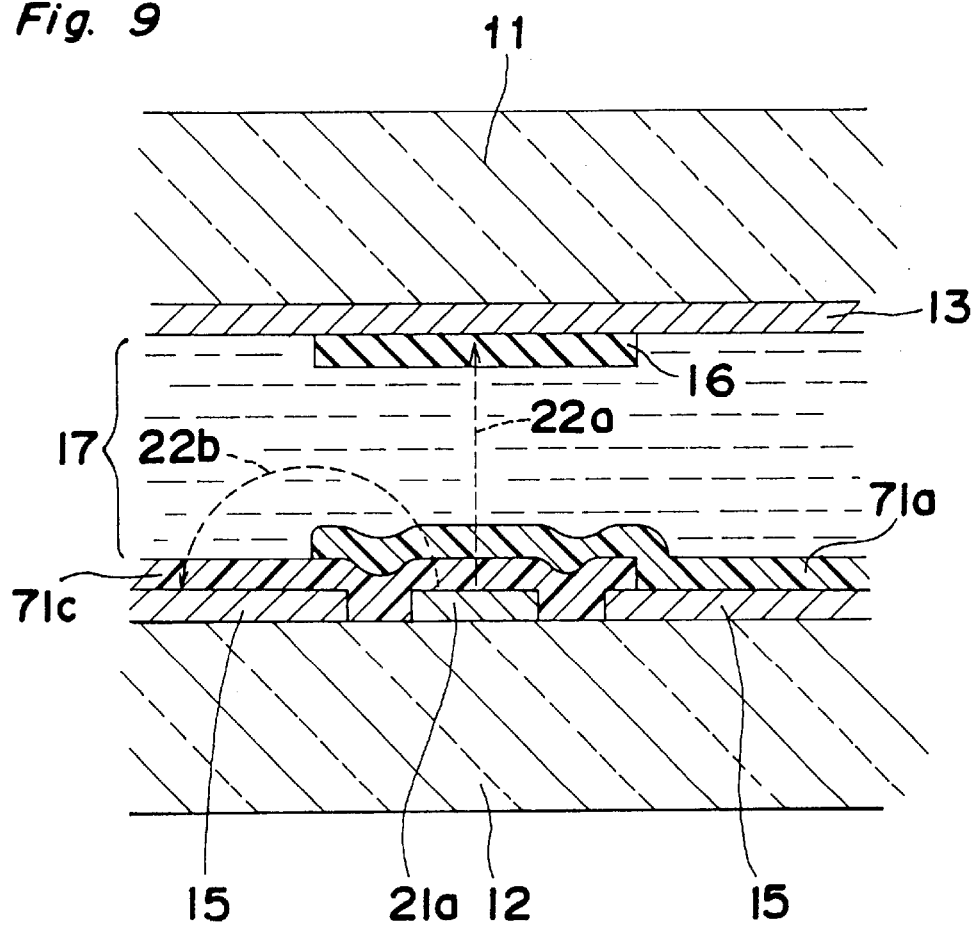
FIG. 9 is a view similar to FIG. 5B, illustrating how the display panel of the structure shown in FIG. 8 works.

If the color filters 71 are formed over each pixel electrode 15 and also over signal lines such as the source signal line 21 or the like as shown in FIG. 8, the shielding effect as shown in FIG. 4 can be exhibited. This is because, since the color filters 71 are generally made of resin, the relative dielectric constant $\epsilon$ is smaller than that of the liquid crystal layer 17. Also, the film thickness of the color filters is relatively great. For this reason, formation of the color filters over the source signal lines 21 or the like results in enhancement of the effect of shielding the electric field. As shown in FIG. 8, the color filters are overlapped on the signal lines. By way of example, over the signal line 21a, the red color filter 71c overlaps the green color filter 71a. Preferably, the blue and black color filters are overlapped. By so doing, the electric lines of force 22a and 22b shown in FIG. 9 are considerably weakened and the liquid crystal molecules will no longer be oriented in a direction along the electric lines of force. Because of this, the light leakage from around each pixel electrode 15 will hardly occur. By the employment of the foregoing structure, a favorable display contrast can be attained.

Overlapping portions of the various color filters absorb light and, therefore, no light leakage from around the pixel electrodes 15 (rather, from portions where the color filters of different two colors overlap) will occur.

The color filters are of red, green and blue in color or red, green, blue and black in color. However, they may not be limited thereto and yellow, cyan magenta color filters or yellow, cyan, magenta and black color filters may be employed.

Also, since the light modulating layer requires no rubbing treatment, the use of the polymer dispersed liquid crystal material is preferred. However, the present invention may not be always limited thereto and a guest-host (guest=dyestuff, host liquid crystal) liquid crystal material may be employed. Preferably, the guest-host liquid crystal material may contain black coloring matter. The guest-host liquid crystal material is available in various modes such as phase transfer type and others and, of them, any mode may be employed. In general, when the guest host liquid crystal layer is in a light transmissive state, the color of the color filters formed on the reflecting electrodes and others is perceived, but when it is in a non-transmissive state, a black display takes place.

Although FIG. 8 illustrates the transmissive type display panel, a technical idea of overlapping the previously discussed color filters may be equally applied to the reflective type display panel as shown in FIG. 12. In other words, the color filters are formed on reflecting electrodes 121a and 121b with the color filters overlapping between the reflecting electrodes 12. In such case, since no source signal line 21 is employed, there is no effect of shielding the electric field from the source signal lines. However, it is possible to avoid the possibility that the liquid crystal molecules are oriented in an electric field (hereinafter referred to as a transverse electric field) developed between the reflecting electrodes 121a and 121b and the liquid crystal layer 17 may be brought in a light transmissive state (Once this occur, a display having no concern with a video display will be effected between the pixel electrodes.).

As hereinbefore described, formation of the color filters between the pixel electrodes is effective to avoid the light leakage from around each pixel electrode. At least two color filters are overlapped between the reflecting electrodes 121. Preferably, three or four color filters are overlapped. Light will not, or hardly, pass where the filters are overlapped and, accordingly, portions where the filters are overlapped function as a light shielding film. In other words, any possible entry of light from between the reflecting electrodes 121a and 121b into an insulating layer 123 can be avoided. Once the light entering impinges upon a semiconductor layer of each thin-film transistor 14, the' photo-conduction phenomenon occurs in the thin-film transistor 14. However, formation of the light shielding film by overlapping the color filter is effective to avoid occurrence of the photo-conduction phenomenon, making it possible to accomplish a favorable pixel display. Also since the color filters are merely overlapped, no increase in cost occurs.

Although in the foregoing description, two or more color filters have been described as overlapped between the reflecting electrodes 121 or the pixel electrodes 15 to form the light shielding film, the present invention need not be limited thereto and, for example, color filters prepared by providing color filters in which coloring matter of two color filters are mixed beforehand and then placing them between the electrodes. Accordingly, lamination of two or more color filters is to be understood as including a system or a structure in which one or more layers of the color filters containing two or more coloring matter.

The prevention of the light leakage or the like by the use of the color filters is similar to that accomplished by the use of the multi-layered dielectric film 16 so far as the problem associated with the light leakage is concerned. While the multi-layered dielectric film 16 may be formed over the counter electrode 13 as shown in FIG. 8, it is need less to say that at least the multi-layered dielectric film 16 prevents the light leakage due to the structure in which the color filters are laminated.

In other words, to allow the multi-layered dielectric film 16 to function as a black matrix and to shield the source signal lines 21 and others with the color filters remain the same so far as they are directed to the same technical problems to be solved since the both belong to the same field of art of the liquid crystal display panel.

Figure 11A:
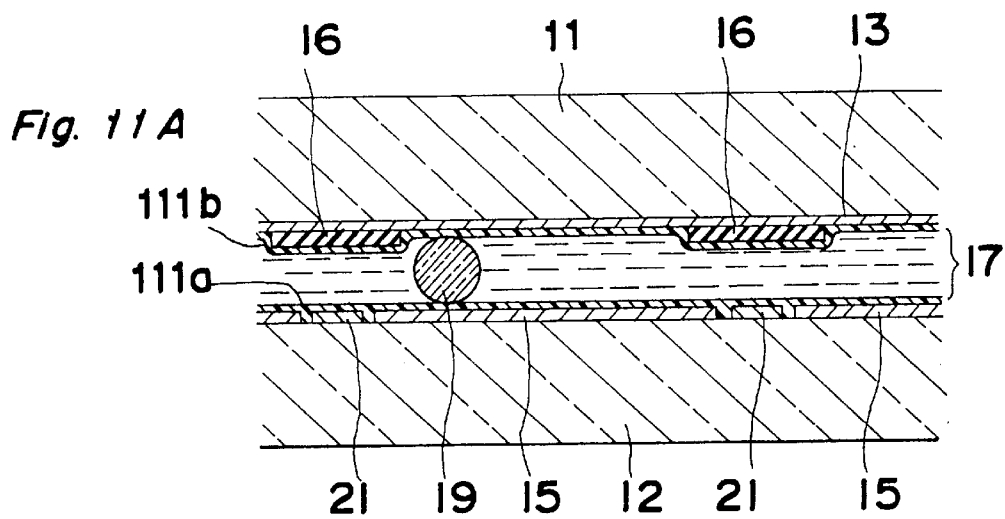
FIG. 11A is a sectional view showing an example in which an insulating film is formed over the pixel electrodes and the counter electrode.
Figure 11B:
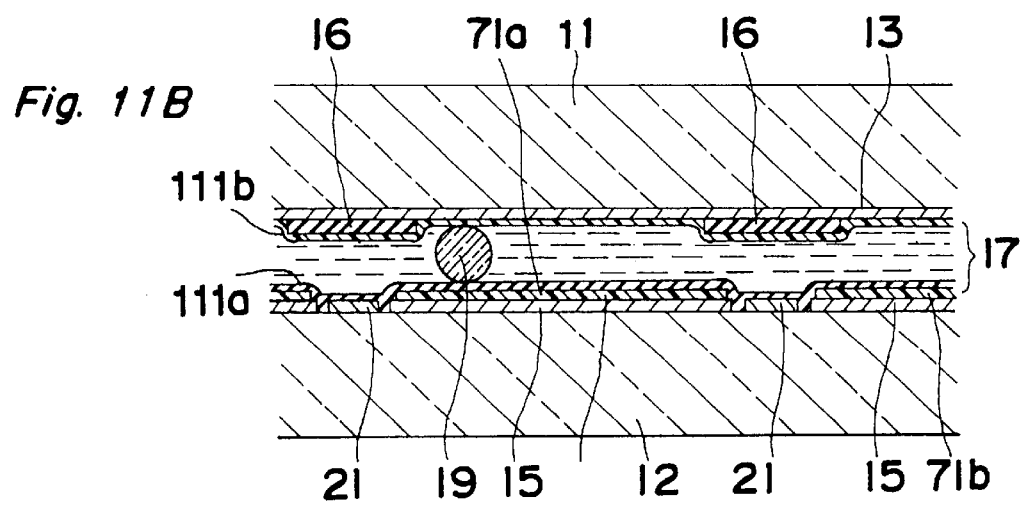
FIG. 11B is a sectional view showing an example in which a color filter is formed over the pixel electrode and an insulating film is formed over the color filter and the counter electrode.

It is to be noted that the ITO thin-film 13 may be formed over the multi-layered dielectric film 16 as shown in FIGS. 11a and 11b.

While this equally applies to all of the display panels of the present invention, it is effective to form an insulating film 111 on at least one of the pixel electrodes 15 and the counter electrode 13. The insulating film may be an orientation film made of polyimide such as employed in the TN liquid crystal display panel or the like, organic material such as polyvinyl alcohol or the like, or inorganic material such as $SiO_2$ or the like. Of them the organic material such as polyimide or the like is preferred in respect of adhesion.

The polymer dispersed liquid crystal material 17 has a relatively small relative dielectric constant. For this reason, it may occur that the charge applied to the pixel electrodes 15 cannot be completely retained for a length of time corresponding to one field period (1/30 or 1/60 second). Unless it can be retained, the liquid crystal layer 17 will not be transformed into the completely transmissive state, accompanied by reduction in display luminance. A thin-film made of organic material such as polyimide or the like has an extremely great relative dielectric constant. Accordingly, formation of the thin-film of organic material over the electrodes results in improvement of the charge retentivity. For this reason, a high luminance display and a high contrast display can be attained.

An insulating film 111 is effective to avoid separation between the liquid crystal layer 17 and the electrodes. This is because almost half of the material forming the liquid crystal layer 17 is organic material such as resin. For this reason, the insulating film 111 serves as a bonding layer to minimize any possible separation between the substrates 11 and 12 and the liquid crystal layer 17.

Also, formation of the insulating film 111 made of organic material is effective to make substantially uniform the average pore size of the polymer network, or the particle size of the liquid crystal droplets, of the liquid crystal layer 17. This appears to result from the fact that, even though some organic material remains on the counter electrode 13, the insulating film 111 covers the residue of organic material. Polyvinyl alcohol brings about this effect more than polyimide. This appears to result from the fact that polyvinyl alcohol exhibits a high wettability than polyimide. However, according to the result of experiments in which various insulating films 111 are formed in panels and the reliability (resistance to light and also to heat) was tested, the use of polyimide such as employed in an orientation film in the TN liquid crystal material has been found desirable because of no substantial aging occurs. For this reason, the use of polyimide for the insulating film 111 is desirable.

It is to be noted that, where the insulating film is to be formed of organic material, the film thickness thereof is preferably within the range of 0.02 to 0.1 μm and, more preferably, within the range of 0.03 to 0.08 μm. Also, where the color filters 71 are formed, they are formed over the pixel electrodes 15 as shown in FIG. 11B. As a matter of fact, the color filters 71 may be formed on the counter electrode. Where the color filters 71 function as the insulating film 111, the insulating film 111 should be formed over only electrodes where no color filters 71 are formed.

Figure 39B:
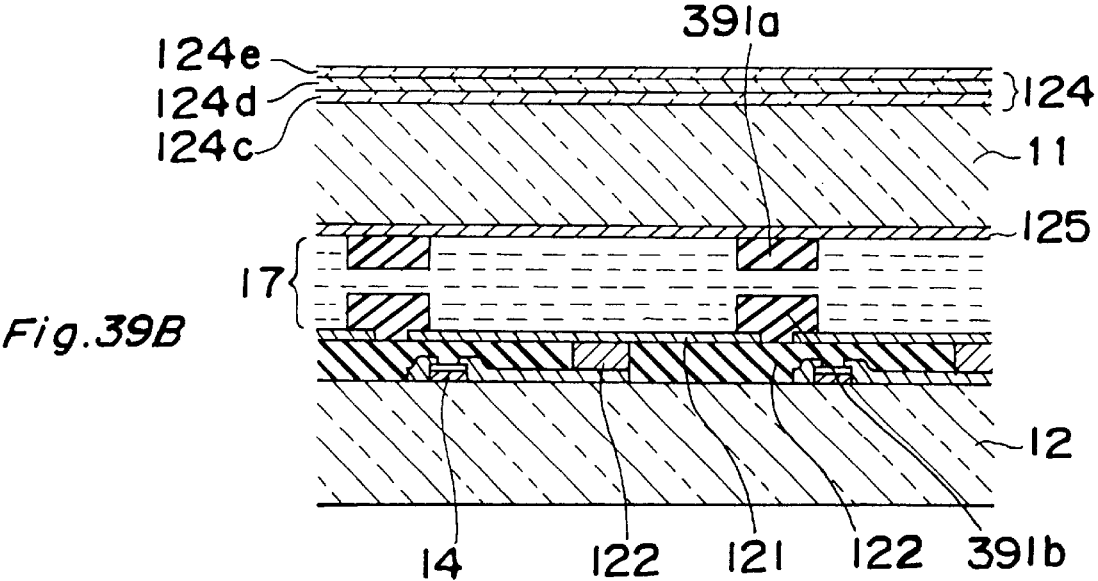
FIG. 39B is a view similar to FIG. 38, showing the low dielectric columns disposed at a position different from that in the display panel shown in FIG. 39A.

It is to be noted that the structure in which the low dielectric columns 391 or the low dielectric film 16a as shown in FIGS. 38, 39A, and 39B, the structure in which the color filters are used as shown in FIGS. 8 and 14, the structure in which the black beads 19 and the multi-layered dielectric film 16 are employed as shown in FIG. 1, the structure in which the light shielding film 51 is employed as shown in FIG. 5, the structure in which the insulating film 111 is employed as shown in FIG. 11 and other structural features may be employed singly or in combination in the display panel as well as the display device of the present invention. This description equally applies to any of an active matrix type display panel (reflective or transmissive panel), a simple matrix type display panel and a character display panel as shown in FIG. 21.

Where the display panel is of a transmissive type, it is recommended to form the multi-layered dielectric film 16 between the reflecting electrodes 121 as shown in FIG. 12. In such case, the multi-layered dielectric film 16 is preferred to permit passage of the UV rays of light therethrough and to function as a black matrix capable of reflecting the light to be modulated as is the case with FIG. 1. The structure and effects of the multi-layered dielectric film 16 are similar to those shown in FIG. 1 and, therefore, no description will be reiterated.

Hereinafter, the display panel of a reflective type according to the present invention will be described. An anti-reflection film 124 is formed on one surface of the glass substrate (counter substrate) 11. The anti-reflection film 124 is of either a three layered structure as shown in FIG. 13 or a two layered structure. In the case of the antireflection film of the three layered structure, it is used to prevent reflection of the visible light at a wide wavelength band and is referred to as a multi-coat. In the case of the antireflection film of the three layered structure, it is used to prevent reflection of the visible light at a particular wavelength region and is referred to as a V-coat. The multi-coat and the V-coat are employed differently depending on the application. Specifically, the V-coat is generally employed where the display panel is used as a light valve in the projection type display device whereas the multi-coat is generally employed where the display panel is used as a display panel of a direct staring type.

In the case of the multi-coat, a film of $Al_2O_3$ of an optical film thickness nd=$\lambda$/4, a film of $ZrO_2$ of an optical film thickness nd=$\lambda$/2 and a film of $MgF_2$ of an optical film thickness nd=$\lambda$/4 are laminated to complete it. In general, the wavelength $\lambda$ is chosen to be about 520 nm during the formation of the thin-film. In the case of the V-coat, a film of SiO of an optical film thickness Nd=$\lambda$/4, a film of $MgF_2$ of an optical film thickness nd=$\lambda$/4, or a film of $Y_2O_3$ and a film of $MgF_2$ of an optical film thickness nd=$\lambda$/4, are laminated to complete it. It is to be noted that since SiO has an absorption band within the region of blue light, the use of $Y_2O_3$ is recommended where the blue light is desired to be modulated. Also, in terms of stability of material, the use of $Y_2O_3$ is desirable because of its high stability.

A reflecting electrode 121 is formed on each thin-film transistor 14 through an insulating film 123. The reflecting electrode 121 and the thin-film transistor 14 are electrically connected together at a junction 122. Material for the insulating film 123 is employed in the form of organic material represented by polyimicle or inorganic material such as $SiO_2$, SiNx or others. The reflecting electrode 121 has its surface formed by a thin-film of aluminum. Although it may be formed by the use of Cr, it has a reflectivity lower than that of aluminum and is so hard that breakage tends to occur around the reflecting electrode 121.

In the display panel of the present invention shown in FIG. 12 and other figures, each thin-film transistor 14 is formed underneath the reflecting electrode 121. In other words, it has a function of a light shielding film (black matrix) effective to avoid entry of the incident light, scattered in the polymer dispersed liquid crystal layer 17, into the semiconductor layer of each thin-film transistor 14 and also a function as an electrode for applying a voltage to the liquid crystal layer 17. This reflecting electrode 121 is made of metallic material and has a sufficient light shielding effect, simple in structure and therefore contributes to a low cost.

The array substrate 12 is formed with source signal lines and others (not shown). The reflecting electrode 121 also has a function of shielding the electric lines of force radiated from the signal lines from reaching the liquid crystal layer 17. Accordingly, no image noises due to the electric lines of force developed from the source signal lines will occur.

The reflecting electrode 121 and the associated thin-film transistor 14 are electrically connected at a junction 122. To accomplish this connection, it is necessary to vapor deposit a metallic thin-film (reflecting electrode) 121 to a film thickness greater than that of the insulating film 123. The insulating film 123 has a film thickness of about 1 $\mu$m. For this reason, a step of about 1 $\mu$m in height will be formed at the junction 122. Also, since the film thickness of the reflecting electrode 121 reaches 1 $\mu$m, a dale of 1 $\mu$m in depth is formed between the neighboring reflecting electrodes. Since the display panel of the present invention makes use of polymer dispersed liquid crystal material, no rubbing is needed. The presence of such steps and dales as described above should bring about no problem and the liquid crystal display panels can be fabricated at a relatively high yield.

The junction 122 results in a step of 1 $\mu$m. On the other hand, patterning of the shape of each thin-film transistor 14 on the reflecting electrode 121 result in formation of surface irregularities of about 1 $\mu$m. Since the display panel of the present invention makes use of polymer dispersed liquid crystal material, the light modulation takes place as a function of change in scattering condition. Accordingly, the presence of the previously discussed step and that of the surface irregularities of about 1 $\mu$m due to the-thin-film transistor 14 do not adversely affect the light modulation substantially. In the display panel in which the rotatory polarization is utilized for light modulation such as observed in the TN liquid crystal display panel, the presence of the surface irregularities would surely be detrimental to the light modulation. Also, the fact that the display film thickness of the present invention is sufficiently thick, i.e., not smaller than 8 $\mu$m favorably acts with respect to variation in film thickness of the liquid crystal layer 17.

Figure 60:
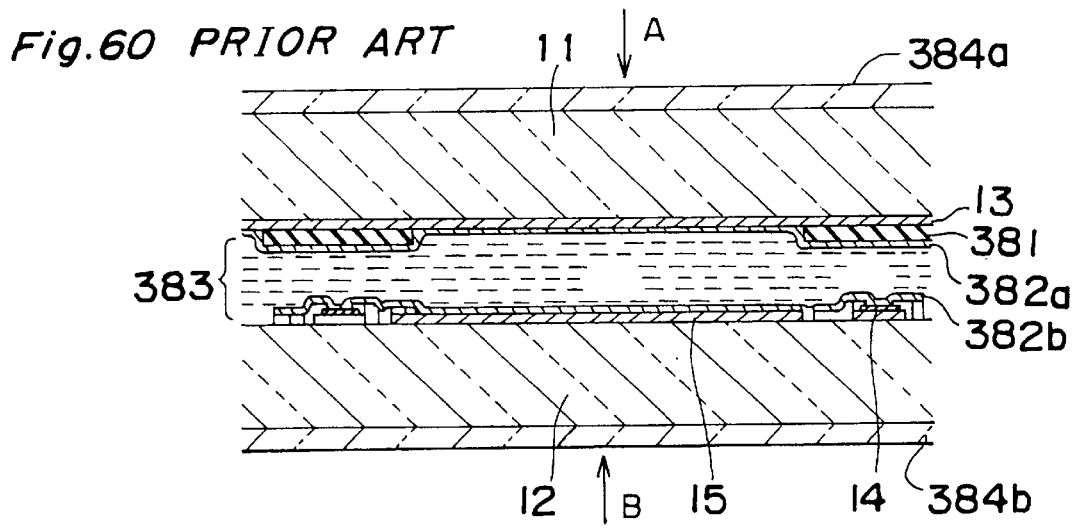
FIG. 60 is a cross-sectional representation of the prior art liquid crystal display panel.
Figure 61A:
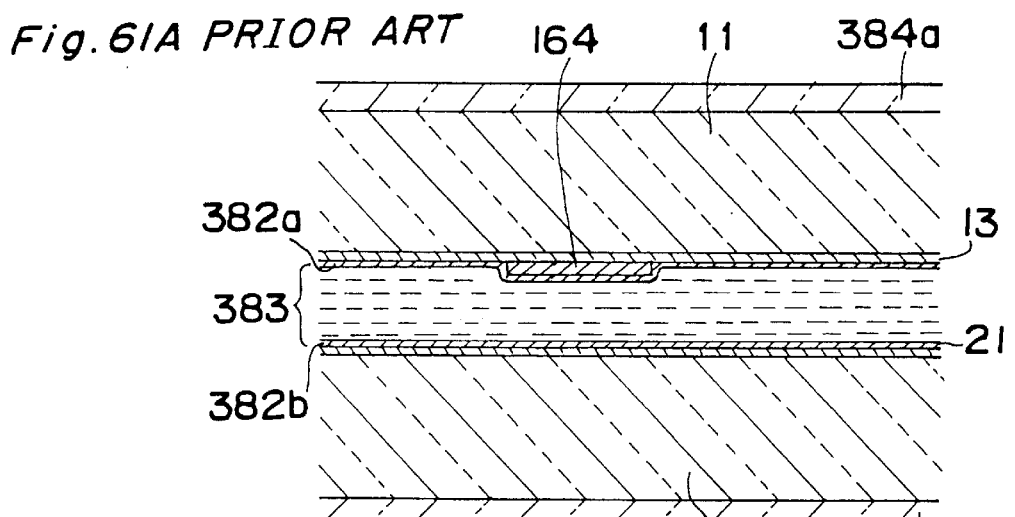
FIGS. 61A and 61B are views similar to FIG. 60, showing the different prior art liquid crystal display panel.
Figure 61B:
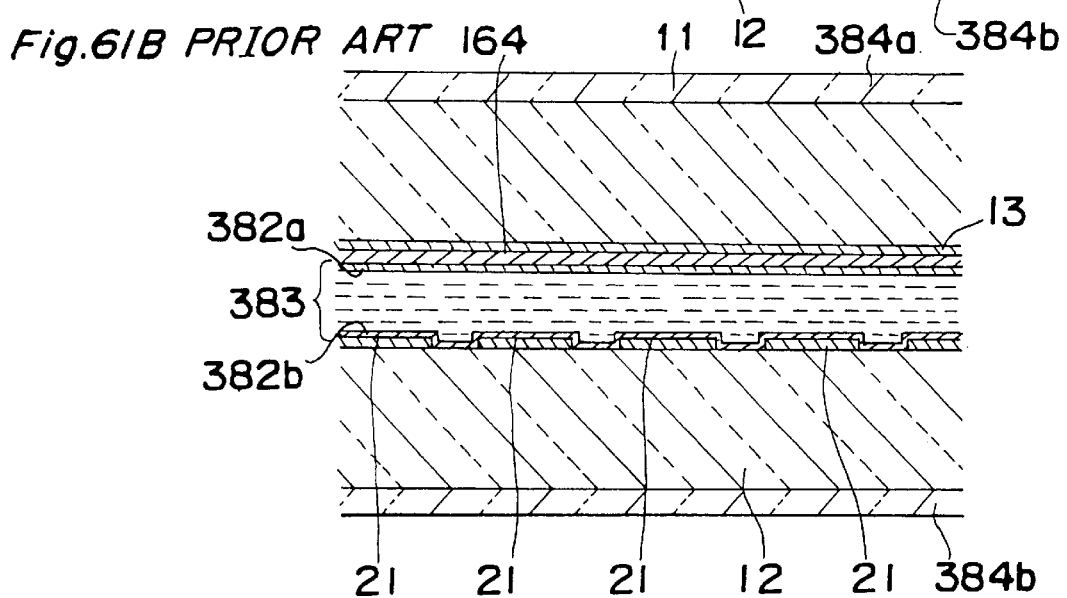

As FIG. 12 makes it clear, no black matrix 381 is formed on the counter electrode 13 such as observed in the conventional TN liquid crystal display panel shown in FIG. 60. In the display panel of the present invention, nothing which would otherwise be formed by patterning exist on the counter electrode 13. For this reason, during the process of sandwiching the counter substrate 11 and the array substrate 12 together, no positioning of the counter substrate 11 relative to the array substrate 12 is required and, therefore, it can easily be manufactured. If something like the black matrix 381 or the like is formed, it will be necessary to position them relative to each other as accurately as i the order of microns so that the black matrix 381 align with the pixel electrode 15.

Also, if the black matrix 381 is formed, when phase separation between the resin component and the liquid crystal component of the liquid crystal layer is to be achieved by radiating UV rays of light to the liquid crystal layer 17, there will be a problem in that the black matrix will shield the UV rays of light, leaving the resin underneath the black matrix uncured. Such a display panel cannot be employed in practice.

Moreover, in the TN liquid crystal display panel which is one of the conventional display panels, the use of the polarizing plate is necessary to convert the incident light into Ii nearly polarized light. Accordingly, almost half of the amount of the incident light cannot be utilized, exhibiting a very low efficiency of utilization of light. Since the display panel of the present invention makes use of the polymer dispersed liquid-crystal material and since no polarizing plate is needed, the efficiency of utilization of light is extremely high.

The counter electrode 125 is of a three layered structure including the first dielectric thin-film of $\lambda$/4 in film thickness formed adjacent the counter substrate 11, the second dielectric thin-film of a $\lambda$/4 in film thickness and the ITO thin-film of $\lambda$/2 in film thickness formed between the first and second dielectric thin-films. The ITO thin-film of the counter electrode 125 does also function as a counter electrode.

Preferably, each of the first and second thin-films has an index of refraction within the range of 1.60 to 1.80. Examples thereof include SiO, $Al_2O_3$, $Y_2O_3$, MgO, $CeF_3$, $WO_3$ and $PbF_2$. Where the first and second thin-films are made of SiO and $Y_2O_3$, respectively, an anti-reflection effect of not higher than 0.1% can be obtained over the entire region of visible light.

Although the first and second dielectric thin-films of the counter electrode 125 and the ITO thin-film of the counter electrode 125 have been described as having respective optical film thicknesses of $\lambda$/4 and $\lambda$/2, they may have respective optical film thicknesses of $\lambda$/4 and $\lambda$/4, respectively.

Also, to describe in terms of the theory of anti-reflection film, it may suffice that each of the first and second dielectric thin-film may have an optical film thickness of (N·λ)/4 and the ITO thin-film may have an optical film thickness of (N·λ)/4, wherein N is an odd number not smaller than 1. Alternatively, it may suffice that each of the first and second dielectric thin-film may have an optical film thickness of (N·λ)/4 and the ITO thin-film may have an optical film thickness of (M·λ)/2, wherein N is an odd number not smaller than 1 and M is an integer not smaller than 1.

In addition, one of the first and second dielectric thin-films may not be always necessary and may therefore be dispensed with. In such case, although the anti-reflection effect will be lowered somewhat, the counter electrode 125 works satisfactorily. Even in this case, the theory of anti-reflection discussed above can apply equally.

The counter electrode 125 discussed above is discussed in further detail in the Japanese Patent Application No. 5-109232 and, therefore, reference to it may be had for the details thereof. Basically, all that is discussed in this application are applicable to the display panel of the present invention.

Since formation of the counter electrode 125 is effective to avoid entry of light into the liquid crystal layer 17 making it possible to avoid the light which may be reflected, the display contrast can be considerably increased.

It is to be noted that the multi-layered dielectric film 16 may be formed between each neighboring reflecting electrodes as indicated by 16a in FIG. 13. It is also to be noted that formation of a color filter over each reflecting electrode 121 results in a single display panel capable of providing a color display.

Figure 29B:
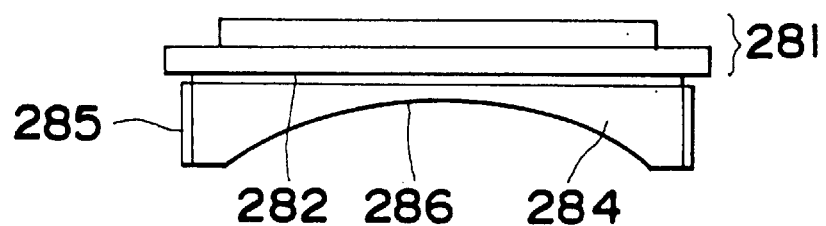
FIG. 29B is a view similar to FIG. 29A, showing the display panel to which a lens is fitted.

The display panel utilizing the polymer dispersed liquid crystal material has a problem in that light tends to be scattered not only in the liquid crystal layer, but also between the counter and array substrates, resulting in lowering of the display contrast. To avoid this problem, the display panel 281 of the present invention makes use of either a transparent substrate 283 of a relatively great thickness fitted to the display panel 281 as shown in FIG. 29A, or a concave lens 284 fitted to the display panel 281 as shown in FIG. 29B. Either one of the transparent substrate 283 and the concave lens 284 is fitted to the display panel 281 by the use of a transparent adhesive material having an index of refraction matching with or equal to that of the counter substrate 11 or the array substrate 12. Light scattered by the liquid crystal layer 17 is reflected by an exit surface and is absorbed by a light absorbing film 285 painted to ineffective surfaces. For this reason, there is no possibility of the light being reflected back to the liquid crystal layer 17 which would eventually result in a secondary scattering. Accordingly, the display contrast increased. The foregoing feature is discussed in detail in the Japanese Patent Application No. 4-145297 which is incorporated by reference.

Figure 15:
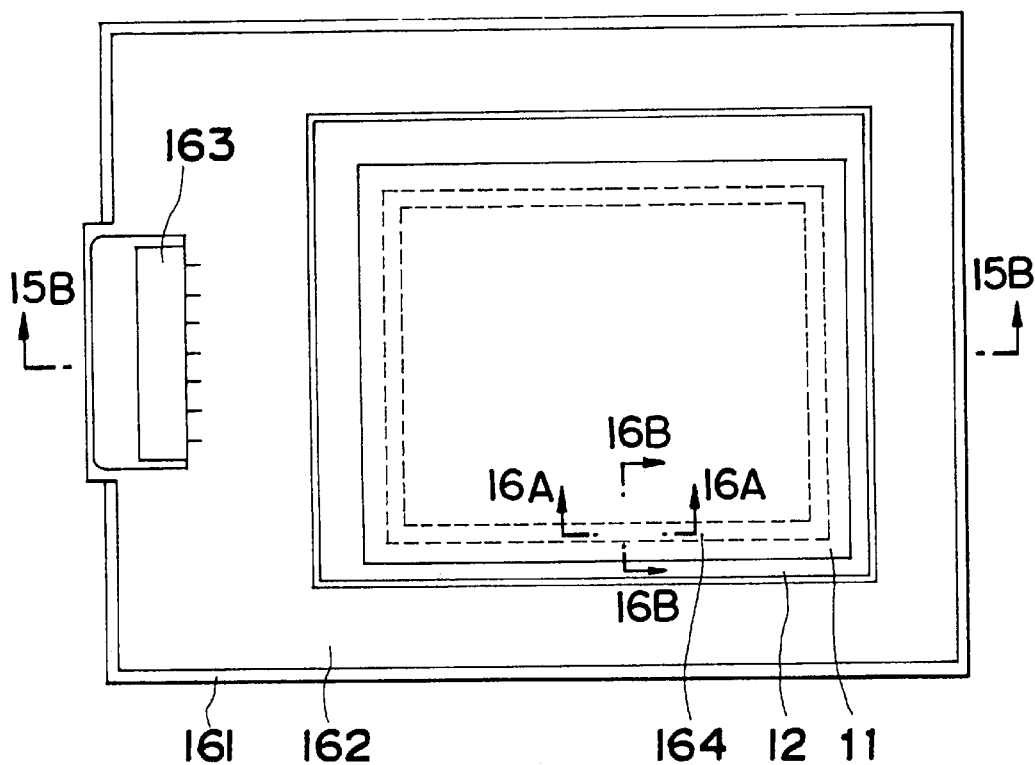
FIG. 15A is a plan view of another embodiment of the display panel of the present invention.
FIG. 15B is a cross-sectional view taken along the line 15B—15B in FIG. 15A.
Figure 15:
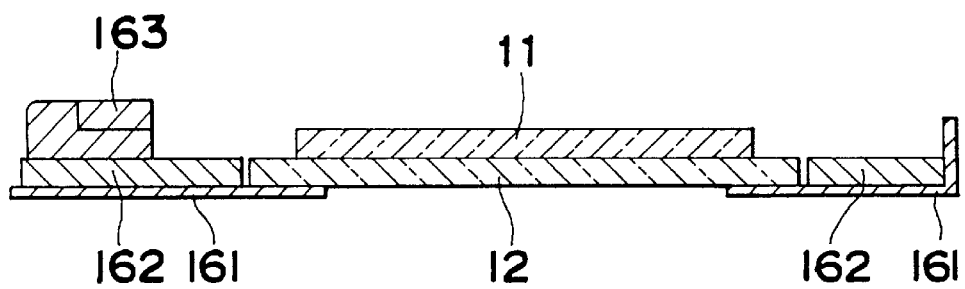
Figure 16:
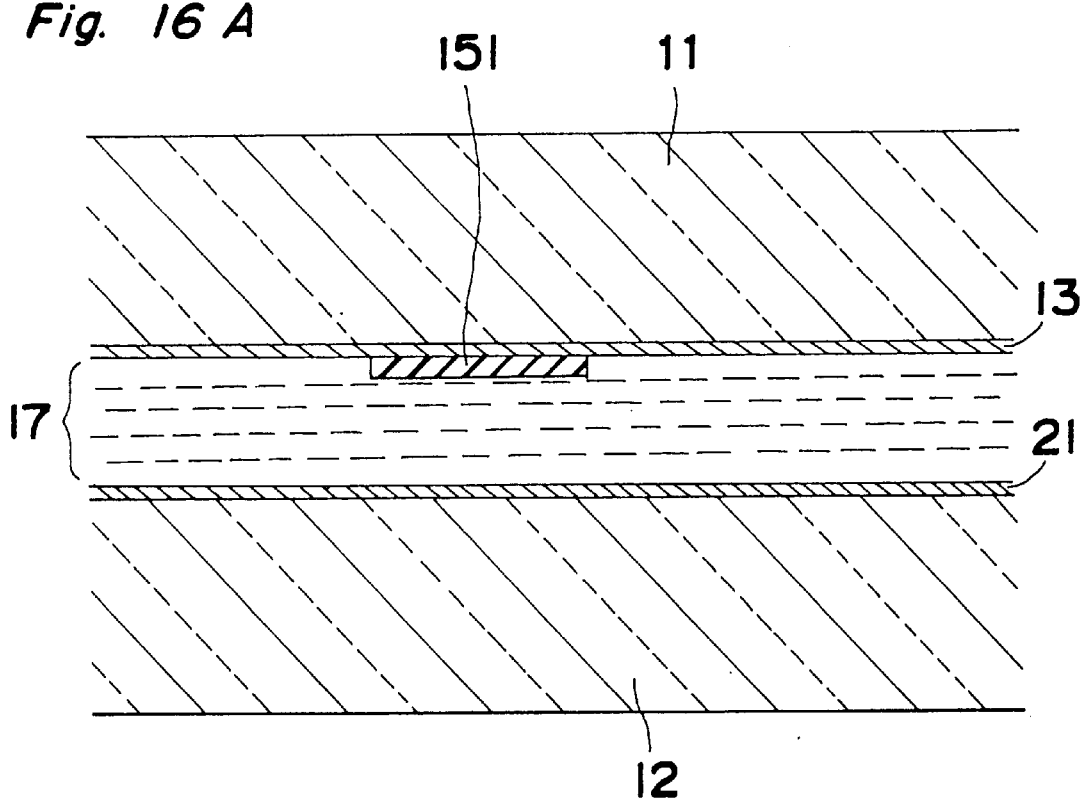
FIG. 16A is a cross-sectional view taken along the line 16A—16A in FIG. 15A.
FIG. 16B is a cross-sectional view taken along the line 16B—16B in FIG. 15A.
Figure 16:
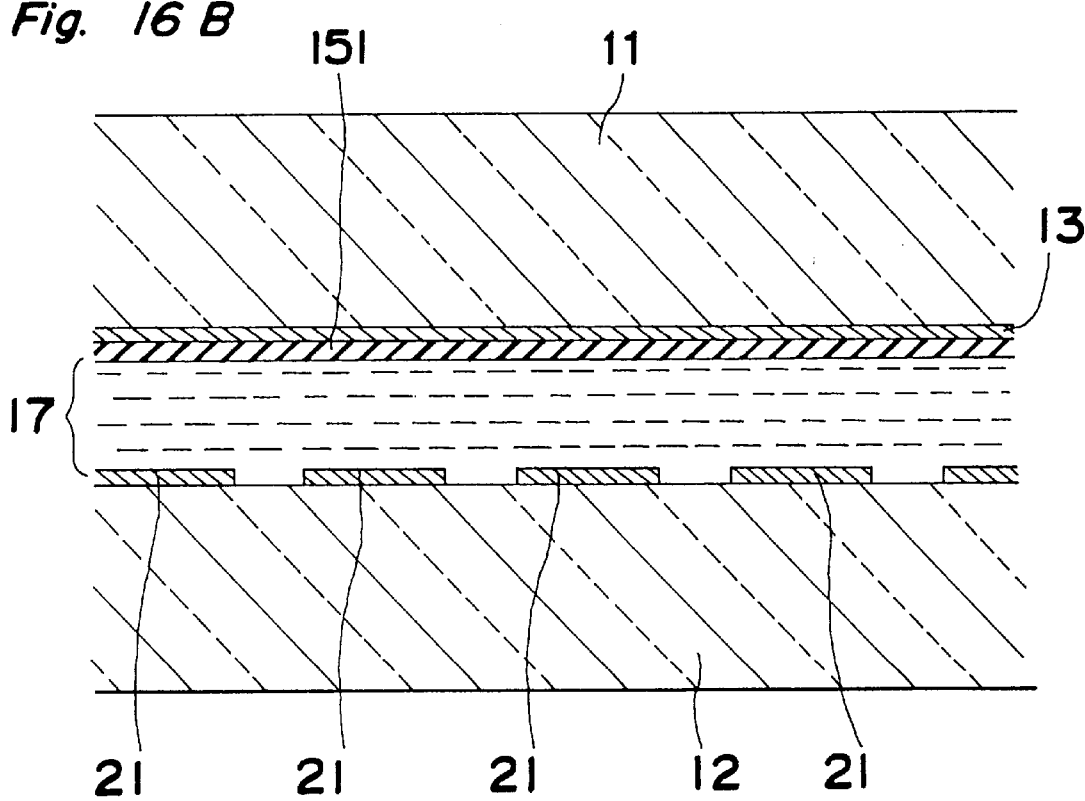

When a light shielding pattern 164 shown in FIG. 15A is formed by the use of the multi-layered dielectric film discussed hereinabove, the UV resin underneath the light shielding pattern can be cured and can also be given a light shielding function. An embodiment thereof is shown in FIG. 16A illustrating a cross-sectional representation of the display panel taken along the line 16A—16A in FIG. 15A in a direction parallel to the source signal line 21 and FIG. 16B illustrating a cross-sectional representation of the display panel taken along the line 16B—16B in FIG. 15A in a direction perpendicular to the source signal line 21. As shown therein, the light-shielding pattern 151 is formed on the outside of the display region.

During the manufacture of the display panel, the LC mix injected into the space between the counter substrate 11 and the array substrate 12 is radiated by the UV rays of light from the side of the counter substrate 11 to allow the UV radiations to pass through the multi-layered dielectric film 151 to cure the UV resin. Also, after the display panel has been completely fabricated and during the use of the display panel, light to be modulated by the display panel will be reflected once it impinges upon the multi-layered dielectric film 151. Accordingly, no light emerge towards the array substrate 12. The multi-layered dielectric film 151 is of a structure shown in Tables 1 to 3 and exhibits such effects as described with reference to FIG. 1.

The foregoing embodiment of the display panel of the present invention pertains to the active matrix type display panel in which the thin-film transistor is disposed for each pixel electrode. A technical idea of allowing the multi-layered dielectric film 16 to function as a black matrix by transmitting the UV rays of light therethrough and reflecting possible rays of light is equally applicable to the simple matrix type display panel.

FIGS. 18A and 18B illustrate an embodiment in which the technical idea of the present invention is applied to the simple matrix type display panel. In this embodiment, an electrode substrate 174 is formed with striped electrodes 171 made of ITO whereas an electrode substrate 175 is also formed with striped electrodes 176 made of ITO so as to extend perpendicular to the striped electrodes 171.

Figure 17A:
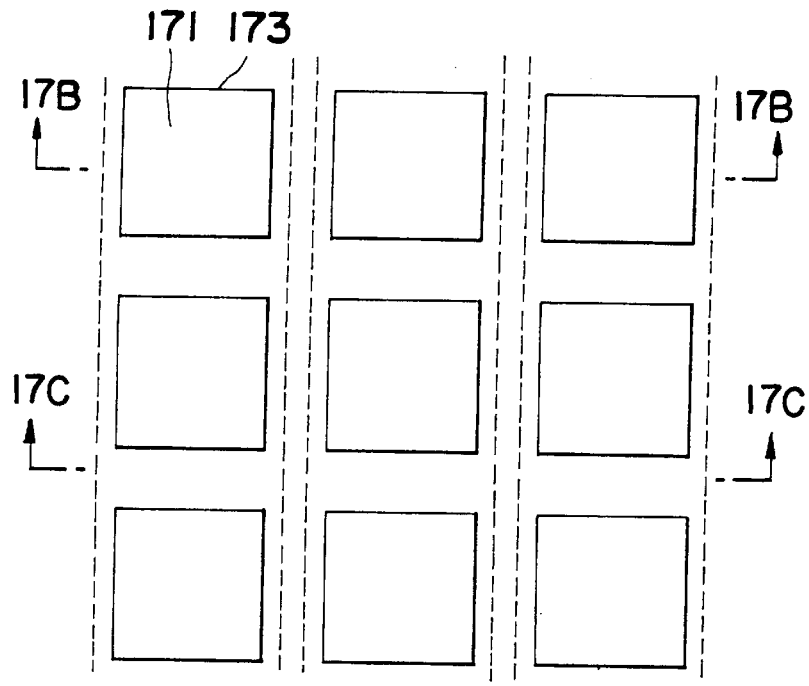
FIG. 17A is a plan view of an array of pixels employed in the display panel of the present invention.
Figure 17B:
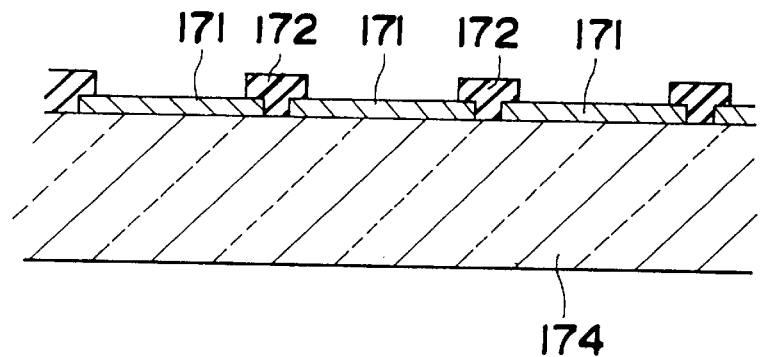
FIG. 17B is a cross-sectional view taken along the line 17B—17B in FIG. 17A.
Figure 17C:
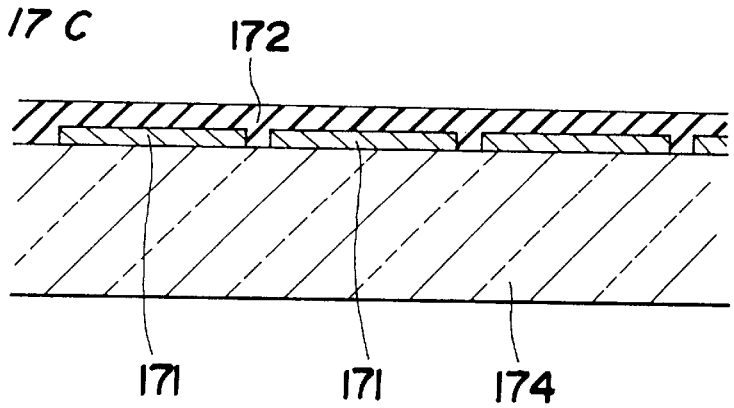
FIG. 17C is a cross-sectional view taken along the line 17C—17C in FIG. 17A.

In the embodiment shown in FIGS. 18A and 18B, the multi-layered dielectric film 172 is formed only on the electrode substrate 174. As shown in FIG. 17A, the multi-layered dielectric film 172 is formed on portions other than rectangular apertures (pixels) 173. A cross-sectional representation taken along the line 17B—17B in FIG. 17A and that taken along the line 17C—17C in FIG. 17A are shown in FIG. 17B and FIG. 17C, respectively. The multi-layered dielectric film 172 used therein is of a type having a function similar to that shown in Tables 1 to 3. This multi-layered dielectric film 172 exhibits such effects and functions as discussed with reference to FIG. 1 and they are not therefore reiterated for the sake of brevity.

Even in the simple matrix type display panel, since different signals are applied between the striped electrodes 171a and 171b, the transverse electric field is developed between these electrodes. if the liquid crystal molecules are oriented in the transverse electric field so developed, a light transmissive state is established between these electrodes. On the other hand, if the multi-layered dielectric film 172 is formed, and even if the light transmissive state is so established, the multi-layered dielectric film 172 functions as a black material and therefore no light leakage occur. Accordingly, a favorable image display can be accomplished. Also, the multi-layered dielectric film 172 has a relative dielectric constant ε smaller than that of the liquid crystal material. Accordingly, such an electric field shielding effect as shown in FIG. 4 and others is obtained. In other words, the intensity of the transverse electric field can be reduced by the multi-layered dielectric film 172.

Figure 19A:
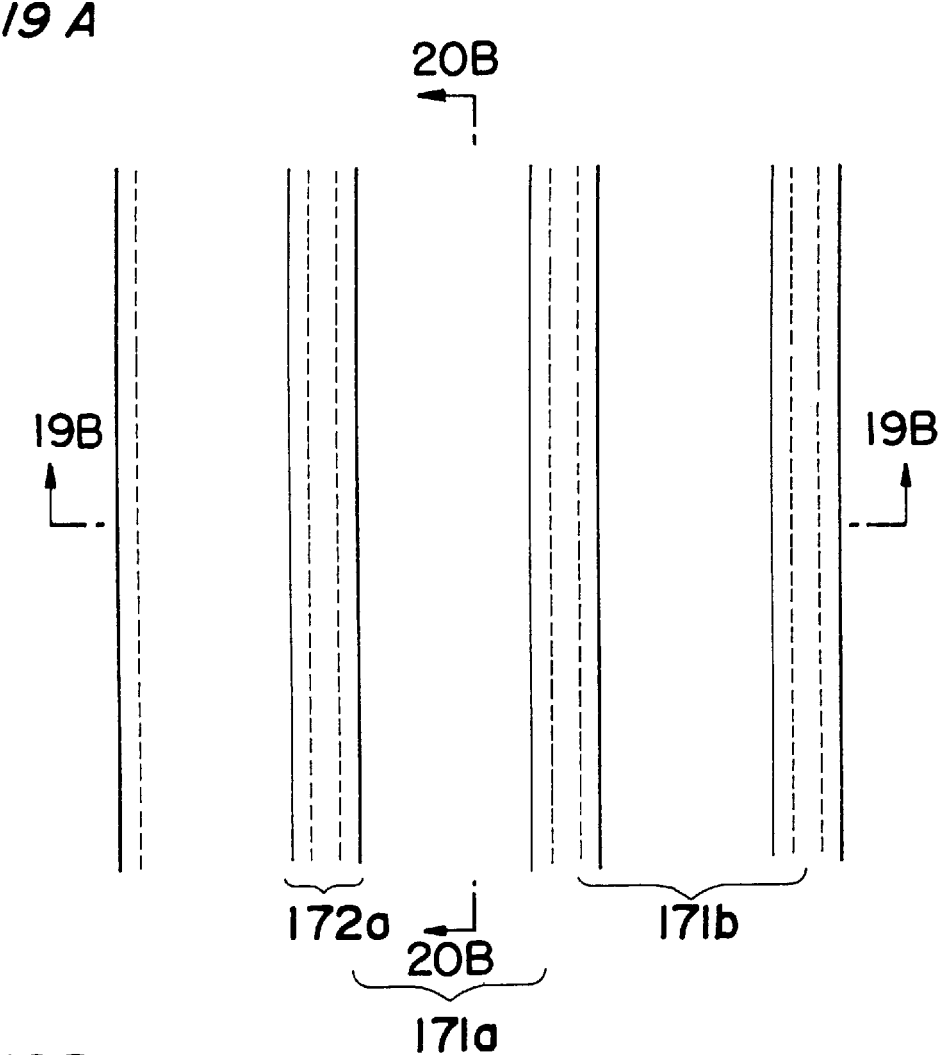
FIG. 19A is a plan view of a substrate employed in a different embodiment of the display panel of the present invention.
Figure 19B:
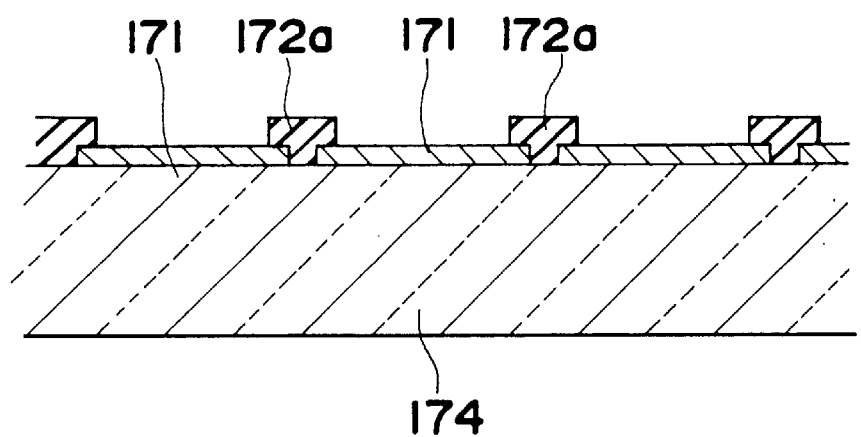
FIG. 19B is a cross-sectional view taken along the line 19B—19B in FIG. 19A.
Figure 20A:
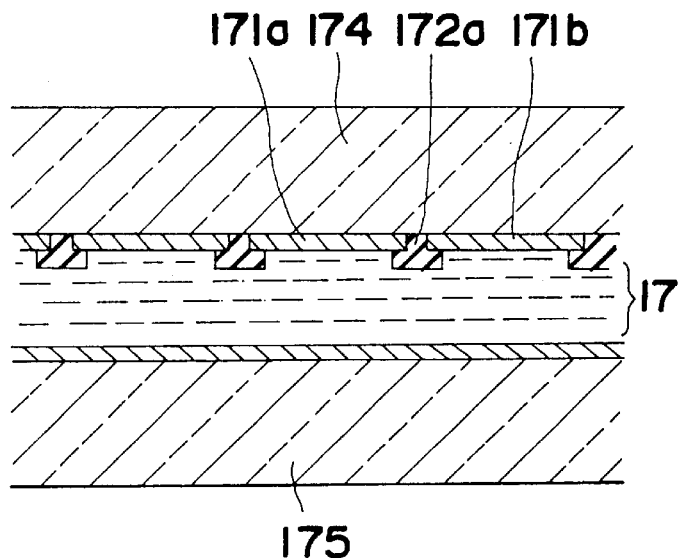
FIG. 20A is a cross-sectional view of the display device shown in FIG. 19A.
Figure 20B:
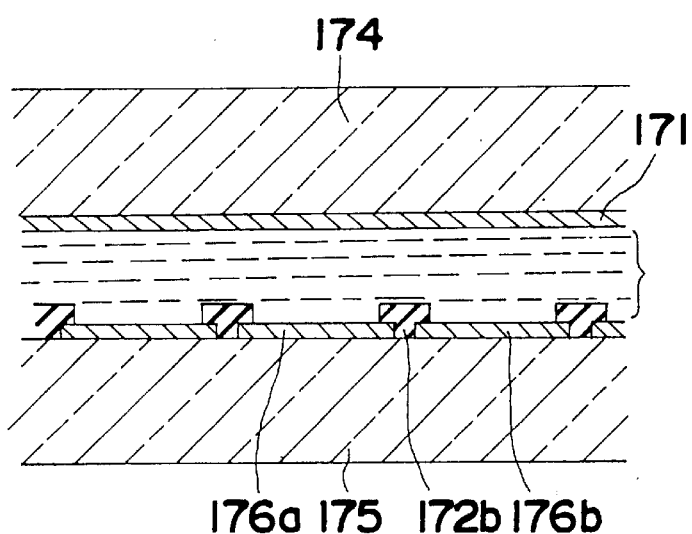
FIG. 20B is a cross-sectional view taken along the line 20B in FIG. 19A.

Although in FIGS. 18A and 18B the multi-layered dielectric film is formed only on the electrode substrate 174, it may be also formed on the electrode substrate 175 as shown in FIG. 20A showing a cross-sectional representation taken along the line 19B—19B in FIG. 19A and FIG. 20B showing a cross-sectional representation taken along the line 20B—20B in FIG. 19A. In this case, it may be formed in the form of a matrix as shown in FIG. 17A, but it may be formed in the form of a striped pattern as shown in FIG. l9A. FIG. 20A illustrates the multi-layered film 172a formed by the use of the electrode substrate formed in a striped pattern. It is to be noted that to form in a striped pattern means that the multi-layered dielectric film 172 is formed in a stripped pattern between the striped electrodes 171a and 172b.

FIGS. 20A and 20B illustrate the use of the two electrode substrates, shown in FIG. 19A, which are laid perpendicular to each other. The electrode substrate 175 is formed with the striped electrodes 176 with the multi-layered dielectric film 172b formed between each neighboring striped electrodes. The multi-layered dielectric film 172b serves to avoid the transverse electric field between the striped electrodes 176a and 176b and also to function as a black matrix effective avoid any possible light leakage from between the striped electrodes. On the other hand, the striped electrodes 171 are also formed on the electrode substrate 174 with the multi-layered dielectric film 172a formed between each neighboring striped electrodes. It is to be noted that the color filter may be formed on one of the striped electrodes 171 and 176. As is the case with FIG. 8, it is clear that color filters may be formed between each neighboring striped electrodes and, by overlapping the color filters, the color filters can function as a light shielding film.

The foregoing description pertains to the display panel utilizable to display televised pictures. The technical idea of the present invention can, however, be equally applicable to a display panel (hereinafter referred to as an alphanumeric character display panel) for the display of fixed graphics and/or alphanumeric characters.

Figure 21B:
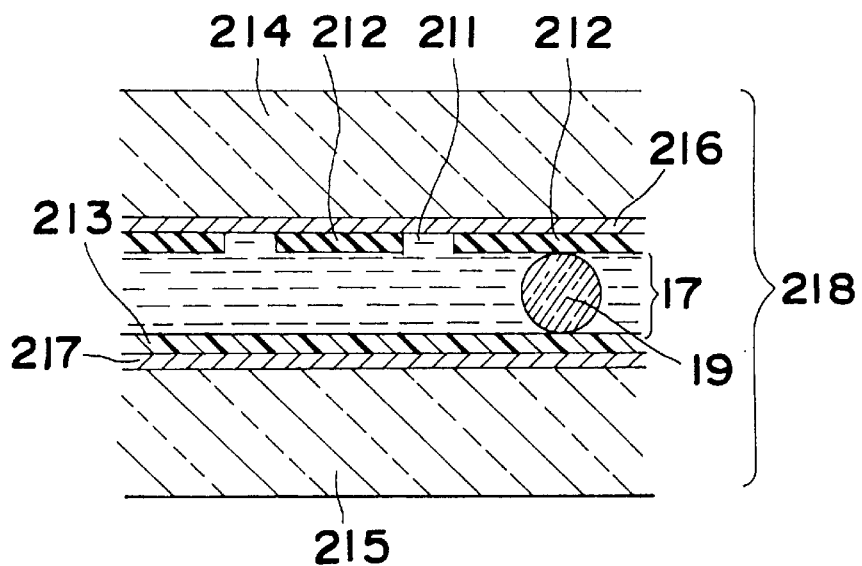
FIG. 21B is a cross-sectional view taken along the line 21B—21B in FIG. 21A.

FIG. 21A illustrates a front view of the alphanumeric character display panel and FIG. 21B illustrates a cross-sectional representation thereof taken along the line 21B—21B in FIG. 21A. Although FIGS. 21A and 21B illustrate an example of the display panel used to display an alphanumeric character comprised of seven separate segments laid in a pattern of the figure of "8", the present invention need not be always limited thereto and may be applied to display of such a combination of characters as "OFF", "ON" and "0X".

As shown in FIG. 21B, the electrode substrate 215 has a reflecting electrode 217 formed thereon and made of a metallic thin-film, and a color filter 213 is deposited on the reflecting electrode 217. On the other hand, the electrode substrate 214 has a counter electrode 216 formed thereon and made of ITO, and multi-layered dielectric films 212 are formed on the counter electrode 216. The polymer dispersed liquid crystal layer 17 is sandwiched between the electrode substrates. It is, however, to be noted that, in the electrode substrate 215, reference numeral 217 may be a color filter and reference numeral 213 may be ITO.

The color filter 213 is formed on the electrode 217 in an area at least larger than the apertures 211. Also, the color that is reflected by the color filter 213 matches with the color of light reflected by the multi-layered dielectric film 212. In other words, when the liquid crystal layer 17 is in a transparent state (with a voltage applied between the electrodes 216 and 217), the figure of "8" is invisible. Conversely, when the liquid crystal layer 17 is in a condition scattering light (with no voltage applied between the electrodes 216 and 217), the liquid crystal layer 17 is in a white-colored muddy state allowing the figure of "8" to be displayed in white color.

The multi-layered dielectric film 212 may be of a structure shown in Tables 1 to 3 and may have similar effects and functions as discussed with reference to FIG. 1 and, therefore, the details thereof will not be reiterated for the sake of brevity. It is to be noted that the multi-layered dielectric film 212 may be formed on a surface of the electrode substrate 214 which is held in contact with air as shown in FIG. 22B.

FIG. 23 illustrates a structural diagram showing a display device utilizing the display panel 218 shown in FIGS. 21A and 21B. A switch 236 is disposed above the display panel 218 and is made of transparent electroconductive sheets 231a and 231b. The electroconductive sheets 231a and 231b can be electrically connected with each other when they are brought into contact with each other. Whether or not an electric circuit is established between these electroconductive sheets 231a and 231b is detected by a detecting means 237. This detecting means 237 includes an inverter 235 and a T-type flip-flop 234 in which a logical level of a C output is reversed upon conduction between the sheets 231a and 231b. In other words, when the user applies a finger pressure to the electroconductive sheet 231a, the logical level of the C output of the flip-flop 234 is reversed. An analog switch 232 is operable in response to the C output to switch a switch S on and off. When the C output is in a high level, the switch S is switched on, but when the C output is in a low level, the switch S is switched off. So long as the switch S is switched on, a rectangular signal is applied from an alternating signal source 233 to the electrode 216 of the display panel 218, causing the liquid crystal layer 17 to assume a transparent state. Once the liquid crystal layer 17 is brought into the transparent state, no character is visible from the display panel 218. Conversely, when the liquid crystal layer 17 is in the white-colored muddy state, a character will be visible from the display panel 218.

Thus, it will readily be understood that by depressing the transparent electroconductive sheet 231a by the application of a finger pressure, it is possible to allow the display panel 218 to display an alphanumerical character. As one possible application, the touch panel can be used for selectively switching an electric home appliance on and off or for selectively switching an electronic note on and off.

The technical idea of the present invention can also be applied to a liquid crystal display panel of a light-writable type in which the polymer dispersed liquid crystal material is employed such as disclosed in the Japanese Laid-open Patent Publication No. 2-93519. Also, the effect of functioning as a black matrix by reflecting the particular region of visible light is also applicable not only to the TN liquid crystal display panel, but also to the STN liquid crystal display panel. By way of example, the black matrix 381 shown in FIG. 60 may be made into the multi-layered dielectric film 16.

As the foregoing description has made it clear, the display panel of the present invention is such that the multi-layered dielectric film 16 is formed on either one of the first and second substrates. By constructing this multi-layered dielectric film 16 so as to reflect the particular wavelength region of visible light and as to pass the UV rays of light therethrough, after the LC mix has been sandwiched between the first and second substrates, the UV resin underneath the multi-layered dielectric film 16 can be cured by radiating the UV rays of light. Accordingly, since all of the UV resin contained in the LC mix sandwiched between the substrates can be cured, the display panel free from aging and stable in operation can be obtained.

Also, since the multi-layered dielectric film 16 serves to reflect light incident on the display panel, it has a light shielding function as is the case with the black matrix used in the conventional TN liquid crystal display panel.

Furthermore, since the multi-layered dielectric film 16 has a relative dielectric constant smaller than that of the liquid crystal material, the number of the electric lines of force developed between the signal lines and the counter electrode can be reduced, thereby controlling the light leakage from around each pixel. If the light shielding film 51 is formed around each pixel electrode, the above described effect can further be increased. Also, formation of the color filters so as to overlap one above the other at portion between each neighboring pixels renders the color filters to function as light shielding film.

As shown in FIG. 38, if the electric lines of force generated from the source signal lines 21 are shielded by low dielectric columns 391, the light leakage from around each pixel electrode 15 can be reduced since the electromagnetic coupling between the source signal lines 21 and the pixel electrodes 15 can be avoided.

Also, it is effective to form the insulating film 111 on at least one of the pixel electrodes and the counter electrode 13. Formation of the insulating film 111 made of organic material on the electrodes is effective to increase the charge retentivity. The insulating film 111 has an additional effect of avoiding any possible separation between the liquid crystal layer 17 and the electrodes because almost half of the material forming the liquid crystal layer 17 is organic material made of resin.

Again, formation of the insulating film 111 made of organic material brings about such an effect that the pore size of the network, or the particle size of liquid crystal droplets, can be rendered uniform.

Yet, the use of the polymer dispersed liquid crystal material does not require the use of the polarizing plate and, therefore, a higher luminance display corresponding to twice that achieved by the TN liquid crystal display panel can be attained. This in turn brings about an increase of the efficiency of utilization of light and also a considerable reduction of the possibility of the light being converted into heat, thereby minimizing the deterioration of the liquid crystal display panel which would occur as a result of heating. This is particularly advantageous in the case of the projection type display device in which the intensity of light incident on the display panel amounts to some ten thousand luxes.

Hereinafter, the projection type display device of the present invention will be described with reference to the accompanying drawing. At the outset, specification common to all of the projection type display devices of the present invention will first be described. It is to be noted that specific values or specific range of values recited in the following description are matter of importance particularly where the display panel in which the polymer dispersed liquid crystal material is used as a light modulating layer is employed as a light valve.

In order to increase the efficiency of utilization of light in the projection type display device of the present invention, the F-number relative to the illumination must be increased if the effective display size of the display panel is reduced. If the effective display size d of the display panel is increased, the F-number relative to the illumination may be reduced and, therefore, a large size image display can be achieved. However, the increased effective display size of the display panel renders the system size of the projection type display device to be bulky and, therefore, this is not desirable. On the other hand, the reduced effective display size of the display panel results in an increase of the density of light flux per unitary area, resulting in heating of the display panel and, therefore, this is also undesirable.

Also, if the light emitter luminance is fixed to $1.2 \times 10^8$ (nt) in consideration of the lifetime of a lamp, it may be that the arc length and the power consumption of the lamp will be proportional to each other. By way of example, the lamp having an arc length of 3 mm, 4 mm or 5 mm will consume about 50, 100 or 150 watts of an electric power, respectively. The efficiency of a metal halide lamp is 80 lm/W. The total light flux of the 50, 100 or 150 watt lamp is 4,000, 8,000 or 12,000 lm. The ark length of a particular lamp and the amount of electric power consumed thereby have a correlation with each other and the ark length and the F-number have a correlation with each other.

In order to obtain the projection type display device having 40 or more inch in projected image size and capable of providing a practically acceptable viewing angle and the brightness of the image, the light flux of 300 to 300 lm is required. Accordingly, assuming that the efficiency of utilization of light of the lamp is about 4%, the lamp of 100 watt or higher must be employed. In view of this, if only the favorable display contrast (CR) is desired to achieve, the lamp having an arc length of 3 mm may be employed, but in order to obtain the satisfactory luminance of the projected image, the use of a metal halide lamp of 100 watt is needed.

Also, no satisfactory display luminance can be obtained if the effective display size of the display panel is small. If the ark length is 5 mm and the effective F-value of the illumination is 7, the effective display panel size must be about 3.5 inches. If the arc length is about 5 mm and the effective display panel size is about 2 inches, the effective value of the illumination will be about 5. In such case, though the display luminance falls within an acceptable range, no favorable display contrast (CR) can be obtained.

As a result of a series of experiments and evaluations, the display luminance within the practically acceptable range can be obtained if the effective F-value of the illumination is 5 or greater. However, it has been concluded that, in order to secure the satisfactory display luminance, the display contrast and the proper amount of power consumption without sacrificing the lifetime of the lamp, the effective F-value of the illuminance (effective F-value of the projected light) must be about 7, the arc length of the lamp must be about 5 mm and the amount of power consumption by the lamp must be about 150 watt.

Reduction in F-number of the projection lens increase of the light flux that reaches the screen. Correspondingly, the amount of electric power consumed by the lamp must also be increased. Also, in terms of prolongation of the lifetime of the lamp, increase in amount of electric power consumed thereby requires the use of the lamp having a long arc length if the arc luminance is fixed. As a matter of course, the display contrast (CR) decreases with decrease of the F-number. Conversely, increase of the F-number of the projection optics results in increase of the display contrast, but the screen light flux decreases.

As a result of a series experiments and evaluations, the lamp must have an arc length within the range of 6 mm in order to obtain a satisfactory display contrast. Also, it must be rated not higher than 250 watt. Yet, the lamp must be a metal halide lamp of 100 watt or higher in order to obtain a satisfactory screen luminance. More preferably, considering the screen luminance and the display contrast, the arc length must be within the range of 3 to 6 mm.

The diagonal length of the effective display area of the display panel must be not greater than 4.5 inch in terms of the system size. Also, in term of the efficiency of utilization of light, it must be not smaller than 2 inch. Of them, in order to obtain a satisfactory efficiency of light collection and to render the system size to be compact, the diagonal length of the effective display area of the display panel must be within the range of 3 to 4 inches.

The F-number of the projection lens, or broadly speaking, the F-number of the projection optics, must be not smaller than 5 in order to secure a satisfactory display contrast. Also, in order to secure a satisfactory screen luminance, it must be not greater than 9. Yet, considering the selected arc length of the lamp, the F-number must be within the range of 6 to 8.

Attention is called that, unless the angle of spread of the illumination (F-number) matches with the angle of light collection (F-number) of the projection lens, the efficiency of utilization of light will decrease. This is because the greater the F-number, the more limitations. In the projection type display device of the present invention, the F-number of the illumination and the F-number of the projection lens are made equal to each other.

In the foregoing description, reference to the arc length being 5 mm should be understood as meaning the arc length of substantially 5 mm. The term "substantially" is intended to encompass the arc length of 8 mm, it being however to be noted that, if of the all amount of light emitted from the arc length of 8 mm, the projection lens merely collects a quantity of light emitted from an intermediate value of the arc length, that is, about 5 mm, the substantial arc length should be construed to be 5 mm. Similarly, the F-number should be understood as meaning an effective F-number. Even though the physical F-number is 4, the F-number will be not smaller than 4 if light merely pass through a portion adjacent the center of the pupil of the projection lens.

FIG. 24 is a first embodiment of the projection type display device according to the present invention. A light source 241 includes a concave mirror 241b and either a metal halide lamp or a xenon lamp as a light generating means 241a. A UVIR cut-off filter 241c operable to cut off UV rays of light and infrared rays is disposed on an exit side of the light source 241. The concave mirror 241b is designed to have a proper value in consideration of the arc length of the lamp 241a. This concave mirror 241b may be in the form of an elliptical or parabolic mirror. Reference numeral 242a represents a dichroic mirror (BDM) for reflecting the blue light, reference numeral 242b represents a dichroic mirror (GDM) for reflecting the green light, and reference numeral 242c represents a dichroic mirror (RDM) for reflecting the red light. It is to be noted that the order of arrangement of the dichroic mirrors 242a to 242c may not be limited to that shown and that the last dichroic mirror 242c may be replaced with a total reflection mirror.

Reference numeral 243a–243c represents the display panel of the present invention which may be the one shown in FIGS. 1, 3, 5, 11, 16, 17 or 38. However, it is to be noted that the film thickness of the liquid crystal layer 17 of the display panel 243c for modulating the red light is chosen to be greater than that of the liquid crystal layer 17 of the other display panels for modulating the green and blue light, respectively. Also, depending on the wavelength of light to be modulated, the average particle size of the liquid crystal droplets or the average pore size of the polymer network is varied. The longer the wavelength of light to be modulated, the greater the average particle size or the average pore size. This is because the scattering characteristic is lowered with increase in wavelength of light to be modulated, accompanied by reduction in contrast. Also, in the display panel in which the multi-layered dielectric film 16 is formed, the incident light is reflected by the multi-layered dielectric film 16 to function as a black matrix. Reference numeral 244a–244c represents a lens, reference numeral 246a–246c represents a projection lens, and reference numeral 245a–245c represents an aperture. It is to be noted that the elements 244, 245 and 246 form a projection optical system.

The aperture 245a–245c is merely illustrated for convenience of description of the operation of the projection display device. Since the aperture 245a–245c determines the angle of collection of light of the projection optical system, it suffices that it is included in the function of the projection optical system. In other words, the greater the F-value of the projection optical system, the smaller the diameter of the aperture 245a–245c. In order to secure a high contrast display, the F-number of the projection optical system is preferred to be of a greater value. However, the use of the greater F-number of the projection optical system results in reduction in luminance of a white display. Specifically, with no use of the aperture, the function of the projection optical system includes the function of the aperture. Reference numeral 247 represents a relay lens.

Figure 40:
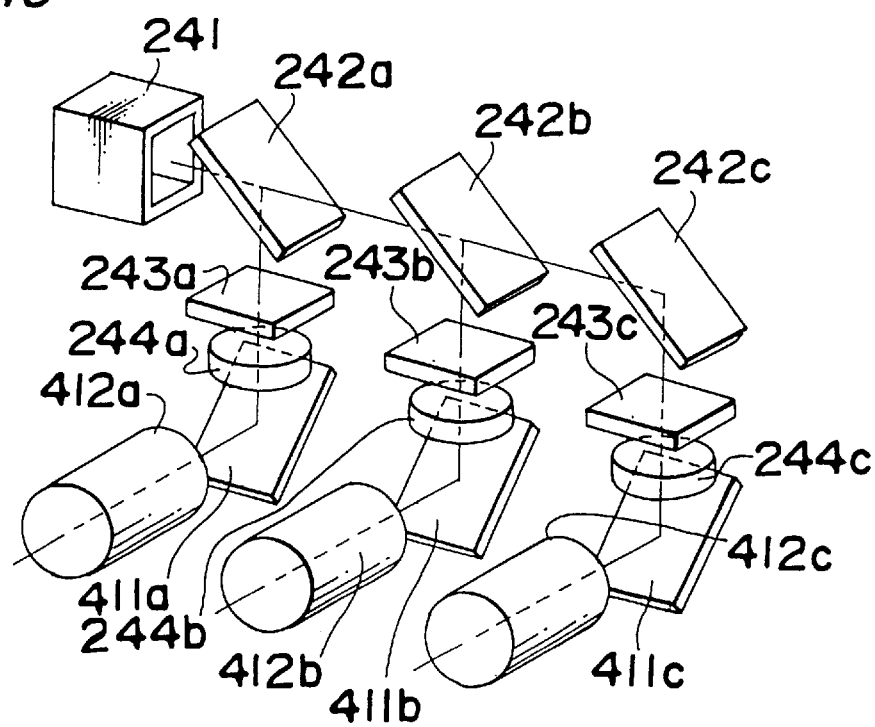
FIG. 40 is a fragmentary perspective view of the system shown in FIG. 24.
Figure 41:
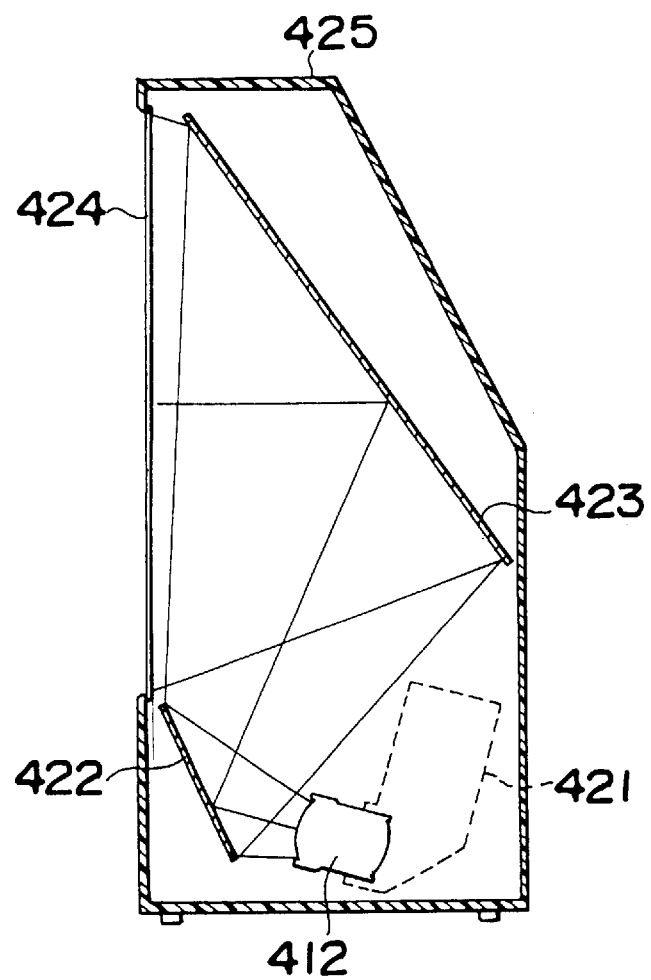
FIG. 41 is a side sectional view of the projection type display device of the present invention.

FIG. 40 illustrates the system of FIG. 24 in a perspective representation. It is, however, to be noted that elements that are not required for the discussion, including the relay lens 247, are not shown therein. Also, the structure of a cabinet 425 accommodating a projector 421 shown in FIG. 40 is shown in FIG. 41. The cabinet 425 includes a transmissive screen 424 disposed at a front upper portion thereof, the projector 421 disposed at a rear lower portion thereof, a plane mirror 422 disposed at a front lower portion thereof and a plane mirror 423 disposed rearwardly of the screen 424. By reducing the distance of projection (the length of an optical length from the projection lens to the center of the screen) and making the projector 421 compact, the cabinet 425 can be made compact.

Hereinafter, the operation of the projection type display device of the present invention will be described. It is to be noted that respective modulating systems associated with the red, green and blue light function in a manner similar to each other and, therefore, only the modulating system associated with the blue light will be referred to in the following description for the sake of brevity.

White light is emitted from the light source 241 and a blue light component contained in this white light is reflected by the blue dichroic mirror 242a. This blue light subsequently impinges upon the display panel 243a. The display panel 243a modulates the incoming light by controlling the scattered and transmissive states of the incident light in response to a signal applied to the pixel electrodes as shown in FIGS. 34A and 34B.

The scattered light is shielded by the aperture 245a, but parallel light or the light falling within a predetermined angle passes through the aperture 245a. The modulated light is projected by the projection lens 246a onto the screen (not shown) to display images on an enlarged scale. In this way, the blue light component of a particular image is displayed on the screen. Similarly, the display panel 243b modulates the green light component and the display panel 243c modulates the red light component, resulting in a color image reproduction on the screen.

Figure 25:
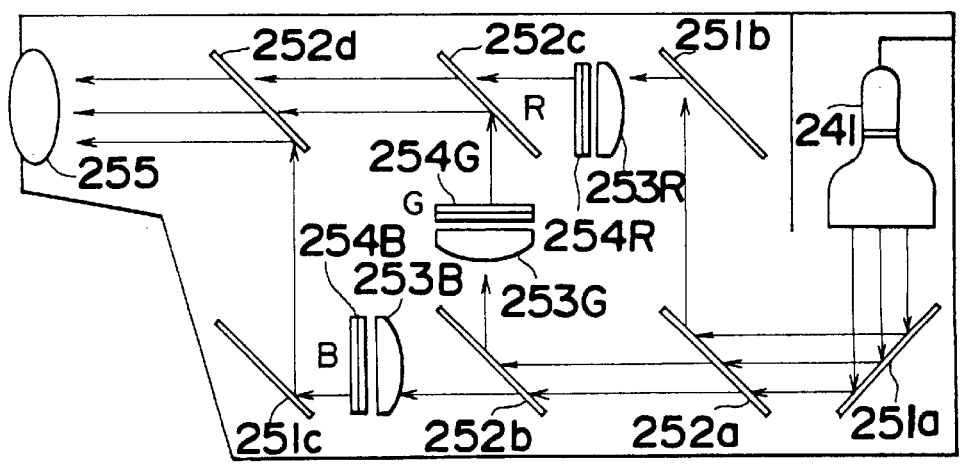
FIG. 25 is a diagram showing the projection type display device utilizing a single projection lens.

Although FIG. 24 illustrates the system in which the three projection lenses 246a–246c are employed to project images on the screen, the projection lens system may make use of only one projection lens, an example of which is shown in FIG. 25. A display panel 254 shown therein is the display panel of the present invention.

For simplification purpose, display panels for displaying images carried by green, red and blue light are identified by 254G, 254R and 254B. Accordingly, the dichroic mirror 252a reflects the red light, but passes the green and blue light therethrough, the dichroic mirror 252b reflects the green light, but passes the blue light, and the dichroic mirror 252b reflects the blue light, but passes the green and red light therethrough.

The light emitted from the metal halide lamp 241a is reflected by a total reflection mirror 251a and, consequently, the direction of travel of the light is changed. Then, as the light pass through the UVIR cut-off filter 241c, the UV and infrared regions of light are cut off by the UVIR cut-off filter 241c. The light emerging outwardly from the UVIR cut-off filter 241c is separated in to red, green and blue optical paths by the dichroic mirrors 252a and 252b, respectively and, thereafter, the red, green and blue light enters respective field lenses 253R, 253G and 253B. The field lenses 253R, 253G, 253B serve to collect the associated light, and the display panel 254R, 254G, 254B changes the orientation of the liquid crystal material in correspondence with a video signal to modulate the light. The red, green and blue light so modulated are again combined by dichroic mirrors 252c and 252d and then projected by the projection lens 255 onto the screen (not shown).

It is to be noted, in the projection type display devices shown in FIGS. 24 and 25, the simple matrix type display panel described with reference to FIGS. 18 and 20 may be employed as a light valve. Also, if the structure shown in FIG. 25 is disposed as a projector 421 within the cabinet 425, a projection type display device of a rear projection type as shown in FIG. 41 can be obtained.

Hereinafter, a projection type display device of the present invention in which the display panel of a reflective type shown in FIG. 12 and others is employed will be described in detail. FIG. 26 illustrates the projection type display device of the present invention in which the display panels of a reflective type shown in FIG. 12 are employed as respective light valves. A light source 241 is constituted by a lamp 241a, a concave mirror 241b and a UVIR cut-off filter 241c. The lamp 241a is a metal halide lamp and emits light of three primary colors, red, green and blue. The concave mirror 241b is made of glass and has a reflecting surface vapor deposited with a multi-layered coating effective to reflect a visible region of light, but transmit infrared rays of light. The cut-off filter 241c is of a structure including a glass substrate vapor deposited with a multi-layered coating effective to reflect a visible region of light, but transmit infrared rays of light. The visible region of light contained in the radiations emitted from the lamp 241a is reflected by the reflecting surface of the concave mirror 241b which is subsequently passed through the cut-off filter 241c. As the light passes through the cut-off filter 241c, infrared and ultraviolet rays of light are removed by the cut-off filter 241c.

A projection lens 261 is constituted by a first lens group 261a adjacent the display panels and a second lens group 261a adjacent the screen, and a plane mirror 262 is disposed between the first and second lens groups 261b and 261a. Scattered light emerging from a pixel located at a center of an image on the display panel 264 passes through the first lens group 261b and about half of it subsequently impinges upon the plane mirror 262 while the remaining portion of the light does not impinge upon the plane mirror 262, but passes through the second lens group 261a. The normal to the reflecting surface of the plane mirror 262 is inclined 45° relative to the optical axis 265. The light from the light source 241 is reflected by the plane mirror 262 and then impinge upon the display panel 264a–264c after having passed through the first lens group 261b. Rays of light reflected from the display panel 264a–264c are projected onto the screen after having passed through the first lens group 261b and then through the second lens group 261a. Rays of light emerging outwardly from the center of the aperture of the projection lens 261 towards the display panel 264 are of a telecentric nature so that they can enter the liquid crystal layer 17 substantially at right angles thereto.

For the sake of brevity, the display panel for modulating the red light is identified by 264a, the display panel for modulating the blue light is identified by 264c and the display panel for modulating the green light is identified by 264b.

In FIG. 26, although reference numeral 263 represents a dichroic mirror, this concurrently forms a color combining system and a color separating system. White light emitted from the light source is deflected by the plane mirror 262 before it enters the first lens group 261b of the projection lens 261. At this time, unnecessary blue and red light are cut off by the filter 241c. The half value of the band of the filter 241c is within the range of 430 to 690 nm. Hereinafter, reference to the band of light is expressed in terms of its half value. The dichroic mirror 263a reflects the green light, but passes the red and blue light therethrough. The green light does, after its band has been restricted by the dichroic mirror 263c, enter the display panel 264b. The band of the green light is assumed to be within the range of 510 to 570 nm. On the other hand, the dichroic mirror 263b reflects the blue light, but passes the red light therethrough. The blue light enters the display panel 264c, but the red light enters the display panel 264a. The band of the incident blue light is within the range of 430 to 490 nm, and the band of the incident red light is within the range of 600 to 690 nm. These bands of the light are equally employed in the other projection type display devices of the present invention. Each of the display panels operates in response to a video signal to form an optical image as a function of change in scattering condition. An optical system formed by each display panel is color combined by the dichroic mirror 263a–263c and is, after having passed through the projection lens 261, projected onto the screen 266 to form the image on an enlarged scale.

As shown in FIG. 26, the color separating optical system is constituted by the use of the dichroic mirrors which have a color separating function and a color combining function for combining the colors modulated by the respective liquid crystal display panels.

By constructing each display panel so as to be of a reflective structure, it is possible to dispose a heat radiating plate 271 directly on a rear surface of the array or counter substrate as shown in FIG. 27. The heat radiating plate 271 is fitted to the panel 264 by the use of a bonding agent made of silicone. By so constructing, cooling of the display panel can easily be accomplished.

Also, the light incident upon the display panel travels along an incident path from the counter electrode 125 to the reflecting electrode 121 and then along an exit path from the reflecting electrode 121 to the counter electrode 125 during its passage through the liquid crystal layer 17. Accordingly, as compared with the display panel of a transmissive type, the film thickness of the liquid crystal layer apparently corresponds to twice that of the display panel of a transmissive type. For this reason, as compared with the transmissive display panel, the scattering characteristic is improved and a high contrast display can be accomplished.

The dichroic mirror 262 functions as a filter effective to reflect (transmit) rays of light of a particular wavelength. By way of example, the dichroic mirror 263a is effective to reflect the rays of light of a particular wavelength at the time the light from the light source 241 impinges upon the display panel 264b. Also, the light reflected by the liquid crystal display panel 264b reflects rays of light of a particular wavelength at the time it enters the projection means 261.

Each dichroic mirror 263 reflects light twice, i.e., at the time the light enters the display panel and also at the time it emerges from the display panel. In the structure shown in FIG. 13, a single dichroic mirror restricts the wavelength band of light twice. In other words, the dichroic mirror functions as a secondary filter. As compared with the dichroic mirror 241 shown in FIG. 24, the cut-off characteristic by which the band is restricted becomes steep. For this reason, no overlap occur in the band of light incident upon each display panel. Accordingly, a color reproducibility can be improved and a high quality image display can be attained.

By allowing the dichroic mirrors 263 to exhibit both of the color separating function and the color combining function, reduction of the system size of the projection type display device is realized.

Figure 42:
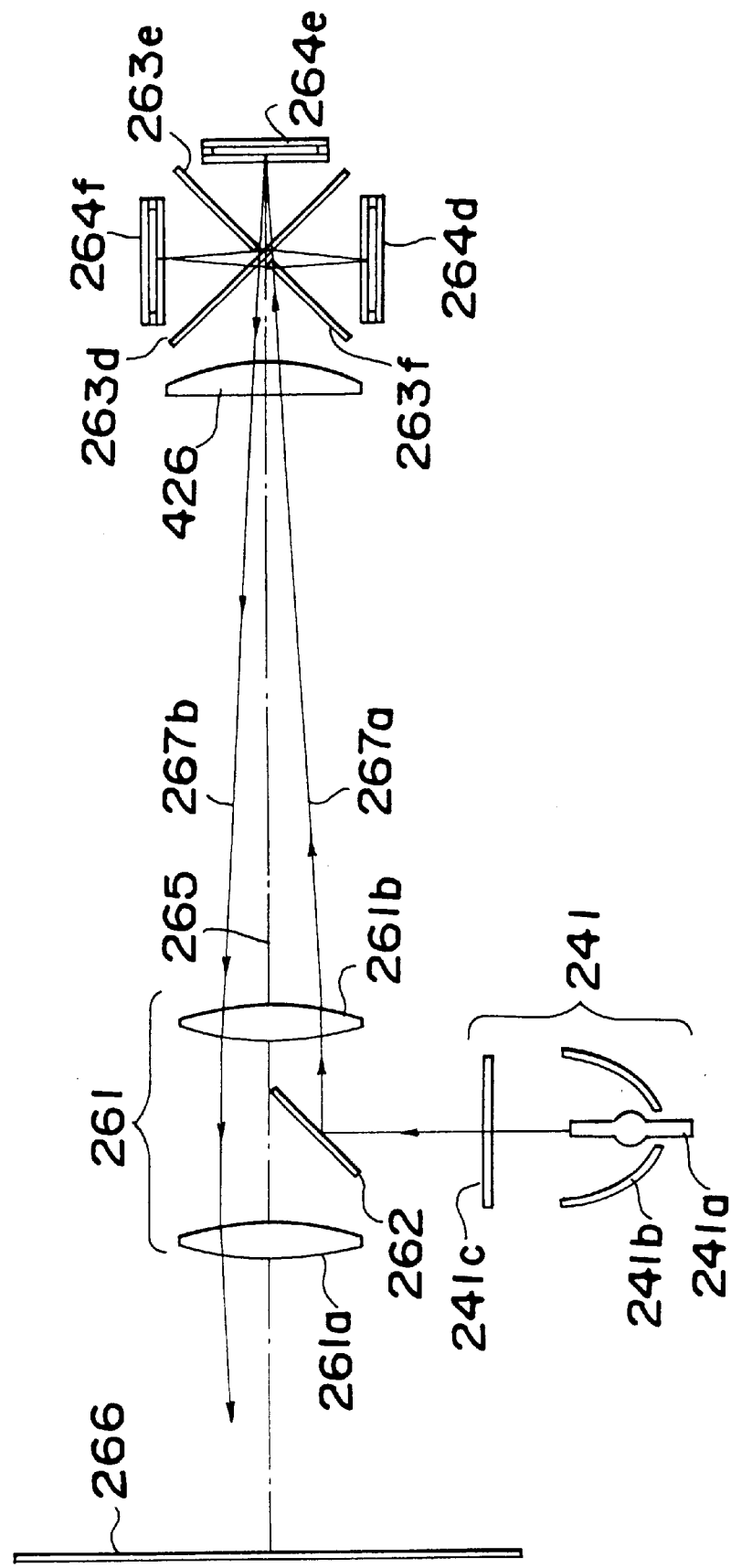
FIG. 42 is a diagram showing another embodiment of the projection type display device of the present invention.

Also, in order to render the color separating and combining optical system to be compact by the use of the dichroic mirrors, the projection type display device should be so constructed as shown in FIG. 42. It is to be noted that, in FIG. 42, reference numeral 426 represents an auxiliary lens. Three dichroic mirrors 263*d*, 263*e* and 263*f* are combined and arranged in a pattern similar to the shape of a figure "X". Incident light 267*a* is separated into light components of three primary colors, red, green and blue, by the respective dichroic mirrors 263*d*, 263*e* and 263*f*. By way of example, the dichroic mirror 263*d* reflects the red light, and the dichroic mirrors 263*e* and 263*f* reflect the blue light. The green light passes through the three dichroic mirrors before it reaches the display panel 264*e*. The separated light is modulated by the display panels 264*d*, 264*e* and 264*f* of the present invention, respectively. The modulated light becomes exit light 267*b* and is subsequently color combined by the dichroic mirrors 263 before it is projected by the projection lens 261.

It is to be noted that, although in FIGS. 24, 25, 26 and 42, the light has been described as separated into red, green and blue light components by the respective dichroic mirrors, the present invention need not be always limited thereto and, for example, dichroic filters, dichroic prisms and others may be employed.

FIG. 44 illustrates a structural diagram of the projection type display device in which a dichroic prism 441 is employed to accomplish color separation and combination. The dichroic prism 441 has two light separating surfaces 442*a* and 442*b* and the white light 267*a* is separated by the light separating surfaces 442 into the red, green and blue light components. Each display panel 264*d*–264*f* is fitted to the dichroic prism 441 through a respective wavelength limiting filter 433*a*–433*c*. In other words, the wavelength limiting filter 433 is fitted to the dichroic prism 441 so as to accomplish an optical coupling through an optical coupling agent 282 and each display panel 264 is in turn fitted to the respective wavelength limiting filter 433 so as to accomplish an optical coupling through an optical coupling agent (an optical coupling layer) 282.

The optical coupling agent 282 may be a bonding agent prepared from acrylic resin, a gel containing silicone resin or a liquid medium such as ethylene glycol. Of them, the optical coupling agent is preferred to be of a kind having an index of refraction equal to or about equal to that of the substrates of each display panel. More specifically, it may be a transparent silicone resin identified by "KE1051", available from Shinetsu Kagaku Kogyo Kabushilki Kaisha, having a thickness of 2 mm and a refractive index of 1.40. This is available in two liquid mediums which, when mixed together and then allowed to stand at room temperatures or heated, undergo an additive polymerization to cure in a gel fashion. Other than it, a liquid medium such as ethylene glycol, a transparent epoxy bonding agent or a transparent silicone resin which can cure in a gel fashion when exposed to UV rays of light may be employed. In any event, since the presence of an air gap between the substrate 11 and an object to be fitted thereto results in an abnormality in quality of the image displayed, care must be taken to avoid the air gap.

The dichroic prism 441 is a block made of glass or resin. Alternatively, the dichroic prism 441 may be of a structure made by preparing a frame (a vessel) of glass, inserting into the frame plates formed with light separating surfaces 442 and filling into a space inside the frame a liquid medium such as ethylene glycol having a refractive index substantially equal to that of material forming the frame. Other than ethylene glycol, a gel of silicone resin may be employed. The difference in refractive index between the frame and the liquid medium or the gel should be up to 0.15 and the refractive index is preferably within the range of 1.38 to 1.55.

Figure 45:
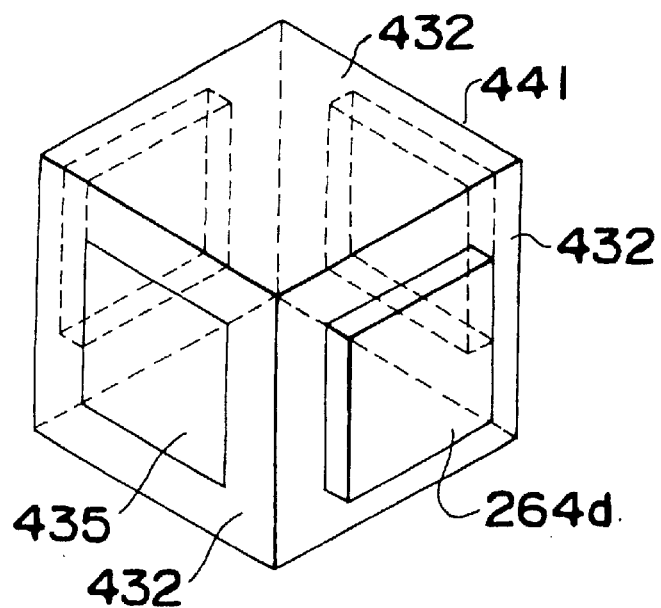
FIG. 45 is a perspective view of the dichroic prism shown in FIG. 44.

An ineffective area of the dichroic prism 441 (areas other than light incident and exit surfaces 435 and the surfaces to which the respective display panels 264 are fitted) is painted with a light absorbing film (such as a black paint) 432 as shown in FIG. 45. Material for the light absorbing film 432 may be similar to that used to form the light absorbing film 285. The light absorbing film 432 serves to absorb light scattered by the display panels 264. In other words, it suffices to have a function of absorbing light scattered by the display panels 264 and, therefore, it may not be always limited to black in color. By way of example, a paint of a color complementary to the color of light to be modulated by the light modulating layer 17 may be employed.

In addition, the term "light absorbing film" should be construed as including any other light absorbing means. By way of example, it should be understood as including the light absorbing film 432 formed by depositing a thin film on the ineffective area of the prism 441 by the use of a vapor deposition technique, a light absorbing plate or film lined to the ineffective area of the prism 441 or the ineffective area of the prism 441 which is ground to scatter the incident light.

The wavelength limiting filter 433 may be in the form of a dichroic mirror or filter, or a filter (color absorbing filter) made of glass or resin in which light absorbing dyes are dispersed. Any of these filters may be employed in the projection type display device of the present invention, but the use of the dichroic filter capable of limiting the band of light to a narrow band is most preferred. However, since the color absorbing filter has a function of absorbing light scattered within the prism 441, the use of it is recommended where, even though the efficiency of utilization of light is somewhat lowered, a satisfactory display contrast is desired. For this reason, no one can determine that one of the dichroic filter and the color absorbing filter is better than the other.

The reason that each display panel 264 is fitted to the dichroic prism 441 in an optically coupled fashion by the use of the optical coupling agent 282 will now be discussed. It is, however, to be noted that the projection type display device in which the display panels are fitted to a prism is disclosed in the Japanese Laid-open Patent Publication No. 6-34931.

Figure 46:
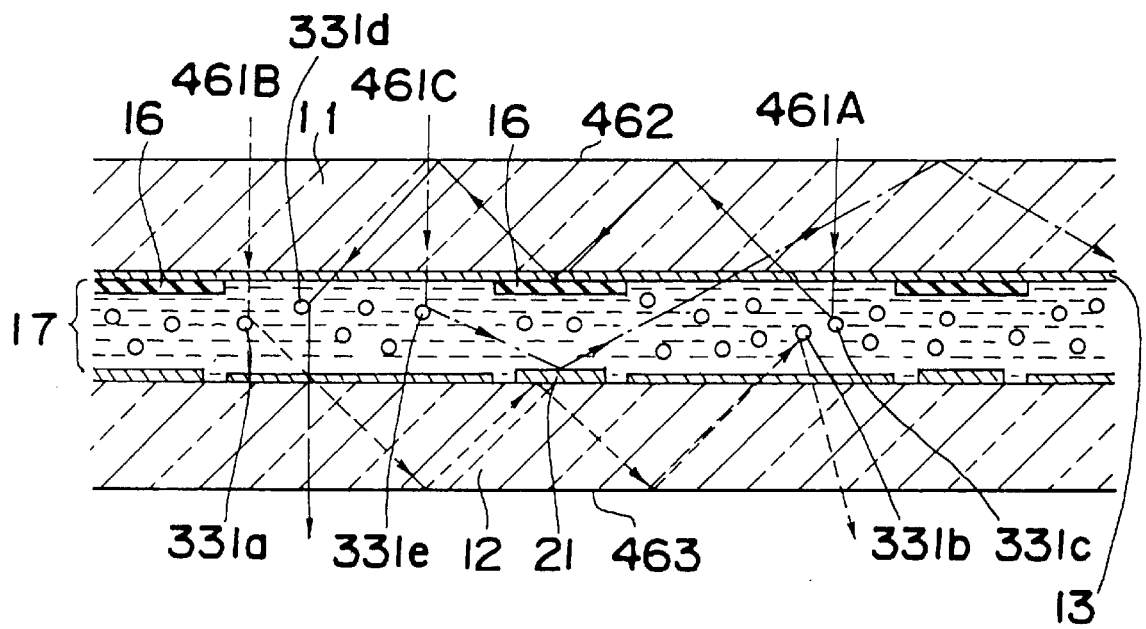
FIGS. 46 and 47 are cross-sectional representations of the display panels of transmissive and reflective types, respectively, showing how light is scattered as it enters into the display panel.

FIG. 46 illustrates a side sectional representation of the display panel of the present invention. It is assumed that incident light 461A–461C enters the display panel from a side of the counter substrate. The incident light 461A is scattered by liquid crystal droplets 331*c* (not always limited thereto, by way of example, the interface of resin may serve the purpose where the liquid crystal layer 17 is constituted by a polymer network type) of the liquid crystal layer 17. The scattered light scatters in all directions and portion thereof enters the liquid crystal layer 17 after having been reflected by the interface 462 between the counter substrate 11 and air and the multi-layered dielectric film 16. The incident light entering the liquid crystal layer 17 is scattered by the liquid crystal droplets 331d (this scattering being referred to as a secondary scattering), a portion of the scattered light subsequently emerging outwardly towards the array substrate. The light emerging therefrom is then projected onto the screen through the projection lens.

The display panel of the present invention is provided with the multi-layered dielectric film 16 which functions as a black matrix. The multi-layered dielectric film 16 is effective to reflect the incident light by the effect of light interference with no loss of light. Also, by scattering the incident light, the display panel of the present invention performs a light modulation. For this reason, scattering of light between the liquid crystal layer 17 and any one of the substrates 11 and 12 is apt to occur as shown in FIG. 46. The light scattering constitutes a cause of blurring of the pixels which in turn brings about reduction in window contrast accompanied by lowering of the quality of the displayed image. There is also light, such as the incident light 461B, which is scattered by the liquid crystal droplets 331a, then enters the liquid crystal layer 17 again after having been reflected by the interface 463 between the array substrate 12 and the air and also by the source signal lines 21 and subsequently emerges outwardly from the array substrate 12 after having again been scattered by the liquid crystal droplets 331b. There is again light, such as the incident light 461C, which is scattered by the liquid crystal droplets 331e and impinge the pixels after having been reflected by the source signal lines 21 and the interface 462 between the counter substrate 11 and the air.

Although the incident light 461A has been described as reflected by the multi-layered dielectric film 16, it is needless to say that, even when the multi-layered dielectric film 16 is in the form of a black matrix made of metal (for example, Cr), light is scattered as shown in the figure to create a secondary scattering. However, in the case with Cr, since the reflectivity thereof is about 60% which is lower than that of the multi-layered dielectric film 16, the extent to which the second scattering occurs is low. In any event so far as the occurrence of the secondary scattering is concerned, the previously discussed phenomenon is apt to occur particularly in the display panel of the present invention.

The foregoing technical idea in which the occurrence of the secondary scattering is suppressed and the window contrast is improved to improve the quality of the displayed image shares the same underlying problem with the attempt to improve the quality of the displayed image by avoiding light leakage from around the pixel electrodes by the utilization of the multi-layered dielectric film 16. Also, it pertains to the same field of technology of the display panel and the projection type display device.

Figure 47:
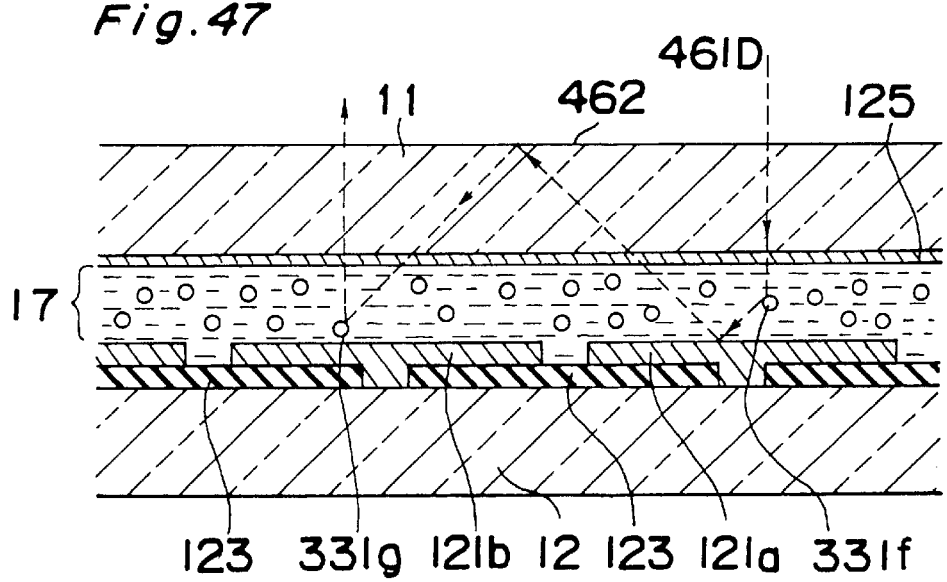

The phenomenon in which the secondary scattering occurs and the window contrast is reduced is also observed in the display panel of a reflective type shown in FIG. 47. The incident light 461D is reflected by the liquid crystal droplets 331f and, after having been reflected by the interface 462 with the air, enters the liquid crystal layer 17 and is then scattered (secondary scattering). Portion of the scattered light emerges outwardly from the counter substrate 11. The light emerging from the counter substrate 11 subsequently enters the projection lens and is then projected onto the screen.

The display panel 264 is fitted to the dichroic prism 441 having its ineffective area deposited with the light absorbing film 432. This structure is functionally similar to the structure wherein, as shown in FIG. 29A, the transparent substrate 283 is optically coupled with the display panel 264 and has an ineffective area deposited with the light absorbing film 285. In other words, it may suffice that it corresponds to the version in which the transparent substrate 283 is substituted by the dichroic prism 441.

By way of example, considering the display panel 264d for modulating the red light, the incident light 267a enters the dichroic prism 441 through a light incident and exit surface 435 and the red light is reflected by a light separating surface 442a. Depending on the magnitude of a voltage applied to the reflecting electrode 121, the display panel 264d varies the degree of scattering of the light modulating layer 17. Of them, a light component which has passed is again reflected by the light separating surface 442a and emerges outwardly from the light incident and exit surface 435. Most of the scattered light is absorbed by the light absorbing film 432 and returns to the light modulating layer 17 without the secondary scattering taking place. Also, since no light exist that is reflected by the multi-layered dielectric film 16 and others, there is no possibility of the pixels blurred and the window contrast being lowered.

It is to be noted that the light absorbing film 432 is not an anti-reflection film. The anti-reflection film is generally made up of two or three dielectric thin-films. This anti-reflection film has a function of passing the incident light without substantially allowing it to be reflected by the interface. The light absorbing film 432 used in the present invention is a film or means for absorbing light and basically differs in structure and effect from the anti-reflection film in that no light is passed therethrough.

The publication referred to above (i.e., Japanese Laid-open Patent Publication No. 6-34931) discloses the formation of an anti-reflection film on a prism and a surface area (an effective display area) of a window material of a liquid crystal element of a reflective type. The anti-reflection film disclosed therein is described as operable with either white light or the wavelength of divided and projected light. Considering this disclosure the anti-reflection film disclosed therein is supposed to be an anti-reflection film made of a multi-layered dielectric film and is not the light absorbing film 432 used in the present invention. Also, considering the reference to the surface area of the window material, it is clear that no anti-reflection film is formed on the ineffective area of the prism such as accomplished in the present invention. Accordingly, the disclosure of this publication and the projection type display device of the present invention broadly differ from each other in respect of structure, function and effect. Within the prism 441, light scattered by the liquid crystal layer 17 scatters. Even though the reflection film is formed on the surface area of the prism 441, a total reflection occur if light impinges at an angle greater than the critical angle. Accordingly, the anti-reflection film is of no help to the scattered light. If the film is the light absorbing film 432, the light impinging at an angle of incidence greater than the critical angle can be absorbed and the light scattering within the prism 441 is also absorbed. Accordingly, formation of the light absorbing film 432 on the ineffective area of the prism 441 brings about meritorious effects.

The reason that in FIG. 44 the wavelength limiting filter 433 is disposed between the display panel 264 and the light separating surface 442 is as follows.

At the light separating surface 442 of the dichroic mirror or the dichroic prism, the transparent dielectric film of a different refractive index and having a film thickness corresponding to the wavelength of light is laminated on a transparent plate or a prism surface. By the action of the laminated transparent dielectric thin-film, and substantially without the light being lost by absorption, a function is available of separating at an arbitrary wavelength into a transmissive wavelength region and a reflective wavelength region by the effect of a multiple interference phenomenon of light. Such a multi-layered optical film is known as exhibiting a considerable difference in spectral characteristic according to P- and S-polarized light as the angle of incidence of the light incident upon the light separating surface increases from zero.

The P- and S-polarized light and others will now be defined. The P-polarized light means light which vibrates on a plane containing the light separating surface 442 of the dichroic prism and others and the direction of travel of the incident light. The S-polarized light means light that vibrates in a direction perpendicular to the direction of vibration of the P-polarized light.

In the case of the projection type display device which utilizes the TN liquid crystal display panel, since the polarizing plate is employed, the polarizing plate must have a polarizing axis so disposed and so oriented that either one of the P- and S-polarized light and only one of them is utilized in practice. For this reason, even when the spectral characteristic of the dichroic mirror or the dichroic prism depends on the polarized light, a sharp color separating characteristic can be obtained and, therefore, a satisfactory hue of the projected image can be obtained.

On the other hand, where the polymer dispersed liquid crystal display panel is employed, random light (both of the P- and S-polarized light) constitutes the incident light. Accordingly, the dichroic mirror or the dichroic prism exhibits a spectral characteristic corresponding to an average value of the P- and S-polarized light. In other word, no sharp wavelength cut-off can be accomplished. This means that the color purity of light incident on one display panel is lowered. For this reason, the hue of the projected image formed by combining the colors is inferior to that exhibited by the projection type display device utilizing the TN liquid crystal display panel.

The light reflected by the light separating surface 442 of the dichroic prism or the like is known to have a broader band of the S-polarized light than that of the P-polarized light. Conversely, the light passing through the light separating surface 442 of the dichroic prism or the like have a broader band of the P-polarized light than that of the S-polarized light.

By way of example, assuming that the red light is reflected by the light separating surface 442a of the dichroic prism 441, the S-polarized component of the red light contains a broad band of wavelength of light that is reflected and the P-polarized component of the red light contains a broad band of wavelength of light that is passed therethrough. Accordingly, the red light of the S-polarized component reflects light of a wavelength approximating to the band of the green light and the red light of the P-polarized component passes light of a wavelength approximating to the band of the green light.

In other words, it means that separation of the red light takes place satisfactorily at the light separating surface 442a of the dichroic prism 441. This is an element that deteriorates the hue. Deterioration of the hue may be replaced by a reduction in color reproducibility. By way of example, the incident light entering the display panel 264d for modulating the red light is mixed with the green light, the display panel 264d will modulate the red light as well as the green light, accompanied by failure to reproduce the original color faithful to the color of the image to be displayed.

In the projection type display device of the present invention, the wavelength limiting filter 433a restricts the band of the light passing therethrough to polarized light of a narrow one band out from the P- and S-polarized light. In other words, since the light incident on the display panel 264d is such that the S-polarized light has a broad band than that of the P-polarized light, the band of light which pass through the wavelength limiting filter 433a is limited to the band of the P-polarized light. Particularly where the dichroic prism is employed, the difference in band between the P- and S-polarized light tends to become large and, therefore, the effect brought about by the use of the wavelength limiting filter 433 is considerable.

Similarly, since the light incident on the display panel 264f is such that the S-polarized light has a broader band than that of the P-polarized light, the band of light that passes through the wavelength limiting filter 433c is limited to the band of the P-polarized light. Also, since the light incident on the display panel 264e is such that the P-polarized light has a broader band than that of the S-polarized light, the band of light that passes through the wavelength limiting filter 433b is limited to the band of the S-polarized light.

In view of the foregoing, the disposition of the wavelength limiting filter 433 between the display panel 264 and the dichroic mirror 263 brings about considerable effects. Accordingly, a technical idea of positioning the wavelength limiting filter 433 between the light separating surface 442 and the display panel 264 may not be always limited to the use in combination with the dichroic prism 441 shown in FIG. 44, but may equally apply to the structure shown in FIGS. 24, 25 or 26.

Also, the wavelength limiting filters 433a, 433b and 433c may not be always disposed on all of the optical paths. By way of example, arrangement may be made in which only the wavelength limiting filters 433a and 433c are employed and the wavelength limiting filter 433b is dispensed with. Particularly where the wavelength limiting filter is inserted in an optical path attributable to the deteriorated color purity, an objective to improve the color reproducibility can be accomplished.

In FIG. 26, the wavelength limiting filter 433 is shown by the phantom line. However, a structure may be employed in which the wavelength limiting filter is optically coupled with the display panel 264 by means of an optical coupling agent. Also, in order to avoid incidence of light, reflected by the wavelength limiting filter, on the projection lens 261, the surface of the wavelength limiting filter which contacts the air may be formed with an anti-reflection film. Also, the wavelength limiting filter is preferably so disposed as to be tilted relative to the optical axis 265.

In view of the foregoing, it is clear that in FIG. 44, the dichroic prism 441 has not only a color separating and combining function, but also a function of preventing an occurrence of the secondary scattering. The structure of the present invention shown in FIG. 44 is compact with the color separating and combining system simplified. In addition, it has a function of preventing the occurrence of the secondary scattering and improving the window contrast.

Such a structure shown in FIG. 43 may be contemplated. A cubic vessel 431 accommodates therein a dichroic mirror (a half-mirror including a glass plate formed with a multi-layered dielectric film and operable to reflect light by selecting a wavelength by the effect of a light interference)

263, a wavelength limiting filter 433, and a display panel 264. The vessel 431 has interior or exterior surfaces lined with a light absorbing film 432a serving as a light absorbing means. The space inside the vessel 431 is filled with a liquid medium such as ethylene glycol or a gel 434.

By so constructing, no optical coupling between the wavelength limiting filter 433 and the display panel 264 is necessitated. The light absorbing film 432a functions as the light absorbing film 432 shown in FIG. 45. Also, since the liquid medium or gel 434 has a function of cooling the display panel 264, it is easy to cool the display panel 264.

Where the wavelength limiting filter 433 is employed in the projection type display device of a reflective type (shown in, for example, FIG. 26 or 44), the light passes through the wavelength limiting filter 433 twice, i.e., during its passage towards the light modulating means 264 and during its passage from the light modulating means 264. Accordingly, the wavelength limiting filter 433 serves as a secondary band-pass filter. For this reason, it is excellent in selectivity of the wavelength since the cut-off band is steep.

Shown in FIGS. 43 and 44 is the projection type display device of a reflective type. However, the technical idea of the present invention is applicable not only to the projection type display device of the reflective type, but also the projection type display device of a transmissive type.

Figures 56, 59:
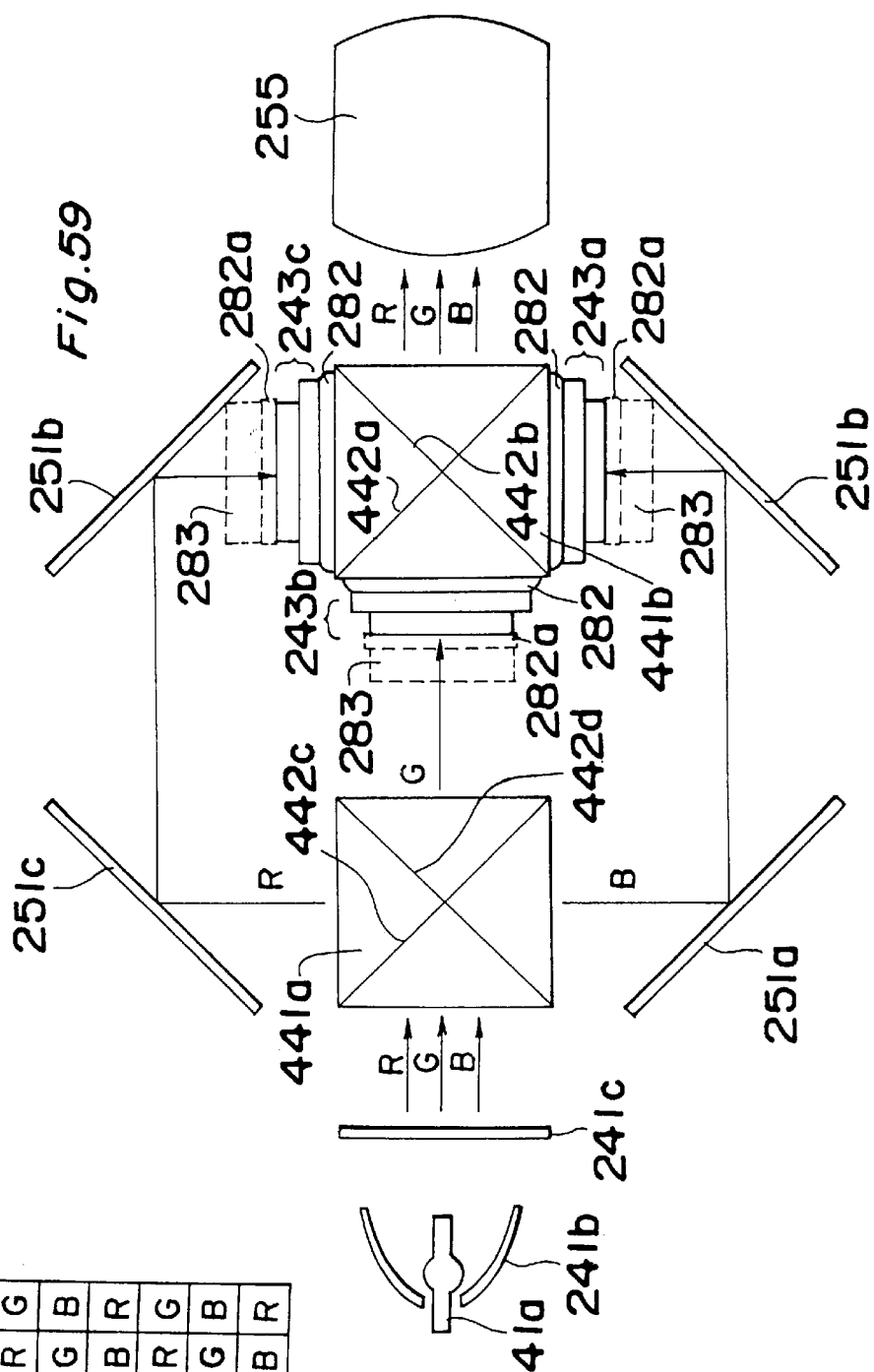
FIG. 56 is a diagram showing how three color filters are disposed.
FIG. 59 is a diagram showing a still further embodiment of the projection type display device according to the present invention.

FIG. 59 illustrates the structure of the projection type display device of the transmissive type according to the present invention. The dichroic prism 441b has three display panels 243a–243c optically coupled therewith by means of optical coupling layers 282. Preferably the optical coupling layers 282 are in the form of a gel because the three display panels 243a–243c must be so positioned as to overlap one above the other on the screen. No positioning is necessary if respective positions of the display panels 243a–243c are completely fixed. If it is in the form of a gel, change in position is somewhat possible. In the projection type display device of the present invention, when the structure in which the display panels are fitted to the prism is employed, a mechanism for changing the positions of the display panels is added.

While light emitted from the metal halide lamp is separated into red, green and blue optical paths by light separating surfaces 442c and 442d of the dichroic prism 441a. The red light is reflected by mirrors 251c and 251d before it enters the display panel 243c. The green light travels straight and impinges upon the display panel 243b. Since the optical path for each of the red and blue light is longer than that for the green light, a relay lens is preferably disposed on each of the optical paths for the red and blue light. It is to be noted that, although it has been described that the light separating surfaces 442d and 442c of the prism 441a reflect the red and blue light, respectively, the present invention need not be limited thereto and arrangement may be made that the light separating surfaces 442d and 442c reflect the blue and green light, respectively.

Each of the display panels 243 modulates the light incident on such display panel The prism 441b combines the modulated light into a single optical path and the combined light is subsequently projected by the projection lens 255 onto the screen.

The prism 441b has an ineffective area painted with a light absorbing film 432. Light scattered by the display panel 243 is absorbed by the light absorbing film 432 and, therefore, not only is the secondary scattering suppressed, but also scattering of light in the liquid crystal layer in the presence of the multi-layered dielectric film 16 does not occur, resulting in a considerable improvement in window contrast.

Also, in order to avoid the occurrence of the secondary scattering resulting from a rearward scattering occurring in the display panel 243, a transparent substrate 283 or a concave lens may be bonded to the display panel 243 through an optical coupling layer 282 as shown by the phantom line in FIG. 59. Nevertheless, an ineffective area of the transparent substrate 283 is preferably formed with a light absorbing film 285 as shown in FIG. 29.

Although the display panel 243 has been described as fitted to the prism 441b, it may be fitted to the prism 441a and, even in this case, similar effects and functions can be obtained. Also, the prism 441a may be of a structure wherein the dichroic prisms may be arranged in a pattern similar to the shape of a figure "X" as shown in FIG. 42. Other than it, the prism disclosed in the U.S. Pat. No. 5,309,188 may be employed in the present invention. Since the prism shown in FIG. 43 exhibits such a characteristic that the respective bands of the P- and S-polarized light are substantially equal to each other, the prism 441 shown in FIG. 44 may be replaced by the prism shown in FIG. 43 to increase the color reproducibility. Again preferably, a wavelength limiting filter 433 is disposed on an optical path as shown in FIG. 44.

The foregoing description is directed to the structure in which the display panel is coupled with the dichroic prism 441 by means of the optical coupling layer (ethylene glycol 434, silicone gel 433 and so on). However, the technical idea of the present invention is to prevent the secondary scattering from occurring by connecting the display panel to a transparent substrate or the like. Accordingly, the present invention may not be limited to the use of the dichroic prism and may be applied to any prism capable of separating P- and S-polarized light at a light separating surface, which prism is hereinafter referred to as PBS prism. One example of the projection type display device in which the PBS prism is employed will be described.

Figure 48:
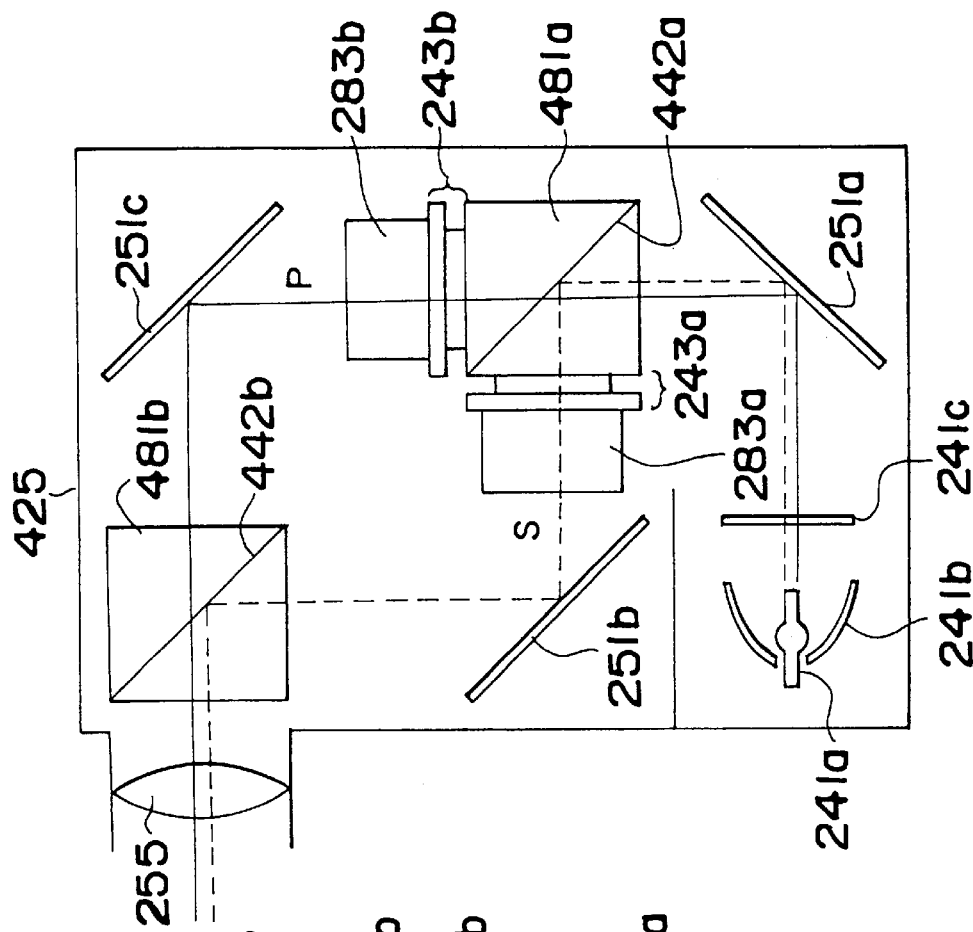
FIG. 48 is a diagram showing a further embodiment of the projection type display device according to the present invention.

Referring to FIG. 48, there is shown a structural diagram of the projection type display device of the present invention. Visible rays of light from a lamp 241a are reflected by a mirror 251a and then enter the PBS prism 481. The PBS prism is a cubic polarizing element comprised of a pair of right-angled prisms having their slantwise surfaces bonded together and formed with a multi-layered dielectric film (light separating surface 442a). The light incident on the light separating surface 442a is separated into P- and S-polarized light components. This PBS prism 481 has two display panels 243a and 243b fitted thereto.

Color filters 71 are formed over the pixel electrodes 15 as shown in FIG. 8. The color filters 71 are available in three primary colors, red, green and blue, and are rendered to be a mosaic color filter in correspondence with the respective pixels. While they may be formed on the counter electrode 13 as is the case with the conventional TN liquid crystal display panel, in such case phase separation between the liquid crystal component and the resin component would be difficult during the manufacture of the polymer dispersed liquid crystal display panel. The resin component is generally employed in the form of UV-curable resin. During the manufacture, LC mix in which the UV-curable resin and the liquid crystal material are mixed is sandwiched between the counter electrode 13 and the pixel electrode 15 and is thereafter radiated by UV rays of light. The color filters 71 will not pass the UV rays of light therethrough. Accordingly, where the color filters are formed on the counter electrode 13, radiation of the UV rays of light from the side of the counter electrode 13 does not result in phase separation between the liquid crystal component and the resin component. Therefore, the UV rays of light are radiated from the side of the array substrate 12. However, the thin-film transistor 14 will shield the passage of the UV rays of light and therefore no resin component overlaying the thin-film transistors 14 will be cured. If the resin component is left uncured, the stability of the display panel will be adversely affected, accompanied by reduction in reliability.

A transparent substrate 283 is coupled to an exit side of the display panel 243 through an optical coupling layer. A spacer (not shown) is disposed between peripheral portions of the array substrate 12 and the transparent substrate 283 and this spacer regulates the thickness of the optical coupling layer. The transparent substrate 283 has an ineffective area painted with black dye while an effective area on an exit surface of the transparent substrate 283 is formed with an anti-reflection film. Both of the transparent substrate 283 and the array substrate 12 have an equal refractive index of 1.52.

Figure 52:
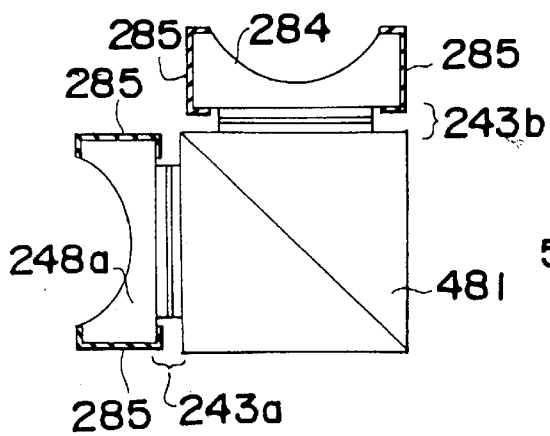
FIG. 52 is a side sectional view showing the PBS prism fitted with a concave lens.
Figure 53:
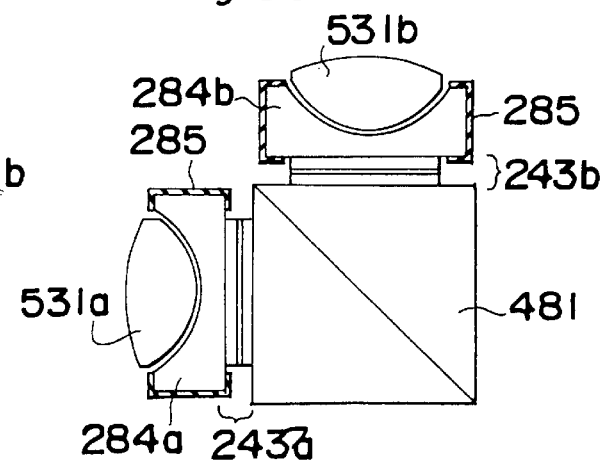
FIG. 53 is a side sectional view showing the PBS prism fitted with concave and positive lenses.
Figure 54:
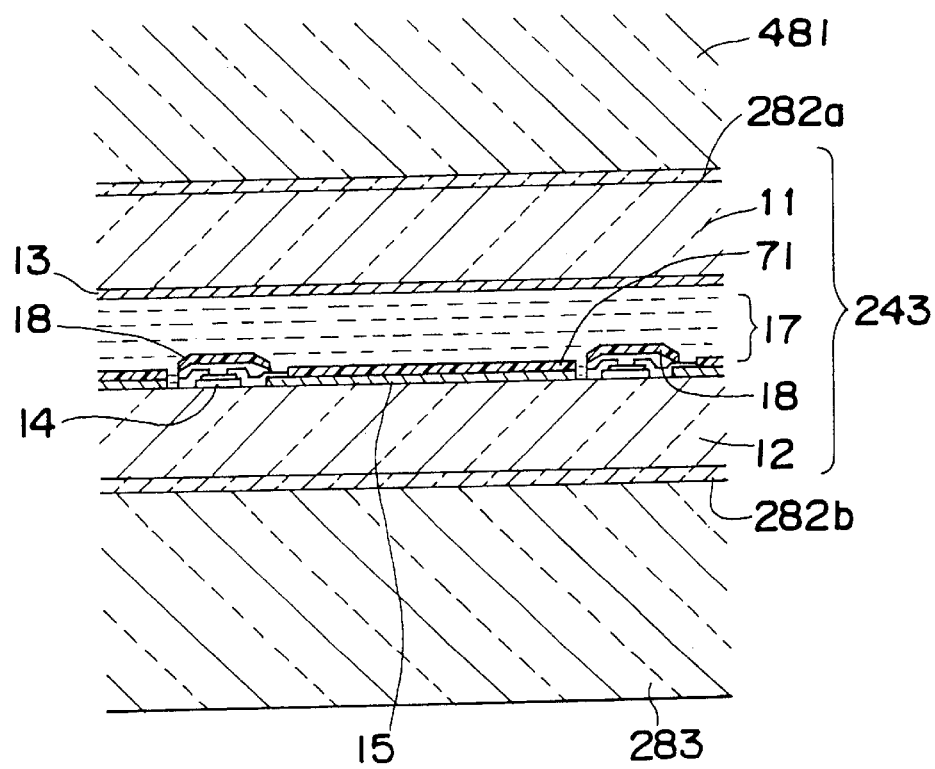
FIG. 54 is a cross-sectional representation of the display panel.

As a structure in which the display panel 243 is fitted to the PBS prism 481, the structure as shown in FIG. 51, the structure in which a concave lens 284 is employed as shown in FIG. 52 and the structure in which a concave lens 284 and a positive lens 531 are employed as shown in FIG. 53 can be contemplated. Also, details of the display panel 243 are shown in FIG. 54.

Since the dichroic prism 441 and the PBS prism 481 function differently, the effect brought about by attachment of the display panel 243 to the PBS prism 481 will be described with particular reference to FIG. 51.

S-polarized light enters the display panel 243a and then scatters in the liquid crystal layer 17. Scattering of the S-polarized light in the liquid crystal layer 17 results in generation of P-polarized light. The light scattered and reflected (S- and P-polarized light) again enters the counter substrate 11 and then returns to the PBS prism 481. The S-polarized light component of the light returning to the PBS prism 481 is again reflected by the light separating surface 442a so as to travel in a direction indicated by a towards the side of the light source. On the other hand, the P-polarized light component passes through the light separating surface 442a so as to emerge in a direction indicated by b. This brings about similar effects to those exhibited when the transparent substrate 283 is connected to the side of the counter substrate 11. Preferably, the ineffective area of the PBS prism is formed with such a light absorbing means as shown in FIG. 45.

Unless the PBS prism 481 and the counter substrate 11 are optically coupled with each other, the scattered light is reflected by the interface between the counter substrate 11 and the air so as to return towards the liquid crystal layer 17 and then induces the secondary scattering. Since the PBS prism 481 can be regarded as a transparent substrate of a relatively great thickness, no secondary scattering of the reflected light occur and, therefore the display contrast increases.

In the case of FIG. 48, the transparent substrate 283 has an exit surface to which a polarizing plate 384 is fitted with its polarizing axis so oriented that when the liquid crystal layer 17 is in the transparent state (ON state) the light can pass therethrough. When the liquid crystal layer 17 is in a light scattering state (OFF state), a polarizing condition is distorted (with a portion of the P-polarized light and a portion of the S-polarized light converted into S-polarized light and P-polarized light, respectively). The light, the polarizing condition of which has been distorted, is absorbed by the polarizing plate 384 and, therefore, the contrast exhibited during the transmissive and scattering states is increased to provide a favorable image display.

Light having passed through two display panels 243a and 243b are projected by the projection lens 255b so as to superimpose at the same location on the screen to provide a visible image. It is to be noted that, even though no polarizing plate 384 is employed as shown in FIG. 50, the image can be displayed though the contrast is reduced. In such case, without the polarizing plate 384, no light absorption by the polarizing plate 384 and therefore the displayed image becomes bright.

If two PBS prisms 481a and 481b are employed as shown in FIG. 49, the single projection lens 255 is effective to project the image onto the screen. Also, the length of the optical path from the lamp 241a to the projection lens 255 through one of the display panels and that through the other of the display panels can be made equal to each other. Again, since the PBS prism 481b plays a role of the polarizing plate 384, the higher display contrast can be obtained than that exhibited by the structure of FIG. 50. Yet, since the PBS prism 481 absorb no light absorption such as performed by the polarizing plate 384, the displayed image becomes brighter than that exhibited by the structure of FIG. 48.

It is to be noted that, although in the structure of FIG. 49 the display panel 243 has been fitted to the prism 481a, it may be fitted to an incident surface of the prism 481b.

As discussed hereinabove, the projection type display device according to the embodiment of the present invention is such that the light emitted from the light source is separated by the PBS prism 481 into the P- and S-polarized light paths on which the respective display panels are disposed. In other words, the two display panels are employed. It also makes use of the projection lens 255 for projecting the light, modulated by the display panels, onto the screen. Images formed by the respective display panels are superimposed on the screen. Preferably, superimposition of these images should take place displaced a quantity corresponding to one or more pixel rows or one or more pixel columns.

Each of the display panels has three primary color filters and, by displacing a quantity corresponding to one pixel, two colors are added together on the screen to increase the details.

Also, the polarity of a signal applied to one of the two pixels subjected to the color addition should have a polarity opposite to that applied to the other of the two pixels. This will now be described with particular reference to FIG. 2.

Figure 55A:
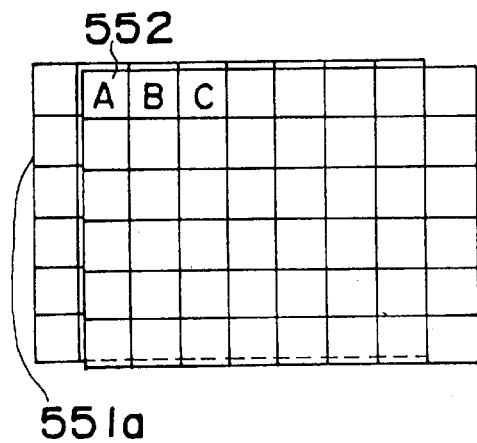
FIGS. 55A and 55B illustrate different methods of displacing an image projected onto a screen, respectively.
Figure 55B:
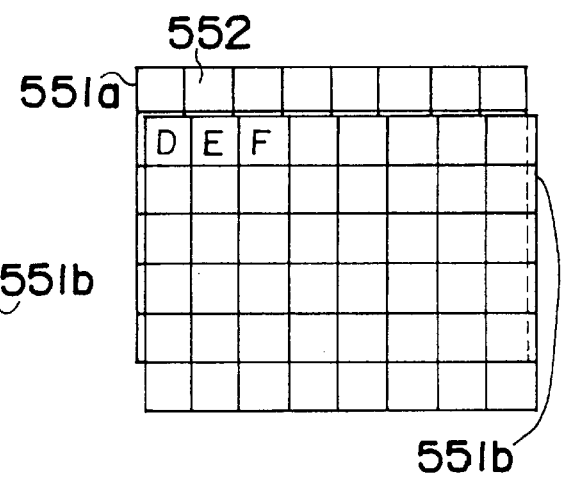

Respective images formed by the display panels 243a and 243b are, when projected onto the screen (not shown), superimposed on the screen in such a manner as shown in FIGS. 55A and 55B. FIG. 55A illustrates the case in which projected images 551a and 551b are superimposed having been displaced a quantity corresponding to one column of pixels. Assuming that the color filters associated with the projected images 551a and 551b, respectively, are arranged such as shown in FIG. 56, the pixel A displays a color corresponding to a mixture of red and green colors, the pixel B displays a color corresponding to a mixture of green and blue colors, and the pixel C displays a color corresponding to a mixture of blue and red colors. As a matter of course, it is necessary that the sampling of the video signals applied respectively to the display panels 243a and 243b should be carried out in a manner displaced a quantity corresponding to one column of the pixels.

Thus, when the images are projected so as to superimpose on the screen in the manner described above, the resultant display device provides a higher image resolution than that given by the projection device utilizing the single display panel, accompanied by an increase in screen luminance.

Also, even though one of the display panels has one or more defective pixels, no pixel defect will be perceived. By way of example, even if the pixel indicated by A of the projected image 551*b* is defective, it will rarely occur that the pixel of the projected image 551*b* from the display panel which is to be superimposed with the defective pixel A is also defective. Accordingly, if the pixels in one of the display panels are normal, the image will be displayed normally and therefore it cannot be regarded as defective. However, the pixel defect must be black in color (defect in a pixel in a black display). For this purpose, a process control must be carried out so that no white defect (defect in a pixel in a white display) will hardly occur during the formation of the thin-film transistor. Also, the use may be made of a laser beam to correct the defect so that the white defect can be rectified to a black defect.

As a matter of course, another method is also available in which the projected images 551*a* and 551*b* are displayed in a manner displaced a quantity corresponding to one row of the pixels as shown in FIG. 55B. If the color filters for each pixel are arranged as shown in FIG. 56, red and green colors are mixed at the position of the pixel D, green and blue colors are mixed at the position of the pixel E, and the blue and red colors are mixed at the position of the pixel F. Even in this case, similar effects can be obtained and are not reiterated for the sake of brevity.

While in the foregoing embodiment the projected images have been described as displayed on the screen displaced a quantity corresponding to one column or row of the pixels, the number of the columns or rows over which the projected images are displaced may not be always limited to one and may be two. It is however to be noted that the projected images falling on a region where they are not superimposed should be shielded so that they are not displayed on the screen.

The displacement of the projected images may be not only in units of one pixel, but also in units of a half of the pixel. If the projected images are displaced a quantity corresponding to one half of the pixel, the image of the pixels of the display panel 243*b* will be projected in between the pixels of the display panel 243*a*. This brings about such an effect that no image of the multi-layered dielectric film 16 will appear in the projected image and no contour of each pixel will appear, allowing the projected image to be displayed sharply.

The foregoing is a case in which the same color filters are fitted to both of the display panels 243*a* and 243*b*. However, if countermeasures are taken to the color filters, the images may be superimposed without the pixels displaced. In other words, the projected images from the display panels 243*a* and 243*b* may be aligned with each other on the screen. By way of example, if the red color filter is fitted to the pixel at a top left position of the color filter of the display panel 243*b*, the green color filter should be given to the pixel at a top left position of the color filter of the display panel 243*a*. In other words, the color filters of different colors are disposed in the respective display panels 243*a* and 243*b*. Nevertheless, the color filters should be so designed that, when matched with each other, different colors can be mixed together, for example, the red color of the display panel 12*a* is mixed with the green color of the display panel. Also, the sampling of the video signals may be carried out at the same timing for both of the display panels. Accordingly, projection of the images in a manner with the pixels displaced should be understood as including formation of the red, green and blue colors of the color filters in a displaced manner.

In the projection type display device of the present invention, in order to avoid occurrence of flickering, signals of opposite polarities for each row or column is applied which will now be described with reference to FIGS. 57 and 58.

Figure 57A:
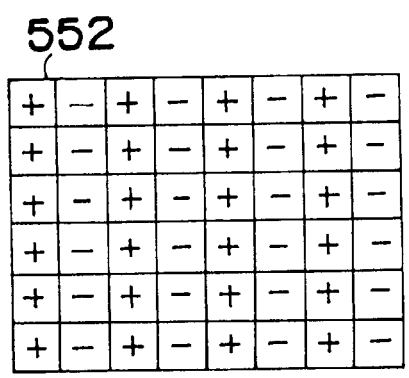
FIGS. 57A and 57B illustrate examples of application of signals of opposite polarities during one field period and the next succeeding field period, respectively, according to a one-column reversal method.
Figure 57B:
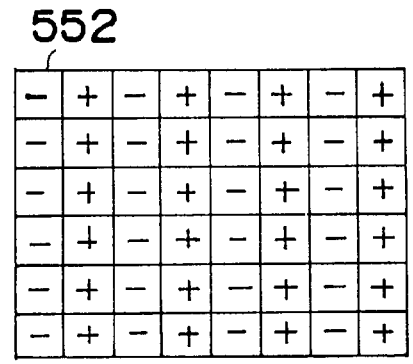

FIGS. 57A and 57B illustrate a driving method which is referred to as a one-column reversal driving method. In this figure, a signal of a positive polarity and a signal of a negative polarity are identified by "+" and "−", respectively. FIG. 57A illustrates a condition of signals which are written in the pixels during one field at a certain timing, in which signals of positive and negative polarities are written in a fashion alternating in each row. As shown therein, the signals of the opposite polarities are written in the neighboring columns of the pixels, respectively. During the next succeeding field, the signals applied assume such polarities as shown in FIG. 57B. In other words, to the pixel to which the signal of the positive polarity has been applied, the signal of the negative polarity is applied during the next succeeding field and, to the pixel to which the signal of the negative polarity has been applied, the signal of the positive polarity is applied during such next succeeding field.

Figure 58A:
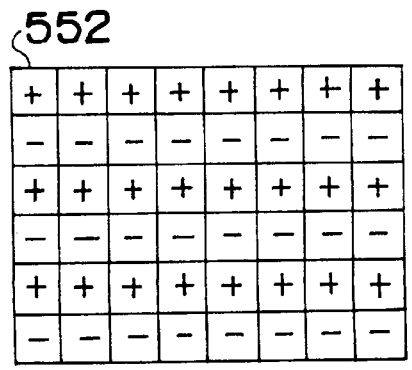
FIGS. 58A and 58B illustrate examples of application of signals of opposite polarities during one field period and the next succeeding field period, respectively, according to a one-line reversal method.
Figure 58B:
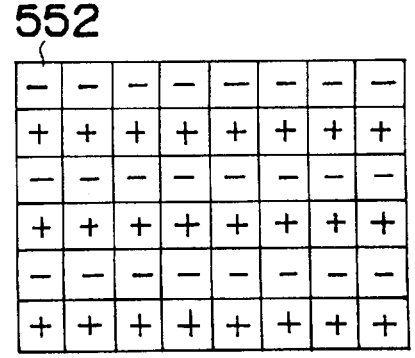

FIGS. 58A and 58B illustrate a driving method which is referred to as a one-line reversal driving method. FIG. 58A illustrates a condition of signals which are written in the pixels during one field at a certain timing, in which signals of positive and negative polarities are written in a fashion alternating in each column. As shown therein, the signals of the opposite polarities are written in the neighboring rows of the pixels, respectively. During the next succeeding field, the signals applied assume such polarities as shown in FIG. 58B. In other words, to the pixel to which the signal of the positive polarity has been applied, the signal of the negative polarity is applied during the next succeeding field and, to the pixel to which the signal of the negative polarity has been applied, the signal of the positive polarity is applied during such next succeeding field. In other words, as is the case with the previous driving method, the polarities of the signals are reversed.

In the projection type display device of the present invention, with respect to the pixels which are superimposed with each other, the positive and negative polarities are also superimposed. Assuming that, as shown in FIG. 55, light of the pixel A of the projected image 551*b* is modulated in response to the positive signal, light of the pixel of the projected image 551*a* which superimpose the pixel A is modulated in response to the negative signal. By driving in the manner described above, the flickering can be considerably reduced.

While the foregoing makes it clear, the one-column reversal drive is employed when the projected images are to be superimposed in the manner shown in FIG. 55A. On the other hand, the one-line reversal drive is employed when the projected images are to be superimposed in the manner shown in FIG. 55B. While either one of them may be combined, it is recommended, in view of the problem associated with a driving power of a source drive IC, to employ the one-column driving method together with displacement of one row of the pixels, and this brings about an increase in system performance.

Other than the driving methods shown in FIGS. 57A and 57B and 58A and 58B, there is a method referred to as a quasi-interlaced driving system. While this system is similar to the one-line reversal driving system shown in FIGS. 58A and 58B, it is the method in which the signals of the same polarities are written for each two rows of pixels. More specifically, each two rows of the pixels are used to effect the same display. In order to minimize the flickering, the pixel rows are displaced as shown in FIG. 55B, but the pixels are superimposed displaced a quantity corresponding to the two rows of pixels.

Thus, a technical idea of superimposing two pixels as shown in FIGS. 55A and 55B, or a technical idea of projecting the images in a manner displaced a quantity corresponding to a substantial half of each pixel, and a technical idea of using the opposite polarities for the signals to be applied to the pixels that are to be superimposed such as described with reference to FIGS. 57A, 57B, 58A and 58B are equally applied to the projection type display devices shown respectively in FIG. 24, 25, 26, 41, 42, 44 and 59 with slight modifications. By way of example, while these projection type display devices make use of the three display panels, it suffices that the foregoing technical ideas be applied to two of these three display panels.

Also, if the structure shown in FIG. 48, 49 or 50 is accommodated in the cabinet 425 shown in FIG. 41, the rear projection type display device can be obtained.

The PBS 481 may take a structure in which the light separating surface lies in the liquid as shown in FIG. 43.

Although in any one of the embodiments shown in FIGS. 48 to 50, respectively, the display panel has been described as if it is a display panel of a transmissive type, the present invention may not be always limited thereto and it may be a display panel of a reflective type. In such case, the pixel electrode 15 should be formed as a reflecting electrode by the use of metal such as aluminum. The structure of the projection type display device may be similar to the structure shown in FIG. 44 to which modifications are applied.

While the color filters have been described as red, green and blue in color, they may be in two colors. Also, the use of the color filters is not always essential and may be dispensed with. By projecting the two images so as to superimpose one above the other according to the present invention, such effects can be obtained as to increase the resolution, to decrease the flickering and to increase the screen luminance. These effects are not affected by the use or non-use of the color filters.

In the display device of the present invention shown in any one of FIGS. 48 to 50, each display panel may be the one in which one or an arbitrary combination of the use of the low dielectric columns 391 or the low dielectric films 16a as shown in FIGS. 38, 39A, and 39B, the use of the color filters as shown in FIGS. 8 and 14, the use of the black beads 19 and the multi-layered dielectric film 16 as shown in FIG. 1, the use of the light shielding film 51 as shown in FIG. 5 and the use of the insulating film 111 as shown in FIG. 11 are employed. Also, any standard polymer dispersed liquid crystal display panel may be employed therefor.

In the display device (including the projection type display device, a viewfinder and so on) of the present invention, the display panel employed therein is preferably the display panel of the present invention, but any other display panel operable to modulate random light may be employed. By way of example, a light writable display panel disclosed in U.S. Pat. No. 5,148,298, a display panel in which light modulation is carried out by a minute inclination of a mirror such as disclosed in U.S. Pat. No. 4,566,935, or a display panel in which light modulation is carried out by the utilization of a diffraction phenomenon such as disclosed in the Japanese Laid-open Patent Publication No. 62-237424 may be employed in the display device of the present invention. In addition, any one of the standard TN liquid crystal display panel, a STN liquid crystal display panel, a guest-host liquid crystal display panel, a liquid crystal display panel utilizing a dynamic scattering mode (DSM), and a display panel in which PLZT is employed as a light modulating layer, may also be employed. The foregoing matter concerning the employment of a particular display panel is equally applicable to the viewfinder which will hereinafter be described.

While the use of the wavelength limiting filter 433 on an optical path is preferred, the use thereof may not be always essential and, even without the wavelength limiting filter, the secondary scattering can be effectively prevented from occurring. Therefore, it will readily be understood that the display contrast can be increased as compared with that exhibited by the conventional projection type display device.

From the foregoing, the projection type display device shown in FIGS. 43 and 44 and others involves two technical inventions and effects. One is that the occurrence of the secondary scattering is avoided by the prism optically connected with the display panel. The other is that the hue is improved by the use of the wavelength limiting filter.

The above discussed devices is a projection type display device in which the display panel capable of forming an optical image as a function of the light scattering condition is used as a light valve (light modulating means). However, a technical idea of the present invention in which a phase plate is used to convert light into P- and S-polarized light and the color separating and combining system is so designed as to narrow the band of light to thereby improve the hue exhibited by the projection type display device, and a technical idea of the present invention in which the transparent substrate and the display panel are connected through the optical coupling layer to thereby avoid the secondary scattering are equally applicable to any other projection type display device in which the display panel of a type capable of modulating random light is employed.

Examples of the projection type display devices include a rear projection type display device (See FIG. 41 and generally referred to as a projection television set) in which the screen and the projector are accommodated within a common cabinet, and a front projection type display device (Liquid Crystal Vision available from Sharp Kabushiki Kaisha) in which the screen and the projector are separate from each other. The projection type display device of the present invention is equally applicable to both of the rear and front types. By way of example, if the projection display device shown in any one of FIGS. 24, 26 and 44 and the screen are integrated together to provide the structure shown in FIG. 41, the rear projection type display device can be obtained.

Also in order to accomplish a color display by the use of a single display panel of the present invention, the structure shown in FIGS. 28A and 28B should be employed. FIG. 28A shows the system using a color filter while FIG. 28B illustrates the structure effective to accomplish a color display without using color filters. No description would be needed of the structure shown in FIG. 28A and, instead, only the structure shown in FIG. 28B will now be described.

Referring to FIG. 28B, a microlens array 601 is mounted on the counter substrate 11 of a display panel 243 by means of a UV-curable bonding agent. The microlens array 601 is formed with microlenses 602 in a matrix pattern. The array substrate 12 of the display panel 243 has a transparent substrate 283 or a concave lens 284 bonded thereto by means of an optical coupling layer 282.

White rays of light emitted from a lamp 241a are separated into three primary colors, i.e., red, green and blue by a dichroic mirror 242a–242c. In other words, the red light is reflected by a dichroic mirror 242a so as to be incident on the display panel 243, the green light is reflected by a dichroic mirror 242b so as to be incident upon the display panel 243, and the blue light is reflected by a dichroic mirror 242c so as to be incident upon the display panel 243.

In the display panel 243, the microlenses 602 are disposed in alignment with the respective pixel electrodes 15. The microlenses 602 serve to converge the light of three primary colors onto particular pixels of the display panel 243 to form an image. Light having passed through each pixel subsequently enters a projection lens 255 which projects it onto a screen. As discussed previously, the transparent substrate 283 has a function of avoiding the secondary scattering.

By so constructing, the efficiency of utilization of light can be increased and a high luminance display can be realized. Also, the polymer dispersed liquid crystal display panel 243 must be such that during the manufacture thereof, UV rays of light must be radiated to the liquid crystal layer 17 to phase separate into the liquid crystal component and the resin component. If at this time the color filter is formed, the color filter will hamper passage of the UV rays of light, making it difficult to accomplish the necessary phase separation. With the structure shown in FIG. 28B, however, no color filter is formed and, therefore, the display panel 243 can easily be manufactured. Also, the cost of the display panel 243 can be reduced in an amount corresponding to the cost of the color filter.

Alternatively, in order to realize a color display by the use of a single reflective panel, it is needless to say that the reflective display panel of the present invention such as shown in FIG. 12 or FIG. 14 constructed by removing one of optical systems for modulating one of the red, green and blue light shown in FIG. 26 be employed as a light valve.

For the light valve employed in the projection type display device of the present invention shown in FIG. 28B, a display panel may be used of a type in which one or an arbitrary combination of the low dielectric column 391 or the low dielectric film 16a shown in FIGS. 38, 39A and 39B, of the black beads 19 and the multi-layered dielectric film 16 as shown in FIG. 1, of the light shielding film 51 shown in FIG. 5, and of the insulating film 111 as shown in FIG. 11 are employed. Particularly with the structure shown in FIG. 28B, the temperature of the liquid crystal layer 17 tends to increase, accompanied by reduction in voltage retentivity of the liquid crystal layer 17 and, therefore, the use of the insulating film 111 as shown in FIG. 11 is preferably essential.

The display panel of the present invention can be used not only as a light valve in the projection type display device, but also as a display device used in a video camera (which device is hereinafter referred to as a viewfinder). Hereinafter, an embodiment of the present invention in which the display panel of the present invention is used as a light valve in the viewfinder will be described. It is to be noted that, where the display panel of the present invention is used in the viewfinder, the multi-layered dielectric film 16 should be so formed as to reflect white light. Other than it, the display panel may be of a type in which one or an arbitrary combination of the low dielectric column 391 or the low dielectric film 16a shown in FIGS. 38, 39A and 39B, of the color filter as shown in FIGS. 8 and 14, of the black beads 19 and the multi-layered dielectric film 16 as shown in FIG. 1, of the light shielding film 51 shown in FIG. 5, and of the insulating film 111 as shown in FIG. 11 are employed. Also, any standard polymer dispersed liquid crystal display panel may be equally employed.

Figure 30:
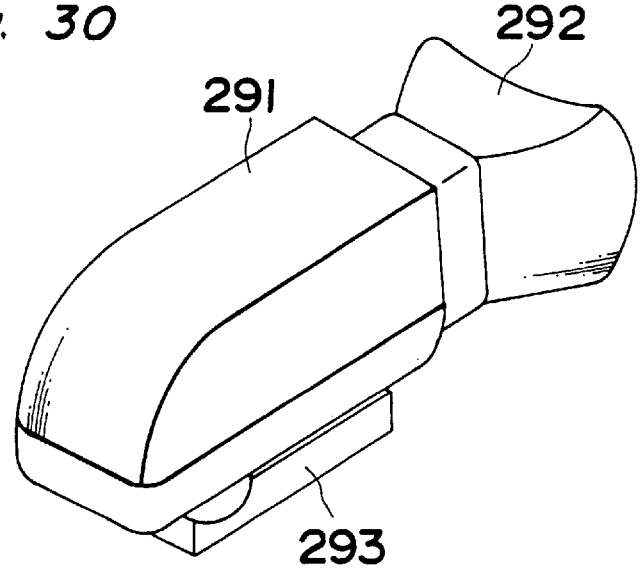
FIG. 30 is a perspective view showing a viewfinder to which the present invention is applicable.
Figure 31:
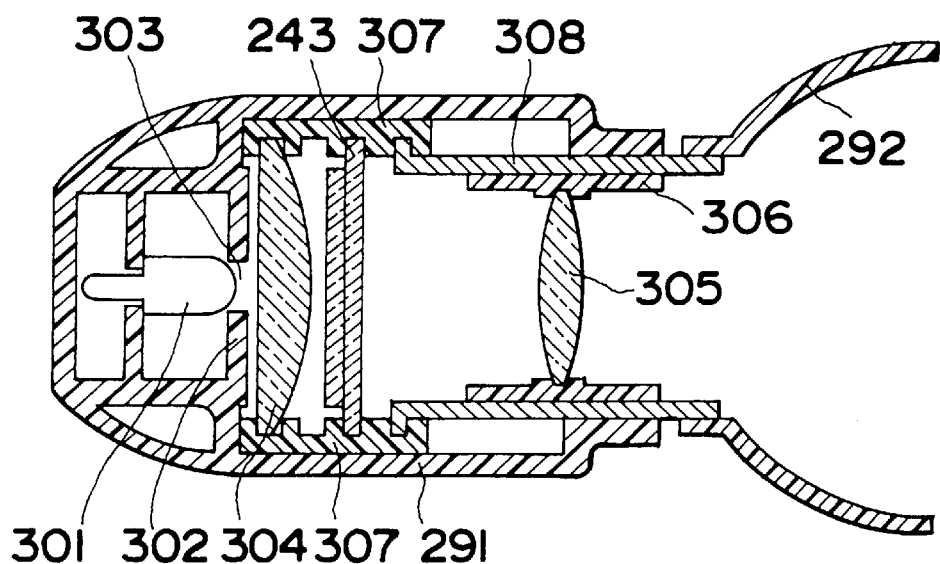
FIGS. 31 and 32 are longitudinal sectional views of the viewfinder in different operative positions, respectively.

FIG. 30 illustrates an outer appearance of the viewfinder embodying the present invention. A longitudinal sectional view of this viewfinder is shown in FIGS. 31 and 32. The viewfinder shown therein includes a casing 291 accommodating therein a condensing lens 304 and a holder 307 on which the display panel 243 of the present invention is mounted. Within a holder 308, an eyepiece ring 306 having a magnifying lens 305 mounted therein is disposed. Reference numeral 301 represents a fluorescent light emitting tube and ray of light emitted from this tube 301 are exited from a center hole 303 defined in a light shielding plate 302. The casing 291 and the holders 307 and 308 have their interior surface painted black or in a dark color so that unnecessary light can be absorbed. It is to be noted that, in place of the fluorescent light emitting tube 301, a light emitting diode (LED) may be employed.

When a viewer pulls the holder 308 from a position shown in FIG. 31, the holder 307 is pulled to a position shown in FIG. 32. FIG. 31 shows a condition of the viewfinder not in use with the holder 308 retracted. It is to be noted that the holders 307 and 308 may be integrally formed together. FIG. 32 illustrates a different condition in which the viewfinder is in use, i.e., when the viewer views through the viewfinder to look at an image displayed on the liquid crystal display panel. In the condition shown in FIG. 32, the focal point of the condensing lens 304 lies on a light emitting surface of the light emitting element 301. By moving the holder 307 and others, the volume of the viewfinder with the holder 307 in the retracted position can be reduced and, hence, the overall extension of the viewfinder can correspondingly be reduced.

By way of example, it is assumed that the display panel 243 has a diagonal length of 28 mm in the display area, the condensing lens 304 has an effective diameter of 30 mm and a focal length of 15 mm. The condensing lens 304 is a plano-convex lens with a flat surface oriented towards the light emitting element 301. It is to be noted that, in place of a combination of the condensing lens 304 and the magnifying lens 305, a Fresnel lens may be employed. The use of the Fresnel lens can further reduces the volume and the weight of the viewfinder.

Reference numeral 302 represents a light shielding plate having a center hole 303 defined at a central portion thereof. It has a function of reducing the area of emission of light from the light emitting element 301 to a narrow area. If the area of the center hole 303 is large, the image displayed on the display panel may be bright, but the contrast thereof will be reduced. This is because, while the amount of light incident on the condensing lens 304 increases, the orientation of the incident light gets worse.

The light emitted at a large solid angle from the light emitting element 301 is converted by the condensing lens 304 into substantially parallel, narrow directional rays of light which subsequently enters the display panel 243 from a side of the counter electrode (not shown). The viewer when he brings his eye close to an eyepiece cover 292 can view the image displayed on the display panel 243. In other words, the position of the pupil of the viewer is substantially fixed. If it is assumed that all of the pixels of the display panel 243 allow the light to travel straight, the condensing lens 304 operates in such a manner that light emitted from the light emitting element 301 and entering an effective area of the condensing lens 304 enters the pupil of the viewer after having passes through the magnifying lens 305. In this way, the viewer can view the small image, displayed on the display panel, on an enlarged scale. In other words, an enlarged virtual image can be viewed.

Since the position of the pupil of the viewer is substantially fixed by the eyepiece cover 292, the light source disposed rearwardly thereof may have a narrow directionality. In the conventional viewfinder in which a light box employing a fluorescent tube as a light source is employed, only light travelling from an area of a size substantially identical with that of the display area of the display panel and at a minute solid angle in a certain direction is utilized and no other light travelling in other directions are utilized.

In other words, the efficiency of utilization of light is considerably low.

In the present invention, using the light source having a small light emitting element, the light emitted from the light emitting element at a large solid angle is converted by the condensing lens 304 into substantially parallel beam of light. By so doing, the light emerging outwardly from the condensing lens 304 has a narrow directionality. If the point of view of the viewer is fixed, the previously discussed narrow directional light can be satisfactorily used in the viewfinder. The smaller the size of the light emitting element, the smaller the amount of electric power consumption. As stated above, the viewfinder of the present invention makes use of the situation in which the viewer views the displayed image with his point of view fixed. While the standard staring type display panel requires a predetermined angle of view, the viewfinder is satisfactory if the displayed image can satisfactorily viewed from a predetermined direction.

It is to be noted that the viewfinder of the present invention is fixedly mounted on a video camera through a mounting shoe 293.

Figure 10:
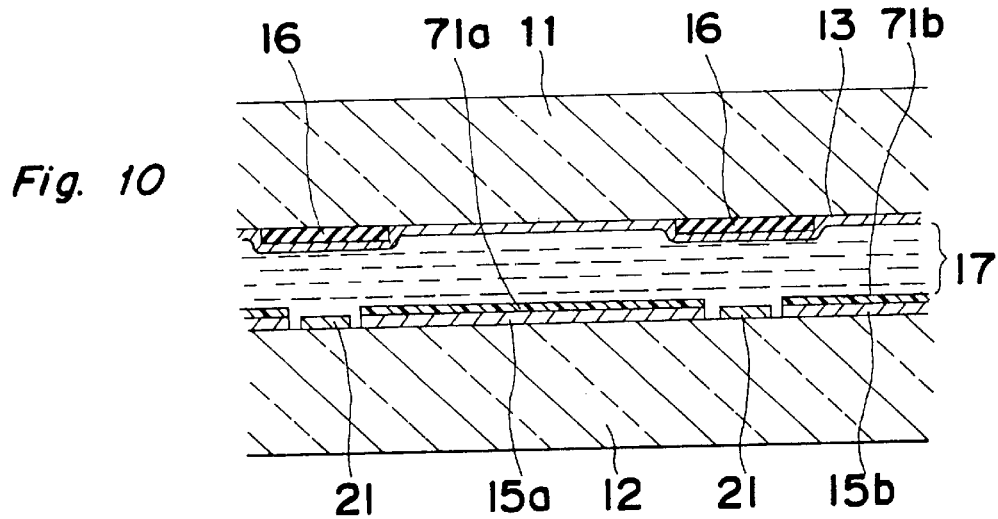
FIG. 10 is a view similar to FIG. 5B, showing a modified form of the display panel.

The display panel 243 has a mosaic color filters as shown in FIGS. 8 and 10. Pixels are laid in a so-called delta layout. The color filter allows passage of any one of red, green and blue light. The film thickness for each color may be controlled by a constituent element of the color filter. The film thickness of the color filter is adjusted and formed during the manufacture of the color filter. In other words, the film thickness of the color filter varies according to the particular red, green or blue color. Depending on the film thickness of the color filter, the film thickness of the liquid crystal layer 17 over the pixels can be adjusted according to the color of the color filter.

Also, if the display panel of a type wherein signal lines are covered by the use of the color filter as shown in FIG. 8 is employed, leakage of light from around each pixel can be advantageously avoided. The condensing lens 304 is so positioned with its flat surface, that is, a surface having a relatively great radius of curvature, oriented towards the light emitting element 301. This is for the purpose of making it easy to satisfy a sine condition and also of making it possible to distribute luminance of the displayed image uniformly over the display panel 243.

By adjusting the extent to which the eyepiece ring 306 is inserted into the casing 291, a focus adjustment relative to the sight of the viewer is possible. It is to be noted that, since the position of the viewer's eye is fixed by the eyepiece cover 292, there is no possibility that the position of the point of view may be displaced during the viewfinder. If the point of view is fixed, the viewer can view the favorably displayed image even though the directionality of light towards the display panel 243 is narrow. In order to facilitate a satisfactory viewing of the displayed image, it suffices that the direction of emission of light from the light emitting element 301 has to be moved in an optimum direction.

Figure 33A:
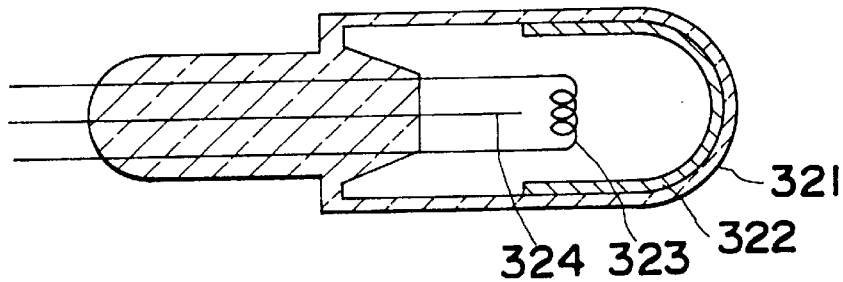
FIGS. 33A and 33B are longitudinal sectional views of different lamps employed in the viewfinder, respectively.

FIG. 33 illustrates a longitudinal sectional view of the fluorescent light emitting tube used in the viewfinder of the present invention. As shown therein, the fluorescent light emitting tube has an outer appearance similar to an incandescent bulb. Reference numeral 321 represents a glass envelope of a diameter within the range of 7 to 20 mm. Reference numeral 323 represents a filament which can be heated when a direct current voltage of 4 to 8 volts is applied thereto. Reference numeral 324 represents an anode with a direct current of 15 to 25 volts applied thereto. Electrons emitted as a result of heating of the filament 323 are accelerated by the anode voltage. Mercury molecules (not shown) are filled in the glass envelope 321, and the accelerated electrons emit UV rays of light upon collision with the mercury molecules. These UV rays of light excite a phosphor element 322 to generate visible light. For the light emitting element referred to above, a fluorescent light emitting tube, "LunaLight 07 Series" available from MiniPyro Denki Kabushiki Kaisha, may be employed. The light emitting tube has a diameter of 7 mm, and a direct current of a heater voltage of 5 volts and an anode voltage of 23 volts is applied thereto.

By driving it with pulses, the amount of light emitted therefrom can be adjusted. The pulses have a cycle of not lower than 30 Hz and preferably not lower than 60 Hz. If a voltage to be applied to the anode is employed in the form of a pulse signal, the amount of light emitted can be varied in proportion to the pulse width.

Figure 33B:
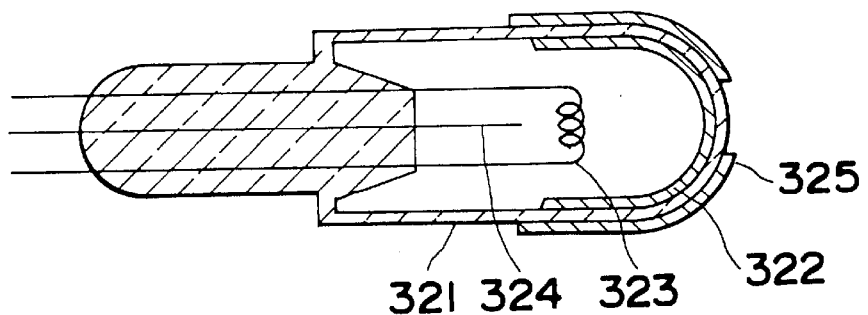

It is to be noted that, as shown in FIG. 33B, the glass envelop 321 is formed with a light shielding film 325 to thereby reduce the area from which light from the light emitting element emerges outwardly, the light shielding plate 302 such as shown in FIG. 31 can be dispensed with.

As hereinabove described, since the viewfinder of the present invention is such that the light emitted from the small light emitting element of the light emitting element 301 at a large solid angle can be efficiently collected by the condensing lens 304, the amount of electric power consumed can be considerably reduced as compared with the viewfinder in which a back light forming a planar light source using a fluorescent tube.

In the projection type display device of the present invention the use has been made of the polymer dispersed liquid crystal display panel of either a reflective type or a transmissive type, a high luminance display can be realized, making it possible to support a large format image of not smaller than 200 inches. Also, the optical film thickness of the multi-layered dielectric film is varied according to the wavelength of the red, green and blue light to render it to have a function as a black matrix. In addition, since the film thickness of the liquid crystal layer and/or the radius particle size of the liquid crystal droplets of the liquid crystal layer is made great according to the wavelength of light to be modulated, a display of an image having a favorable white balance and a favorable display contrast is possible.

The viewfinder of the present invention is such that, since the light emitted from the small light emitting element of the light emitting element 301 at a large solid angle is converted by the condensing lens 304 into substantially parallel and narrow directional light and is in turn modulated by the display panel 243 to effect an image display, the amount of electric power consumed thereby is small and, also, color distortion is minimized. Moreover, a drive circuit for the light emitting element 301 can be made simple in structure as compared with that employing the back lighting system and, therefore, it is possible to provide a compact, light-weight viewfinder.

Also, since the distance between the condensing lens 304 and the light emitting element is made adjustable, the volume and the total length of the viewfinder can be reduced when the viewfinder is used. While compactness is desired for in the video camera, the use of the viewfinder of the present invention results in both reduction in size and reduction in amount of electric power consumed.

Although the present invention has been described in connection with the preferred embodiments thereof with reference to the accompanying drawings, it is to be noted that various changes and modifications are apparent to those skilled in the art. By way of example, although in describing the display device utilizing the display panel of the present invention reference has been made to the touch panel as shown in FIG. 23, the projection type display device as shown in FIG. 24 and the viewfinder as shown in FIG. 30, the present invention is not always limited to the specific applications. The display panel of the present invention may be used in an electronic notebook, a pocketable television receiver set, a portable terminal, a lap-top computer, a color display monitor of a reflective type, a video camera equipped with a liquid crystal display panel (such as View-Com available from Sharp Kabushiki Kaisha), a television telephone, a head-mount display and so on.

Accordingly, such changes and modifications are to be understood as included within the scope of the present invention as defined by the appended claims, unless they depart therefrom.

What is claimed is:

1. A projection-type display device which comprises:
   a light generation means for emitting light;
   a light separating means for separating the light emitted by said light generation means into a red optical path, a green optical path, and a blue optical path, said light separating means including a first dichroic mirror for reflecting red light, a second dichroic mirror for reflecting green light and a third dichroic mirror for reflecting blue light, each of said first to third dichroic mirrors being inclined at a different angle relative to an orientation of disposition of the light generation means;
   a polymer dispersed liquid crystal display panel, including a plurality of pixels arranged in a matrix pattern, for forming an optical image as a function of change in light scattering state, said plurality of pixels including pixels operable to modulate light traveling along the red optical path, pixels operable to modulate light traveling along the green optical path, and pixels operable to modulate light traveling along the blue optical path, said display panel having an incident side;
   a micro-lens array including a plurality of micro-lenses arranged in a matrix pattern, and disposed on the incident side of said display panel, wherein each of said micro-lenses corresponds to one of said pixels operable to modulate light traveling along the red optical path, one of said pixels operable to modulate light traveling along the green optical path, and one of said pixels operable to modulate light traveling along the blue optical path and wherein each of said micro-lenses is operable to refract light traveling along the red optical path, green optical path, and blue optical path and to converge the light traveling along the red optical path onto said one of said pixels operable to modulate light traveling along the red optical path, to converge the light traveling along the green optical path onto said one of said pixels operable to modulate light traveling along the green optical path, and to converge the light traveling along the blue optical path onto said one of said pixels operable to modulate light traveling along the blue optical path, wherein each of the light traveling along the red optical path, the light traveling along the green optical path and the light traveling along the blue optical path impinges at a different angle upon the micro-lens array; and
   a projecting means for projecting the optical image formed by said display panel;
   wherein said display panel has a light modulating layer including a light-curable resin component and a nematic liquid crystal component, said nematic liquid crystal component having an ordinary refractive index $n_o$ within the range of 1.49 to 1.54 and also having a difference $\Delta n$ in refractive index within the range of 0.15 to 0.30.

2. A display panel which comprises:
   a first substrate including pixels in a matrix pattern and switching elements for applying a signal to said pixels;
   a second substrate including a counter electrode;
   a layer of liquid crystal material sandwiched between said first and second substrates;
   a color filter formed on one surface of said first substrate; and
   a dielectric column, generally equal to a film thickness of said layer of liquid crystal material, between said first and second substrates and between said pixels.

3. A display panel of a reflective type which comprises:
   a first substrate including a plurality of reflective electrodes arranged in a matrix pattern and a color filter disposed so as to overlay each of said reflective electrodes, at least two color filter elements of different colors being laminated one above the other between the reflective electrodes;
   a second substrate including a counter electrode; and
   a layer of liquid crystal material sandwiched between said first and second substrates for forming an optical image as a function of change in light scattering state.

4. The display panel as claimed in claim 3, further comprising as insulating film disposed on said color filter and said counter electrode, said insulating film being made of a material having a resistivity higher than that of said liquid crystal material layer.

5. A liquid crystal display device which comprises:
   a light generating means for generating white light;
   a condensing means for converting the light from the light generating means into substantially parallel light;
   a liquid crystal display panel for modulating the light emerging from the condensing means to thereby form an optical image; and
   an image enlarging means for presenting on an enlarged scale the image, which has been formed by the liquid crystal display panel, to viewers;
   wherein said light generating means is fixed or arranged on a first member and said light condensing means is fixed or arranged on a second member; and
   wherein at least one of the first and second members, when moved relative to the other, is operable to adjust a distance between the light generating means and the light condensing means.

6. A projection-type liquid crystal display device which comprises:
   a light generating means;
   a display panel including a first substrate formed with a matrix pattern of pixel electrodes for modulating light from said light generating means, a second substrate formed with a transparent electrode, a layer of liquid crystal material sandwiched between said first and second substrates, and a color filter formed on said pixel electrodes, a dielectric column generally equal to a film thickness of said layer of liquid crystal material, between said first and second substrates and between said pixel electrodes; and
   a projection means for projecting light modulated by said display panel.

* * * * *